(12) United States Patent
Wakabayashi et al.

(10) Patent No.: US 12,477,044 B2
(45) Date of Patent: Nov. 18, 2025

(54) METHOD AND PUBLISHER-SUBSCRIBER NETWORK

(71) Applicant: Sony Group Corporation, Tokyo (JP)

(72) Inventors: Hideji Wakabayashi, Basingstoke (GB); Yuxin Wei, Basingstoke (GB); Yassin Aden Awad, Basingstoke (GB); Vivek Sharma, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 18/292,790

(22) PCT Filed: Aug. 2, 2022

(86) PCT No.: PCT/EP2022/071682
§ 371 (c)(1),
(2) Date: Jan. 26, 2024

(87) PCT Pub. No.: WO2023/012155
PCT Pub. Date: Feb. 9, 2023

(65) Prior Publication Data
US 2024/0340354 A1    Oct. 10, 2024

(30) Foreign Application Priority Data
Aug. 4, 2021  (EP) ..................... 21189716

(51) Int. Cl.
*H04L 67/562*    (2022.01)
*H04L 67/55*    (2022.01)

(52) U.S. Cl.
CPC ............ *H04L 67/55* (2022.05); *H04L 67/562* (2022.05)

(58) Field of Classification Search
CPC .............................. H04L 67/55; H04L 67/562
See application file for complete search history.

(56) References Cited

U.S. PATENT DOCUMENTS

| 2018/0326291 A1 | 11/2018 | Tran et al. |
| 2019/0394175 A1 | 12/2019 | Zhang et al. |

(Continued)

FOREIGN PATENT DOCUMENTS

| EP | 3819850 A1 | 5/2021 |
| WO | 2022/122789 A1 | 6/2022 |
| WO | 2022/161676 A1 | 8/2022 |

OTHER PUBLICATIONS

Ghaemi, et al "A Pub-Sub Architecture to Promote Blockchain Interoperability", arXiv:2101.12331v1, Jan. 29, 2021 (Year: 2021).*

(Continued)

*Primary Examiner* — Suraj M Joshi
(74) *Attorney, Agent, or Firm* — XSENSUS LLP

(57) ABSTRACT

A method for reaching consensus on published data for a publisher-subscriber network, the publisher-subscriber network including a broker circuitry configured to provide a broker, a publisher device that is registered as a publisher for a data category at the broker, and a plurality of subscriber devices, wherein each of the plurality of subscriber devices is registered as a subscriber for the data category at the broker, wherein the publisher-subscriber network is configured to provide a blockchain, wherein the method includes: performing, by the publisher-subscriber network, a consensus reaching process on the published data for storing the published data in the blockchain.

20 Claims, 29 Drawing Sheets

(56) References Cited

U.S. PATENT DOCUMENTS

2020/0126155 A1\* 4/2020 Overholser ............ G06Q 40/04
2021/0105239 A1\* 4/2021 Smith ..................... H04L 51/23

OTHER PUBLICATIONS

3GPP, "Technical Specification Group Services and System Aspects; Proximity-based services (ProSe); Stage 2 (Release 13)", 3GPP TS 23.303 V13.3.0, Mar. 2016, pp. 1-124.

3GPP, "Technical Specification Group Services and System Aspects; System Architecture for the 5G System; Stage 2 (Release 15)", 3GPP TS 23.501 V15.4.0, Dec. 2018, pp. 1-236.

3GPP, "Technical Specification Group Services and System Aspects; Procedures for the 5G System (5GS); Stage 2 (Release 16)", 3GPP TS 23.502 V16.4.0, Mar. 2020, pp. 1-582.

3GPP, "Technical Specification Group Core Network and Terminals; 5G System; Technical Realization of Service Based Architecture; Stage 3(Release 16)", 3GPP TS 29.500 V16.4.0, Jun. 2020, pp. 1-79.

3GPP, "Technical Specification Group Radio Access Network; NR; Multiplexing and channel coding(Release 16)", 3GPP TS 38.212 V16.2.0, Jun. 2020, pp. 1-151.

3GPP, "Technical Specification Group Radio Access Network; NR; NR and NG-RAN Overall Description; Stage 2 (Release 15)", 3GPP TS 38.300 V15.7.0, Sep. 2019, pp. 1-99.

3GPP, "Technical Specification Group Radio Access Network; NR; NR and NG-RAN Overall Description; Stage 2 (Release 16)", 3GPP TS 38.300 V16.5.0, Mar. 2021, pp. 1-151.

3GPP, "Technical Specification Group Radio Access Network; NG-RAN; Architecture description(Release 16)", 3GPP TS 38.401 V16.3.0, Sep. 2020, pp. 1-78.

Zte, "Support of Blockchain for 5G Advanced", 3GPP TSG RAN WG e-Meeting #91-e, Mar. 16-26, 2021, RP-210619, 3 pages.

Wikipedia, "Information security", available online @ https://en.wikipedia.org/wiki/Information_security#Key_concepts, Jun. 30, 2021, pp. 1-51.

Wikipedia, "SHA-2", available online @ https://en.wikipedia.org/wiki/SHA-2, Jun. 30, 2021, pp. 1-9.

Ghaemi et al., "A Pub-Sub Architecture to Promote Blockchain Interoperability", arXiv:2101.12331v1, Jan. 29, 2021, 9 pages.

3GPP, "Technical Specification Group Radio Access Network; Evolved Universal Terrestrial Radio Access (E-UTRA and Evolved Universal Terrestrial Radio Access Network (E-UTRAN); Overall description; Stage 2(Release 15)", 3GPP TS 36.300 V15.2.0, Jun. 2018, pp. 1-357.

International Search Report and Written Opinion mailed on Nov. 21, 2022, received for PCT Application PCT/EP2022/071682, filed on Aug. 2, 2022, 09 pages.

\* cited by examiner

METHOD AND PUBLISHER-SUBSCRIBER NETWORK

CROSS-REFERENCE TO RELATED APPLICATIONS

This application is a national stage application, pursuant to 35 U.S.C. § 371, of International Patent Application No. PCT/EP2022/071682, filed Aug. 2, 2022, which claims priority from European Patent Application No. 21189716.0, filed Aug. 4, 2021, the contents of each are incorporated herein by reference.

TECHNICAL FIELD

The present disclosure generally pertains to a method for reaching consensus on published data for a publisher-subscriber network and a publisher-subscriber network.

TECHNICAL BACKGROUND

Generally, several generations of cellular or mobile telecommunications systems are known such as GSM ("Global System for Mobile Communications"), UMTS ("Universal Mobile Telecommunications System"), LTE ("Long Term Evolution") and the fifth generation ("5G"), which is currently put into practice and further developments are ongoing. The fifth generation is standardized under the control of 3GPP ("3rd Generation Partnership Project").

Moreover, internet-of-things ("IoT") networks are known which basically describe a network of physical objects ("things") that are embedded with sensors, software, and other technologies for the purpose of connecting and exchanging data with other devices and systems over a network such as the Internet.

However, conventional cellular support of IoT networks and architecture is based on bearer type communications and, in a conventional 3GPP network, the security is provided by 3GPP nodes because all the terminals are controlled under the 3GPP network.

Although there exist techniques for internet-of-things networks, it is generally desirable to improve the existing techniques.

SUMMARY

According to a first aspect the disclosure provides a method for reaching consensus on published data for a publisher-subscriber network, the publisher-subscriber network including a broker circuitry configured to provide a broker, a publisher device that is registered as a publisher for a data category at the broker, and a plurality of subscriber devices, wherein each of the plurality of subscriber devices is registered as a subscriber for the data category at the broker, wherein the publisher-subscriber network is configured to provide a blockchain, wherein the method comprises:

performing, by the publisher-subscriber network, a consensus reaching process on the published data for storing the published data in the blockchain.

According to a second aspect the disclosure provides a subscriber device for a publisher-subscriber network, the subscriber device comprising circuitry configured to communicate with a publisher device and a broker circuitry, wherein the circuitry is further configured to:

participate in a consensus reaching process on published data for storing the published data in a blockchain.

According to a third aspect the disclosure provides a publisher device for a publisher-subscriber network, the publisher device comprising circuitry configured to communicate with a plurality of subscriber devices and a broker circuitry, wherein the circuitry is further configured to:

transmit published data and a hash value to the plurality of subscriber devices for performing a consensus reaching process on the published data for storing the published data in a blockchain, wherein the published data include data payload and a data identifier indicating the data category of the data payload; and determine the hash value from at least one of the data payload and the data identifier.

According to a fourth aspect the disclosure provides a publisher-subscriber network, the publisher-subscriber network comprising a broker circuitry configured to provide a broker, a publisher device that is registered as a publisher for a data category at the broker, and a plurality of subscriber devices, wherein each of the plurality of subscriber devices is registered as a subscriber for the data category at the broker, wherein the publisher-subscriber network is configured to provide a blockchain and to:

perform a consensus reaching process on published data for storing the published data in the blockchain.

Further aspects are set forth in the dependent claims, the following description and the drawings.

BRIEF DESCRIPTION OF THE DRAWINGS

Embodiments are explained byway of example with respect to the accompanying drawings, in which.

DETAILED DESCRIPTION OF EMBODIMENTS

Figure 26:
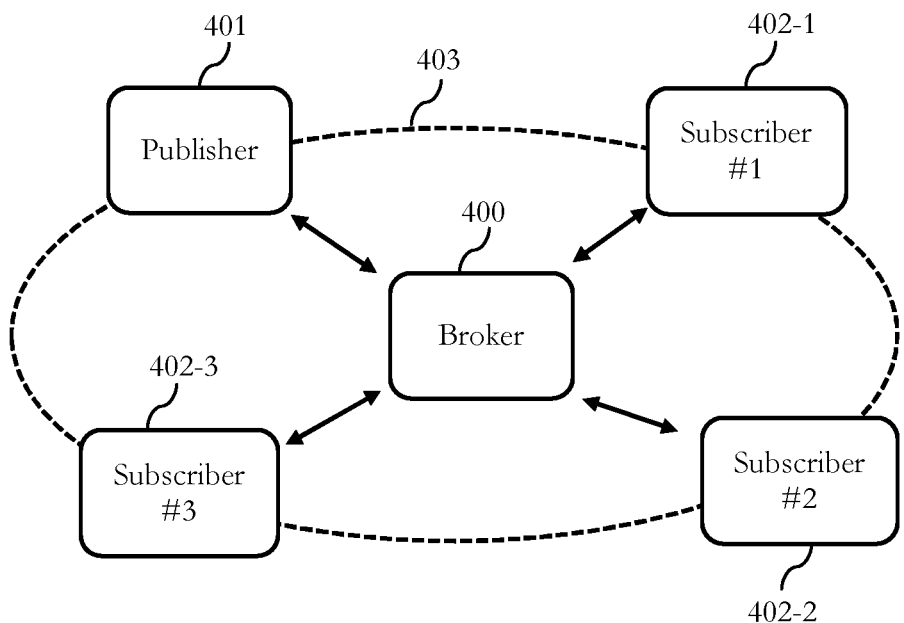
FIG. 26 schematically illustrates in a block diagram a first embodiment of a publisher-subscriber network.

Before a detailed description of the embodiments under reference of FIG. 26 is given, general explanations are made.

The following description is divided in a chapter A and a chapter B.

In chapter A, aspects of the European patent application EP20212742.9 and the European patent application EP21153782.4 are summarized for enhancing the general understanding of the present disclosure. The chapter A discusses embodiments related to general functions and implementations of a publisher-subscriber network for an internet-of-things network.

The embodiments discussed in chapter A also apply to embodiments of a publisher-subscriber network and a method for reaching consensus on published data for a publisher-subscriber network as discussed in chapter B.

A. General Functions

As mentioned in the outset, several generations of cellular or mobile telecommunications systems are known such as GSM ("Global System for Mobile Communications"), UMTS ("Universal Mobile Telecommunications System"), LTE ("Long Term Evolution") and the fifth generation ("5G"), which is currently put into practice and further developments are ongoing. The fifth generation is standardized under the control of 3GPP ("3rd Generation Partnership Project").

Moreover, internet-of-things ("IoT") networks are known which basically describe a network of physical objects ("things") that are embedded with sensors, software, and other technologies for the purpose of connecting and exchanging data with other devices and systems over a network such as the Internet.

Herein, IoT means or includes not only concepts of machine-to-machine communications, it includes also machine-to-human communications (wearable communication) or human-to-human communications (e.g. message service).

However, conventional cellular support of IoT networks and architecture is based on bearer type communications.

Generally, in the conventional cellular IoT architecture (e.g. eMTC ("enhanced machine-type communication") or NB-IoT ("narrowband-IoT")), the communication model between user equipment ("UE") and a network/cloud (server) is one-to-one.

Figure 1:
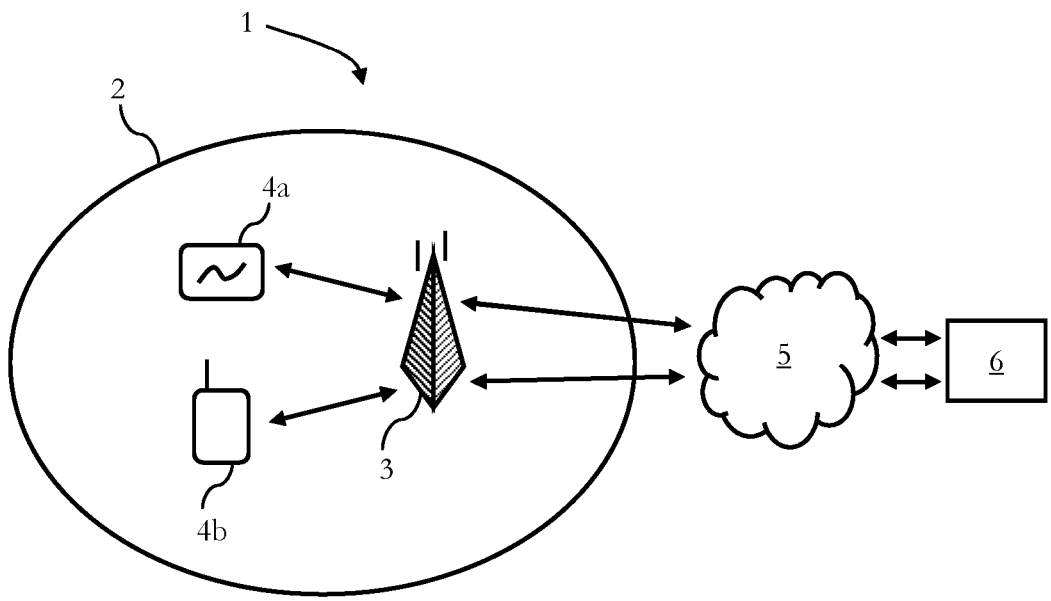
FIG. 1 schematically illustrates an embodiment of a conventional cellular internet-of-things network communication model.

FIG. 1 schematically illustrates an embodiment of a conventional cellular IoT network communication model.

A part of a radio access network 1 ("RAN") is shown where a cell 2 is established by a base station 3 and UE 4a and UE 4b can communicate with the base station 3. For example, the UE 4a is embedded in a sensor and the UE 4b is embedded in a smartphone.

The UE 4a transmits data from the sensor via the base station 3 over cellular network/Internet 5 to a server/cloud 6. The cloud 6 stores the data from the UE 4a in a storage and optionally process it (e.g. big data analysis). When the UE 4b needs to access the stored data, the UE 4b connects to the server 6 and downloads the stored data or processed results.

However, it has been recognized that an IoT network architecture should support various types of connections and a flexible data distribution among multiple devices.

A.I. Broker with Non-Separated User Plane and Control Plane

In the following, some aspects of a broker device of a previous patent application (EP20212742.9) are summarized in order to enhance the general understanding of the present disclosure.

Figure 2:
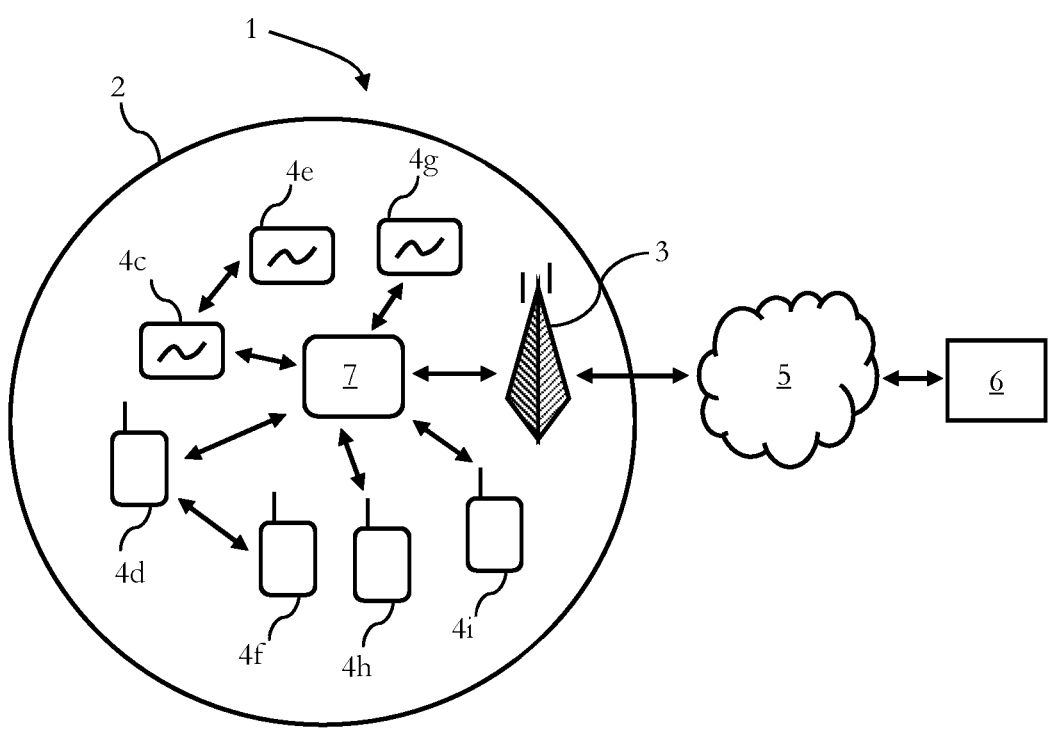
FIG. 2 schematically illustrates a first embodiment of a broker device for an internet-of-things network.

A possible architecture of an IoT network is shown in FIG. 2 which schematically illustrates a first embodiment of a broker device 7 for an IoT network.

The broker device 7 is (logically) located in the center of the IoT network. A plurality of IoT devices 4c-i directly or indirectly (i.e. multi-hopping) connect to the broker device 7. Moreover, the broker device 7 connects to the cloud 6 via (3GPP) network/Internet 5.

The broker device 7 supports a function of a relay between the IoT devices 4c-i and the cloud 6 and between an IoT device of the plurality of IoT devices 4c-i and another IoT device of the plurality of IoT devices 4c-i.

The broker device 7 provides a function of inter-wireless technologies, for example, data transfer from an IoT device 4c supporting ZIGBEE® to a UE 4d supporting device-to-device ("D2D") communication via the broker device 7. Moreover, an IoT device 4g supporting Bluetooth®, a UE supporting 3GPP (LTE/NR ("New Radio")) radio interface ("Uu") and an IoT device 4i supporting Wi-Fi® connect to the broker device 7.

It has been recognized that the IoT network should flexibly distribute data among multiple devices in the IoT network. For example, a door sensor in a home connects to an IoT network. When the door sensor detects that a door is open, the door sensor needs to indicate the status of the door to other home or personal devices in the home such as air conditioner, heater, surveillance camera, security device and the like. The information from a sensor can be shared with multiple devices for multiple purposes. Thus, it has been recognized that an architecture of communication which is suitable for this type of use cases should allow a flexible data distribution among multiple devices in the IoT network.

In order to support efficient communication for a broker device (for an IoT network) in a (3GPP) network, a publish subscriber model ("pub-sub model") is adapted for the IoT network.

Generally, the pub-sub model basically has three (logical) entities which are a publisher, a subscriber and a broker. The subscriber requests or indicates (a) data (category) or service which it requires to the broker. Typically, it is called a "topic". When the publisher sends the data (of the data category) to the broker and the broker distributes the data from the publisher to one or more subscribers which require the data (of the data category).

However, the pub-sub model is not yet supported by 3GPP which may be due to the idea that a telecom network service provides the bearer (point-to-point connection).

In contrast to the conventional point-to-point architecture, the pub-sub model allows decoupling the relation between a sender and a receiver. In the pub-sub model the relation is flexible/changeable and predetermined/fixed relations are not required. For example, the publisher does not have to know the subscriber's destination address in advance. A subscriber may be flexibly added/deleted in the IoT network. The broker should manage the data distribution. Vice versa, the subscriber does not have to know the source address of the publisher. The subscriber simply registers the subscription of required data or service. The pub-sub model may allow in principle handling of any number of devices.

Hence, a pub-sub model architecture for an IoT network in a (3GPP) network is discussed herein.

As mentioned above, conventionally, a 3GPP network assumes bearer type communication, which is point-to-point connection between a user equipment and a core network gateway.

Thus, it has been recognized that a data distribution via a broker may be required to adapt the pub-sub model for an IoT network in 3GPP networks.

The IoT network may require the following high-level functions to support pub-sub model:
  Discovery, assistance of finding the IoT network,
  Publisher (UE) registration to IoT network,
  Subscriber (UE) registration to IoT network, and
  Distribution of data from publisher to subscribers via a broker.

Generally, the IoT network may include machine-to-machine communications (e.g. between a sensor and an actuator or the like), machine-to-human communications (wearable communications, e.g., communications of wearable devices such as a smart watches, smart glasses, body sensors, etc. with and over a smartphone of a user) and human-to-human communications (e.g. messaging service). Examples of IoT networks include a smart home network, a smart factory network, a network of (personal) wearable devices, etc.

Figure 3:
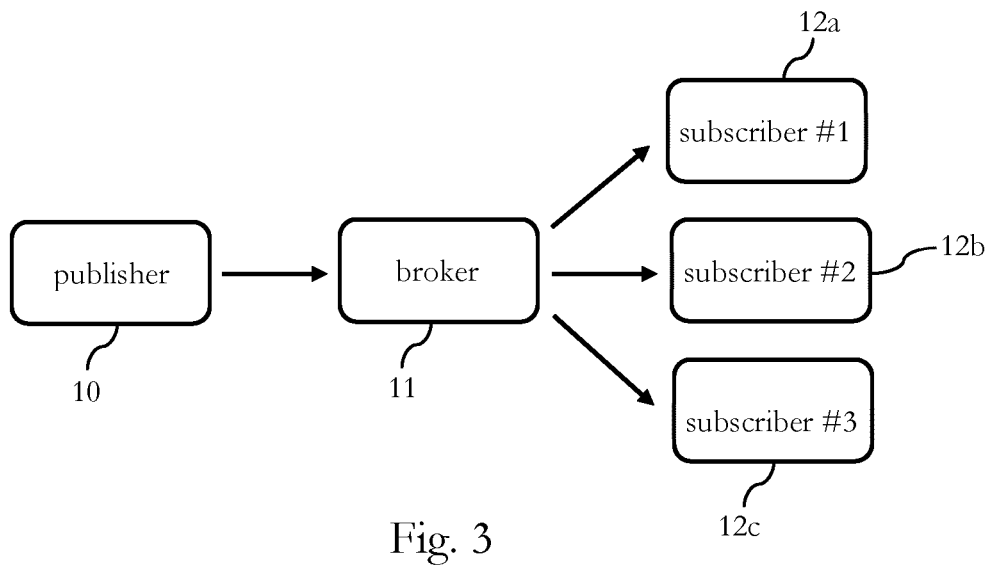
FIG. 3 schematically illustrates in a block diagram an embodiment of a publisher-subscriber model for an internet-of-things network.

For enhancing the general understanding of the present disclosure, FIG. 3 schematically illustrates in a block diagram an embodiment of a publisher-subscriber model for an internet-of-things network.

There are three logical roles: a publisher 10, a broker 11 and a subscriber 12a-c. The publisher 10 associated with a publisher device transmits published data to the broker 11. The broker 11 transmits at least data payload of the published data to at least one subscriber 12a-c associated with a subscriber device.

For example, the publisher (role) 10 is associated with a wireless device such as a sensor or a data generator and the subscriber (role) 12a-c is associated with one or more home devices which use the published data from the publisher 10 via a wireless connection. The broker (role) 11 is associated with an intermediate device which supports pub-sub functions.

Generally, there may be various ways of physical implementation of the three logical roles as shown in FIG. 3. For example, a broker device supports all broker functions and supports connectivity including small cell, core network and application.

The broker device may be an IoT hub which distributes data between publisher and subscribers based on a publisher-subscriber method for data distribution (in accordance with publisher-subscriber model).

The publisher device may be an actuator, a sensor, a smartphone, a wearable device, a factory machine, etc.

The subscriber device may be an actuator, a sensor, a smartphone, a wearable device, a factory machine, etc.

The data payload or the published data may be transmitted to the at least one subscriber device of the plurality of subscriber devices based on a user defined function, a pre-definition with an implicit rule, a mapping table kept at the broker device or on server or the like, etc.

A.I.1 Physical Block and Connectivity:

The broker device may connect to a(n) (external) network (i.e. telecom network) via a communication link such as via air interface (Uu) or Integrated and access backhaul ("IAB"). Alternatively or additionally, the broker device may connect via another interface such as landline Internet access (e.g. GE PON).

The broker device may have full broker function, which is self-sufficient model. Some of the logical broker functions may be implemented in multi-access edge computing ("MEC"), for example, coordination with non-3GPP interfaces.

The broker device may communicate with one or more publisher devices and with a plurality of subscriber devices. The broker device may have a communication interface which supports multiple communication technologies.

In terms of wireless technology support, the broker device may support multiple technologies including non-3GPP standards. The broker device may be, basically, a converter/bridge from one wireless technology to another wireless technology.

In terms of 3GPP interface support, the broker device may support Uu (LTE, NR) and PC5 (D2D).

A subscriber device and a publisher device may connect to the broker device via air Uu interface ("air interface"). The broker device may have the Small Cell of eNB/gNB ("eNodeB"/"next-generation eNodeB") including the core network protocol. In addition or alternatively, the subscriber device and the publisher device may connect to the broker device via PC5 interface. The broker device may have Sidelink Relay.

In terms of non-3GPP interface support, the broker device may support non-3GPP wireless interface such as Wi-Fi, Bluetooth, ZIGBEE and so on. The subscriber device and the publisher device may connect to the broker device with different wireless technologies.

In order to support data distribution between publisher and subscribers based on a publisher-subscriber method, the broker device should support pub-sub functions.

A.I.2 Publisher-Subscriber Functions

The broker device may basically implement three parts: publisher (device) handling (publisher functions), subscriber (device) handling (subscriber functions) and common functions.

The publisher functions handle discovery of the IoT network, publisher registration and data reception.

The subscriber functions handle subscriber registration and data distribution. The data distribution function supports two types of data distribution methods, one is polling (pull) based (pull type data distribution), the other is push based (push type data distribution). Polling/Pulling means that a subscriber device checks an arrival of published data in a buffer of the broker device and retrieves it when relevant data (e.g. data payload of a data category the subscriber device is registered for) is stored. Pushing means that the broker device transmits the data to a registered subscriber device when relevant data for the subscriber device has arrived.

The common functions handle a mapping table that stores a relation between publisher and subscriber(s), a data distribution policy (push/pull type, priority, QoS ("Quality of Service")), a temporary buffer of data, etc.

In the following, embodiments of the functions and processes and the structure of data/information are discussed in order to enhance the general understanding of the present disclosure.

A.I.2.1 Publisher Functions:

a) Discovery (of IoT network): in some embodiments, the broker device transmits (e.g. broadcast) a discovery signal (message describing sub-network within a network) indicating that the IoT network is in operation to potential publisher devices.

The discovery signal (message describing sub-network within a network) may include a unique network ID (network identifier) such as personal network ID, closed subscriber group (CSG) ID, sidelink source ID, service set identifier (SSID) of Wi-fi, Personal Area Network identifiers (PAN ID) in ZIGBEE and the like.

The discovery signal may transmit the broadcast method such as system information of NR, discovery signal of 3GPP sidelink and the like.

When a publisher device detects the discovery signal of the IoT network, it may start the registration at the broker device.

This process may be omitted if the IoT network is pre-configured (e.g. configuration is stored in SIM card).

b) Publisher registration: in some embodiments, the publisher device may transmit a publisher registration request including a publisher device identifier for registering as a publisher for a data category. Generally, a data category of a data payload (e.g. sensor data) indicates common characteristics or features of the data payload. The data category of the data payload may be indicated by a data identifier. The publisher registration request may include a list of supported communication technologies or interfaces (e.g. Uu, Wi-Fi, etc.). The list may be stored in a mapping table when registered.

The broker device may authenticate, in response to the publisher registration request, the publisher device which requested to register as a publisher.

Once authenticated the broker device may issue a publisher identifier.

When the publisher device receives the publisher identifier, it may send the metadata (information on generated data payload) to the broker device. Generally, the metadata describe or characterize or define the data category of the data payload and allow to issue a data identifier that indicates the data category of the data payload. The metadata may support selection of the subscription of data for subscriber devices. The metadata may suggest to the broker device how to distribute the data payload.

The metadata may include:
  a name of the data payload (e.g. "T" if the publisher device is a temperature sensor);
  a name of a topic or category of the data payload (e.g. "temperature data");
  information structure and semantics (it may be defined by another specification);
  a data generation period or preferable delivery schedule (or aperiodic, event driven, etc.);
  a required QoS ("Quality of Service", e.g., whether time sensitive network ("TSN") is required, latency, reliability, delay, etc.);
  terms and conditions for subscription (restriction of subscriber, charged data or free of charge);
  security information.

The broker device may issue the data identifier (e.g. "periodic temperature data") corresponding to the metadata. The publisher device (may) include(s) the data identifier when it transmits the data payload to the broker device. The publisher identifier is a unique id for a publisher device. The number of data identifiers may be more than one if a publisher device generates different type of data payload. The data identifier could be called topic identifier. Generally, in a publisher-subscriber context a data distinctive may be called a topic and accordingly the data identifier may be called a topic identifier.

c) Data Reception (from the Publisher Device to the Broker Device):

The broker device receives the published data from the registered publisher device, wherein the published data include the data payload and the data identifier indicating the data category of the data payload. The published data may include the publisher identifier.

The broker device may store the published data in a buffer.

The broker device distributes at least the data payload to registered subscribers (further discussed below).

A.I.2.2 Common Functions:

The broker device stores or keeps a mapping table.

a) Mapping table: the mapping table may generally be used for identifying and registering the subscribers and publishers at the broker device and for identifying the subscribers for the data category of a data payload received from a publisher. Generally, the mapping table may be a kind of database for keeping the relation between a publisher and a subscriber(s).

The mapping table may store the relation between the publisher identifier and the publisher device identifier.

It may store the relation between the data identifier and the metadata.

It may store the relation between the publisher identifier and the data identifier. The broker device may register the publisher device as a publisher for the data category by storing the relation between the publisher identifier and the data identifier.

It may store the relation between the subscriber identifier and the subscriber device identifier.

It may store the relation between the subscriber identifier and the data identifier. It may store the relation between the subscriber identifier, the data identifier and the publisher identifier.

It may store the relation between the data identifier and the data distribution policy.

It may store the history of subscription like received data and data volume for the purpose of charging.

b) Data distribution policy function: the distribution policy may store the requirements of data distribution and related information to support data distribution. The broker may distribute the data based on it.

It may store a requirement for data distribution (e.g. latency, reliability, TSN support and the like).

It may store whether data is periodic data or aperiodic data.

It may store whether polling (pull) type data distribution or push type data distribution is supported.

c) Buffer: the buffer may temporarily store the published data from the publisher device because there may be some delay between data reception from the publisher device and the data distribution to the subscriber(s). In some embodiments, the data payload or the published data is received/transmitted based on synchronous communication (real-time) or based on asynchronous communication (time delay/lag). In some embodiments, the broker device includes a buffer storage configured to temporarily store data payload or published data from one or more publisher devices. Generally, a large buffer may support for asynchronous operation, which has a time lag between sender and receiver (e.g. polling).

A.I.2.3 Subscriber Functions:

a) Subscriber registration: the broker device may generate assistance information of a data category (advertisement of published data for potential subscribers) available for distribution based on the received metadata corresponding to the data category. The assistance information includes the data identifier and at least one characteristic selected from the received metadata.

The broker device may transmit the assistance information of published data (e.g. data identifier and period of data generation) to a plurality of subscriber devices (potential subscribers).

The broker device may transmit the message describing sub-network within a network indicating that the IoT network is in operation to the plurality of subscriber devices.

A subscriber device may receive the message describing sub-network within a network (e.g. network discovery signal).

A subscriber device may receive the assistance information:

If the subscriber device detects a required data category based on the assistance information, the subscriber device may transmit a subscriber registration request for registering as a subscriber for the data category to the broker device.

The subscriber registration request may include a subscriber device identifier, the requested data category, i.e. the data identifier, and may further include an additional condition for data reception (e.g. not allowed to use push type communication) and an indication whether the subscriber device supports a sleep-state. The subscriber registration request may include a list of supported communication technologies or interfaces (e.g. Uu, Wi-Fi, etc.). The list may be stored in the mapping table when registered.

The broker device may authenticate the subscriber device.

Once authenticated, the broker device may issue a subscriber identifier. The subscriber identifier is unique for a subscriber device.

The broker device may register the authenticated subscriber device as a subscriber for the data category. The broker device may register the subscriber device as a subscriber for the data category by storing the data identifier and the subscriber identifier in association with each other as the relation between the data category and the subscriber for the data category in the mapping table.

b) Data Distribution:

The broker device may determine a wireless interface (e.g. D2D, Wi-Fi, ZIGBEE and the like) based on the mapping table:

If the subscriber device supports sidelink (PC5), the broker device may broadcast or groupcast the data payload to the subscriber devices.

If the subscriber device supports Uu, the broker device may transmit the data payload with unicast communication.

The broker device may select a type of data distribution based on the data distribution policy.

Based on subscriber's preference.

Based on publisher's preference.

Push or pull type communication.

Optionally, the subscriber device may transmit back to the broker device a confirmation of successful data distribution.

In the following embodiments of the push type data distribution and the pull type data distribution is discussed.

The broker device may use of 3GPP functions (e.g. paging, WUS ("wake-up signal")) for efficient communication and power saving.

Push type data distribution:

If the subscriber device has a capability of sleeping (supporting a sleep state; e.g. power saving for stand-by), the broker device may transmit the wake-up signal (WUS) or paging message to the subscriber devices and afterwards the broker device transmits the data payload.

When periodic data generation or arrival is configured, the subscriber device wakes up the same time window with a (predetermined) periodicity. The broker device transmits buffered data to the subscriber device(s) in line with time window of periodicity.

Push type communication may support group indication. For example, the broker device transmits a wake-up signal for multiple subscriber devices which belong to the same group. In case of periodic transmission, multiple subscriber devices may have the same timing pattern of wake-up and simultaneously receive the same data payload from the broker device.

Polling (pull) type data distribution:
- The subscriber device may regularly check a buffer status of the broker device whether the published data/data payload of subscribed data category is ready or not and retrieve it when it is ready (e.g. instruct the broker device to transmit it). Alternatively, the broker device may broadcast the buffer status whether the published data/data payload of subscribed data category is ready or not.
- The subscriber device may request the data payload from the broker device if the data has been arrived in the buffer.
- The broker device may transmit the data payload to the requesting subscriber device.

Generally, a publisher-subscriber model for an IoT network (and thus a publisher-subscriber method for data distribution) is discussed herein. The publisher-subscriber model may support a flexible relation between a sender (publisher) and at least one receiver(s) (subscriber) instead of conventional point-to-point (bearer) communication model. It may support easy sharing of data among multiple subscriber devices which require published data.

As discussed, the broker has all the control functions to use the pub-sub model for an IoT network such as handling of publisher, subscriber, network discovery and so on. However, the existing 3GPP communication functions may be useful for data transfer (user plane function) like D2D (device-to-device communication).

Generally, in known communication systems, the control plane is basically associated with the user plane. Both user plane traffic and control plane traffic are handled in the same path (e.g. in-band DTMF ("dual-tone multi-frequency") dial tone). The node (e.g. telephone switch) processes both control plane and user plane. However, in conventional nodes whose control plane and user plane are not separated, the node capacity may have to be increased for both control plane and user plane when the user plane traffic is increased. Therefore, it may not be so flexible to add/deploy nodes.

Hence, it has been recognized that the user plane and the control plane should be separated for the publisher-subscriber model for an IoT network.

Basically, this section A.I summarized the general functions of publisher-subscriber models for IoT networks, which also applies to other embodiments discussed in the next sections of the present disclosure.

A.II. Broker with Separated User Plane and Control Plane

In the following sections A.II to A.V, a separation of control plane and user plane for publisher-subscriber model, protocols and procedures are discussed. Existing 3GPP mechanisms are reused for publisher-subscriber model as much as possible, in some embodiments.

Figure 4:
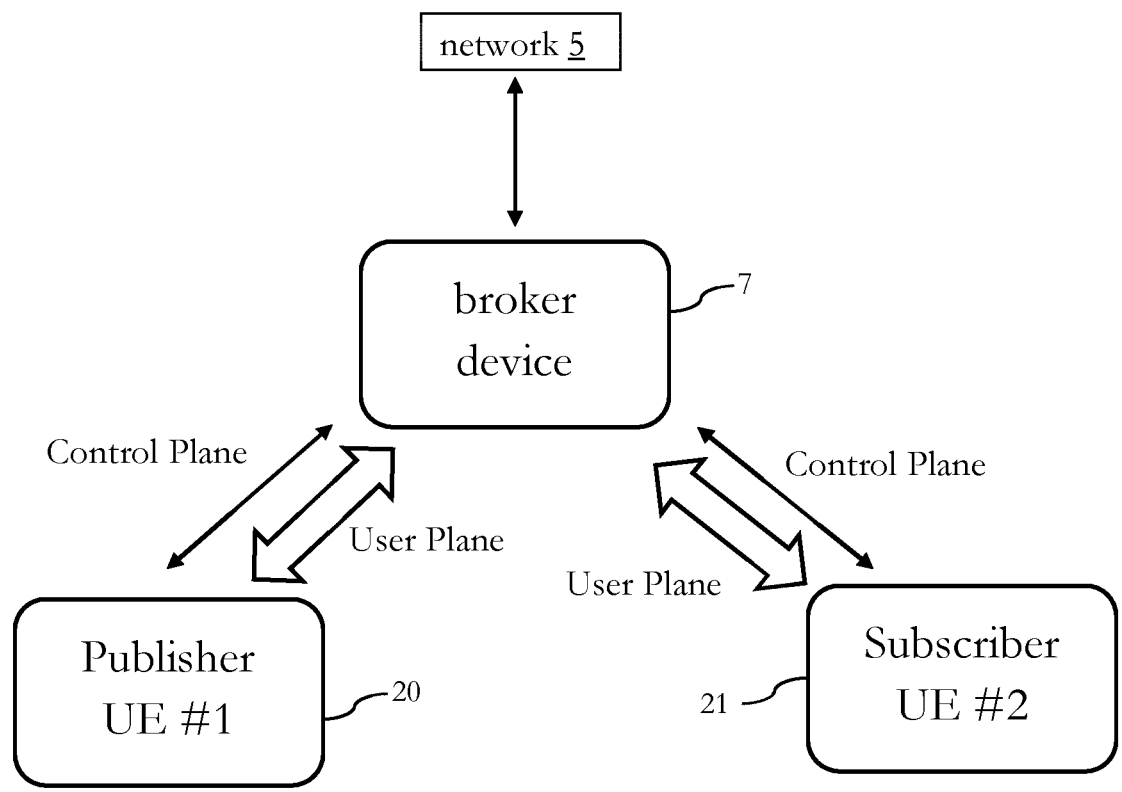
FIG. 4 schematically illustrates in a block diagram an embodiment of a broker for an internet-of-things network in which a user plane and a control plane are not separated.

For enhancing the general understanding of the present disclosure and for the purpose of comparison, FIG. 4 schematically illustrates in a block diagram an embodiment of a broker for an internet-of-things network in which a user plane and a control plane are not separated.

Here, the broker is provided by the broker device 7 which is discussed in section A.I, for example, under reference of FIG. 2.

As depicted in FIG. 4, both the user plane and the control plane are established between a publisher device 20 and the broker device 7 (thus, between a publisher and the broker) and between a subscriber device 21 and the broker device 7 (thus, between a subscriber and the broker).

In this architecture, the publisher device 20 does not directly communicate with the subscriber device 21. The control plane handles establishment of the user plane connection and resource allocation and provides some security mechanisms for the user plane.

However, as mentioned above, it has been recognized that a separation of user plane and control plane may allow a more flexible adaption of node capacity, for example, the capacity for each plane may be increased depending on the traffic demand, since the node capacity for the user plane may be increased without a change of the node capacity of the control plane.

Figure 5:
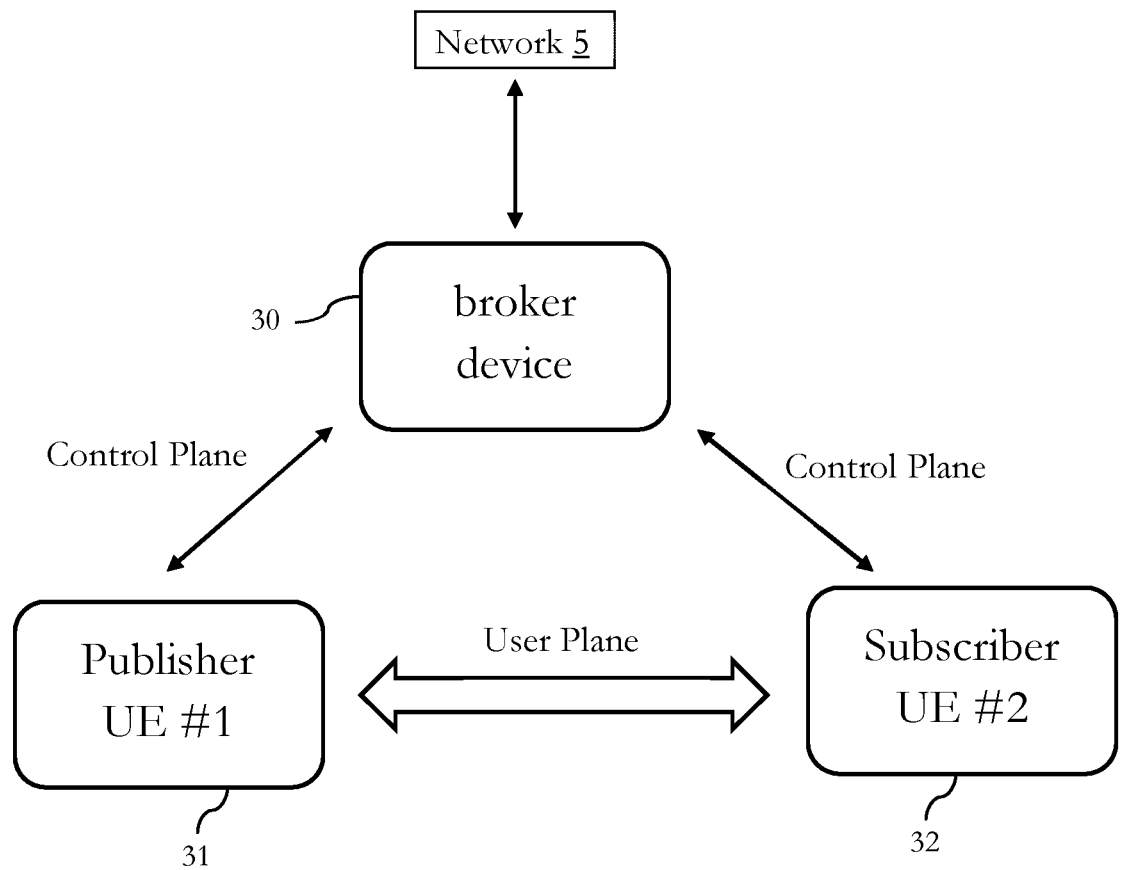
FIG. 5 schematically illustrates in a block diagram an embodiment of a broker for an internet-of-things network in which a user plane and a control plane are separated.

For comparison, FIG. 5 schematically illustrates in a block diagram an embodiment of a broker for an internet-of-things network in which a user plane and a control plane are separated.

Here, the broker is provided by a broker device 30 in which the user plane and the control plane are separated by supporting direct communication between a publisher device 31 and a subscriber device 32.

In this architecture, the control plane is established between the publisher device 31 and the broker device 30 (thus, between a publisher and the broker) and between the subscriber device 32 and the broker device 30 (thus, between a subscriber and the broker), and the user plane is established between the publisher device 31 and the subscriber device 32. This may provide an efficient data flow based on direct communications, for example, by using 3GPP D2D communications.

The broker device 30 here is a physical IoT hub in which the control functions (e.g. pub-sub functions as described in section A.I) are implemented.

However, at least parts of the pub-sub functions may be deployed in the network 5, e.g. on an MEC (server), such that a distributed broker is provided. For example, the registering of publishers and subscribers may be deployed in the network 5.

Generally, the control plane and the user plane are separated from each other in terms of logical functions, in terms of physical nodes or in terms of logical functions and physical nodes. As mentioned above, it may be flexible to increase the capacity for each plane depending on the traffic demand because the node capacity for user plane could be increased without change of node for control plane. In addition, each physical node could be deployed in separate location. For example, user plane function could be deployed near end-user, the control plane function could be deployed to center of the network. This may be useful for network virtualization because the network function is implemented with software and deployed in the cloud instead of conventional physical node.

Consequently, some embodiments pertain to a broker circuitry, wherein the broker circuitry is configured to communicate with one or more publisher devices and with a plurality of subscriber devices, wherein an internet-of-things network is based on a publisher-subscriber method for data distribution between the one or more publisher devices and the plurality of subscriber devices, wherein a publisher device of the one or more publisher devices is registered as a publisher for a data category at a broker in the internet-of-things network and at least one subscriber device of the plurality of subscriber devices is registered as a subscriber for the data category at the broker in the internet-of-things network, wherein the broker circuitry is further configured to: provide the broker, wherein a control plane and a user plane are handled separately.

The broker circuitry may be a broker circuitry for an internet-of-things network. The broker circuitry may include at least one of: a microprocessor, an application processor, a memory/data storage, a radio interface (e.g. Uu, IAB, PC5 (D2D), etc.), a wireless interface (e.g. Wi-Fi, ZIGBEE, Bluetooth, etc.), a network interface, and the like (see, for example, FIG. 24). The broker circuitry may have Small Cell including the core network protocol of LTE ("Long Term Evolution"), NR ("New radio"), and the like. The broker circuitry may have a Sidelink Relay. The broker circuitry may implement ProSe ("Proximity-based services"). The broker circuitry may support LTE-M (LTE-MTC ("Machine Type Communication")) and may support NB-IoT ("Narrowband IoT") communications.

The broker circuitry may implement (corresponding) communication protocols for communicating over the radio interface, the wireless interface and the network interface.

Generally, the broker circuitry may include typical electronic components to achieve the functions as described herein. For example, the broker circuitry may be based on or may include or may be implemented as integrated circuitry logic, a CPU (central processing unit), a GPU (graphical processing unit), an FPGA (field programmable gate array) or the like.

The functionality may be implemented by software executed by a processor or the like. The functionality may be implemented in parts by software and in parts by hardware.

The broker circuitry may be located in a broker device such as an IoT hub, a smartphone, a router or the like. The broker circuitry may implement or may be deployed as multi-access edge computing ("MEC") (server) in a network. The broker circuitry may be distributed over a broker device (e.g. in customer premises) and a MEC in the network.

The publisher device may be an actuator, a sensor, a smartphone, a wearable device, a factory machine, etc. The publisher device may implement (corresponding) communication technologies for communicating with the broker circuitry. The publisher device may implement PC5 (D2D) for communicating directly with the subscriber device (or more subscriber devices).

The subscriber device may be an actuator, a sensor, a smartphone, a wearable device, a factory machine, etc. The subscriber device may implement (corresponding) communication technologies for communicating with the broker circuitry. The subscriber device may implement PC5 (D2D) for communicating directly with the publisher device (or more publisher devices).

In some embodiments, the control plane and the user plane are handled separately in terms of logical functions and physical nodes.

In some embodiments, the control plane handles control functions, wherein the control functions include controlling of connections with the one or more publisher devices and the plurality of subscriber devices.

In some embodiments, the control plane handles control functions, wherein the control functions include registering of the one or more publisher devices as publishers and the plurality of subscriber devices as subscribers at the broker in the internet-of-things network.

In some embodiments, the user plane handles a data transfer between the publisher and the subscriber, wherein the data transfer includes transferring of at least data payload of the data category from the publisher device of the one or more publisher devices to the at least one subscriber device of the plurality of subscriber devices.

In some embodiments, the control plane handles the control functions by at least one of a broker device and a network broker circuitry in a network.

As mentioned above, the broker device may be a physical device such as an IoT hub, a smartphone, a router, or the like, which includes the broker circuitry or implements the functions of the broker circuitry.

The network broker circuitry is an electronic circuitry such as the broker circuitry or part of the broker circuitry when it is implemented or deployed in the network, e.g., as multi-access edge computing ("MEC") (server) in the network.

In some embodiments, the user plane handles the data transfer by one of a relay, a network broker circuitry in a network and a direct communication path between the publisher device of the one or more publisher devices and the at least one subscriber device of the plurality of subscriber devices based on allocated sidelink resources.

Further embodiments, procedures for user plane communications, user plane and control plane protocol stacks are discussed in the next sections.

For enhancing the general understanding of the present disclosure, some terminology is summarized in the following:

Broker: Broker is the logical functions of the publisher-subscriber protocol. It could be in the customer premises or somewhere in the network or a combination thereof.

IoT hub: IoT hub is a physical hardware for customer. The IoT hub may have partial or full broker functions (e.g. pub-sub functions).

Relay: Relay supports multiple wireless interfaces for customer premises. It is a relay function such as D2D relay, smartphone, and hardware for IoT hub.

Generally, in terms of network deployment, user plane may be implemented in near end-user, and control plane may be implemented in the network. The deployment of network node is flexible. The broker function may be virtually provided somewhere in the network. Support for the direct communication between a publisher UE and a subscriber UE(s) is provided, where the user plane and control plane can be implemented separately.

In terms of efficiency of data forwarding, direct communication from a publisher to a subscriber(s) may be more efficient than the communication via relay.

A.III. Broker Device Supporting Direct Communications Between Publisher and Subscriber In this section, a physical implementation of the broker functions (control functions and data transfer) is described, wherein two different embodiments of the physical implementation are discussed in the following.

In general, a typical implementation of the broker functions may be in an IoT hub and there are different hardware options for implementation of the IoT Hub. For example, IoT hub could be in an integrated box like home Wi-Fi router to connect landline internet service provider (it is called Customer-premises equipment (CPE)) or as a separated device. Another example is to use a smartphone as IoT Hub and connect to 3GPP network.

A first embodiment of the physical implementation is discussed under reference of FIG. 6, FIG. 7, FIG. 8 and FIG. 9.

Figure 6:
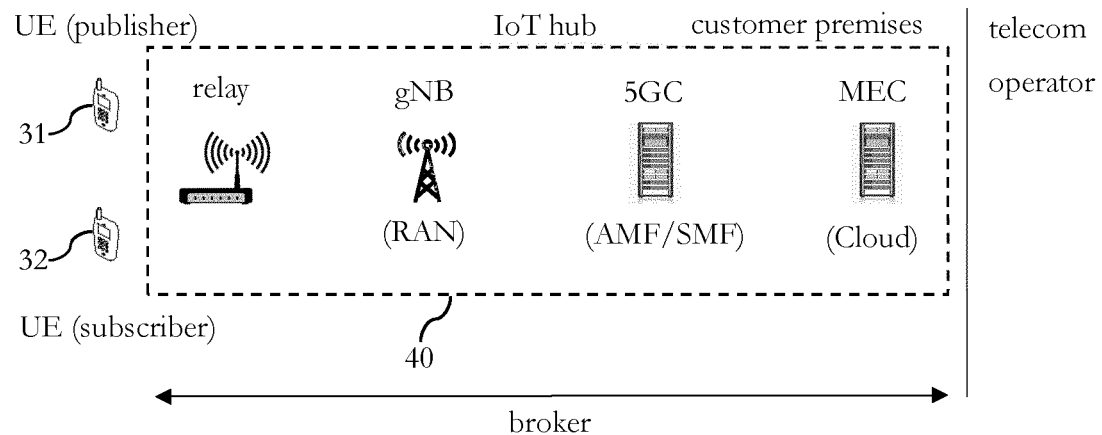
FIG. 6 schematically illustrates a second embodiment of a broker device for an internet of things-network.

Referring to FIG. 6, there is schematically illustrated a second embodiment of a broker device 40 for an internet of things-network corresponding to the first embodiment of the physical implementation.

The broker device 40 is an IoT hub and based on a Customer-premises equipment (CPE) implementation. All broker functions (including control functions) are implemented inside the broker device 40 and the broker device 40 has the function of 3GPP Small Cell and MEC and, thus, the broker device 40 provides the broker. For external network connection, the broker device 40 may connect to telecom operator with landline access.

A publisher device 31 that is registered as a publisher for a data category at the broker device 40 can provide data payload of the data category to a subscriber device 32 that is registered as a subscriber at the broker device 40, wherein data forwarding is handled by the broker device 40, as will be discussed below under reference of FIG. 7 and FIG. 9.

Generally, this implementation may be useful if the broker device 40 is out of coverage of a base station such as a gNB ("next generation eNodeB") or in different spectrum (e.g. macro cell is FR1, small cell of IoT hub is FR2) because a small cell at home should be in charge of radio resource management and no interference is expected to in the macro cell.

Figure 7:
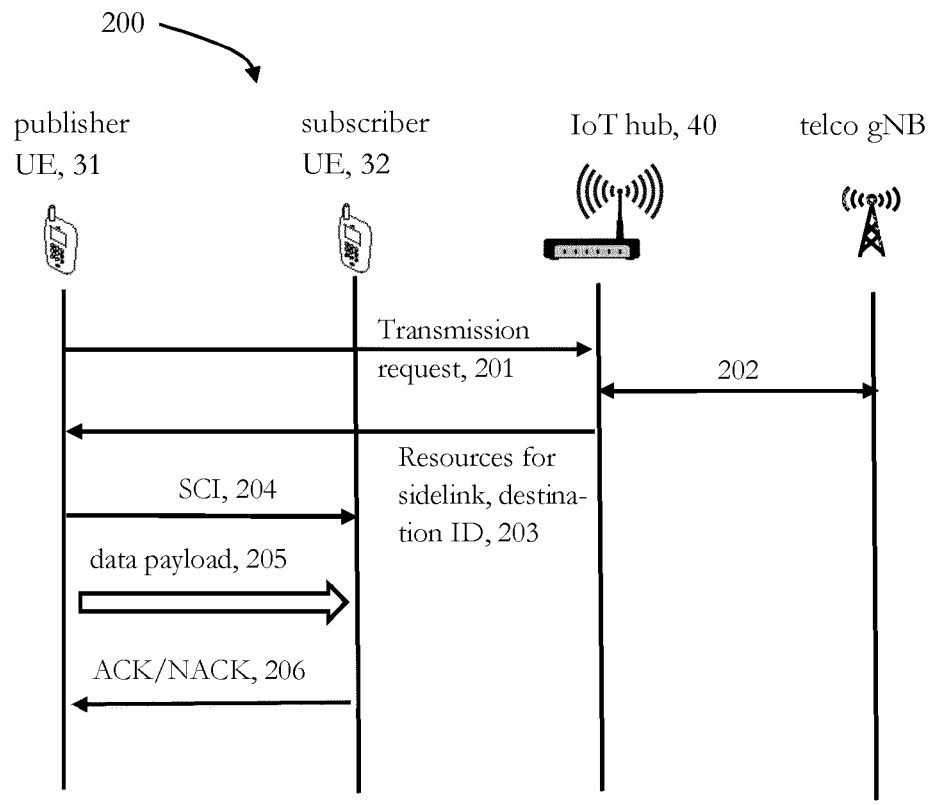
FIG. 7 schematically illustrates in a flow diagram a first embodiment of a publisher-subscriber method.

FIG. 7 schematically illustrates in a flow diagram a first embodiment of a publisher-subscriber method 200 for data distribution between a publisher device 31 and a subscriber device 32.

In this embodiment, the existing NR sidelink procedure is reused as much as possible, but an adapted pub-sub procedure is proposed to minimize impact on current 3GG specifications.

Before discussing the publisher-subscriber method 200 in detail, a brief summary of the existing NR sidelink (D2D) procedure is given for comparison.

Firstly, a D2D (sidelink) UE ("User Equipment") sends the resource related parameters and the information which is required for demodulation such as modulation and coding (MCS) in SCI format 1 to another D2D (sidelink) UE. Secondly, the D2D (sidelink) UE sends the address like source ID, destination ID in SCI format 2 A/B (see 3GPP TS 38.212 V16.2.0 (2020-06), 8.4.1.1 and 8.4.1.2). It is ready for receiver D2D (sidelink) UE to receive the data. Finally, UE sends the data to one or more D2D (sidelink) UEs.

The publisher-subscriber method 200 is an example of D2D unicast (one-to-one communication) from a publisher device 31 (publisher UE) to a subscriber device 32 (subscriber UE).

The publisher device 31 and the subscriber device 32 are registered at the broker device 40 in advance.

At 201, when the publisher device 31 is ready to send data payload of a data category, the publisher device 31 sends a transmission request to the broker device 40 to request sidelink resources and a destination identifier from the broker device 40.

Optionally, at 202, if the broker device 40 is in coverage of a gNB which is in charge of resource allocation, the broker device 40 (may) request the sidelink resources from the gNB.

At 203, the broker device 40 allocates the destination identifier based on a mapping table of publishers and subscribers (or based on a user defined function or a pre-definition with an implicit rule). Note: The subscriber device 32 is allocated a destination identifier in advance (e.g. during registration).

Further at 203, the broker device 40 allocates the requested sidelink resources to the publisher device 31 and the destination identifier of relevant subscribers (including the subscriber device 32).

At 204, the publisher device 31 sends control information (SCI). For example, SCI format 2-A is used for unicast mode and HARQ feedback is enabled.

At 205, the publisher device 31 sends at least the data payload to the subscriber device 32. The publisher device 31 may include a data identifier indicating a data category of the data payload.

At 206, the subscriber device 32 sends back the acknowledgement (ACK or NACK).

If the publisher device 31 receives the NACK, it (may) resend the data payload.

Figure 8:
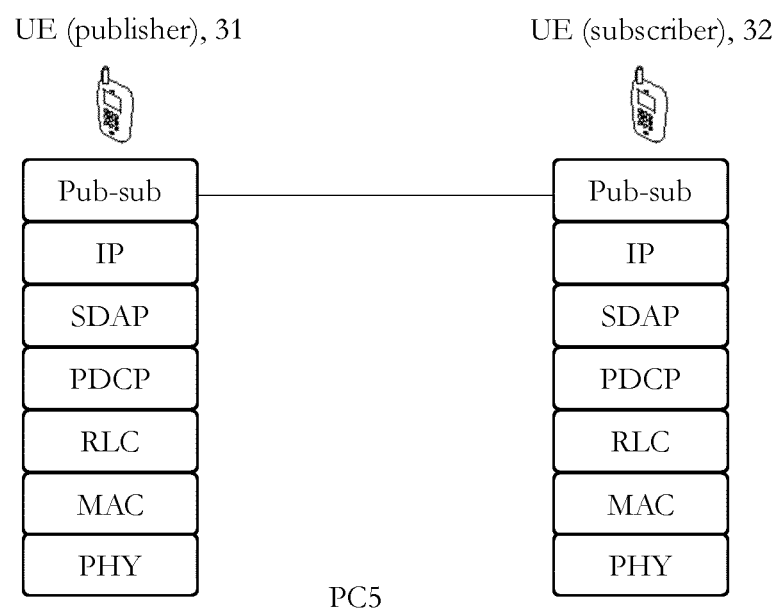
FIG. 8 schematically illustrates in a block diagram a first embodiment of a user plane protocol stack.

FIG. 8 schematically illustrates in a block diagram a first embodiment of a user plane protocol stack for direct communication.

An embodiment with direct communication for user plane has been discussed, for example, above under reference of FIG. 7 for unicast mode.

The user plane is in charge of actual data transfer from publisher to subscriber(s).

In terms of user plane, this is a reuse of existing sidelink communication (see 3GPP TS 23.303 V13.3.0 (2016-04), 5.1.2.1) user plane protocol stack.

However, a new protocol layer (pub-sub layer or publisher-subscriber layer) is proposed, which supports pub-sub model and is introduced on top of the current 3GPP protocols, which also applies to other embodiments of the present disclosure.

Figure 9:
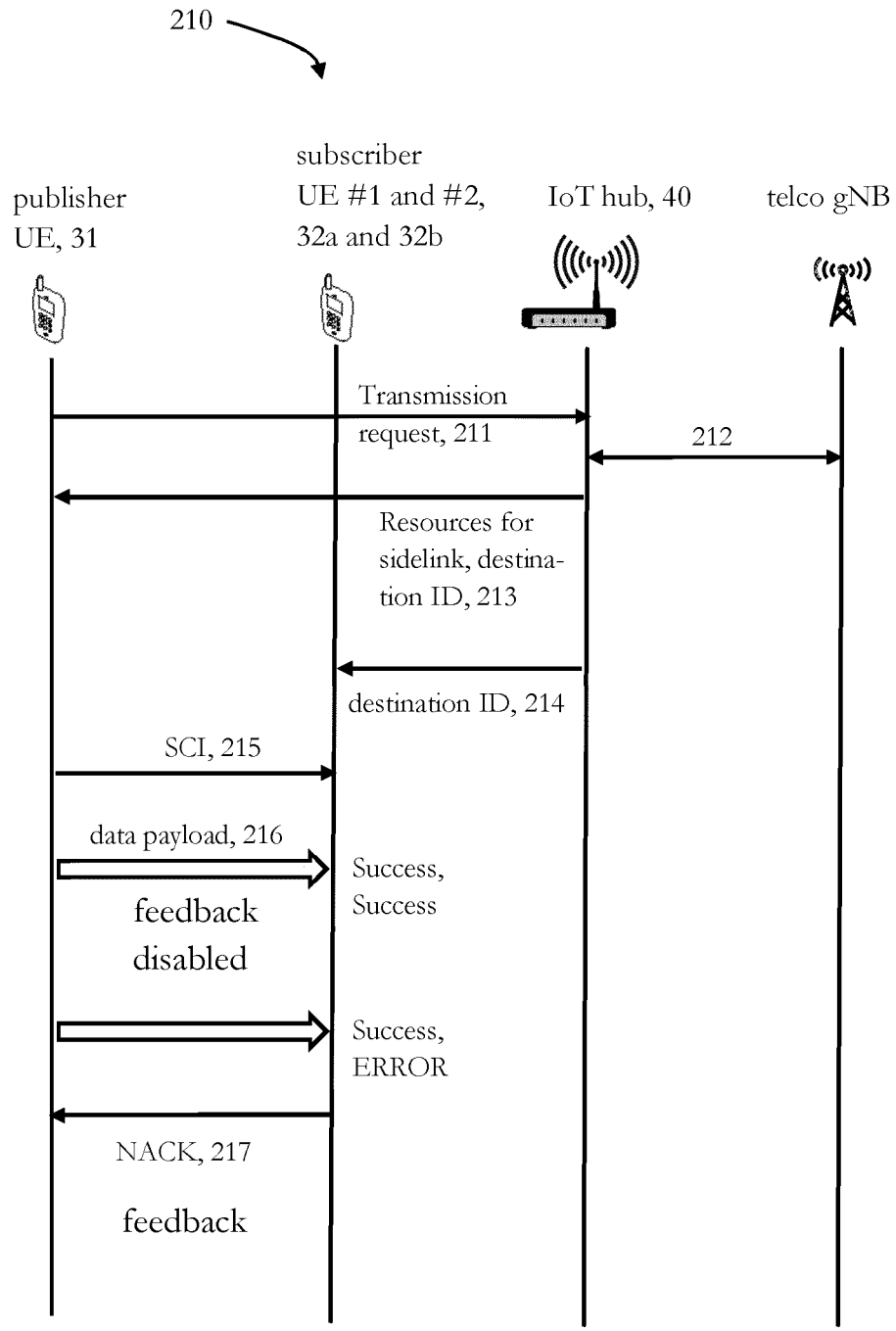
FIG. 9 schematically illustrates in a flow diagram a second embodiment of a publisher-subscriber method.

FIG. 9 schematically illustrates in a flow diagram a second embodiment of a publisher-subscriber method 210 for data distribution between a publisher device 31 and a first subscriber device 32*a* and a second subscriber device 32*b*.

The publisher-subscriber method 210 is an example of D2D groupcast/broadcast from a publisher device 31 (publisher UE) to two subscriber devices 32*a* and 32*b*.

The publisher device 31 and the subscriber devices 32*a* and 32*b* are registered at the broker device 40 in advance.

At 211, when the publisher device 31 is ready to send data payload of a data category, the publisher device 31 sends a transmission request to the broker device 40 to request sidelink resources and a destination identifier from the broker device 40.

Optionally, at 212, if the broker device 40 is in coverage of a gNB which is in charge of resource allocation, the broker device 40 (may) request the sidelink resources from the gNB.

At 213, the broker device 40 allocates the destination identifier based on the mapping table of publisher and subscriber. Since the number of subscribers is more than one, the destination identifier should be common in the group rather than a unique destination identifier for each subscriber device 32*a* and 32*b*. This could be semi-statically allocated in advance. Or, it could be dynamically allocated for each transmission.

Further at 213, the broker allocates the requested sidelink resources to the publisher device 31 and the destination identifier of relevant subscribers.

Optionally, at 214, the broker device 40 transmits the destination identifier to the subscriber devices 32*a* and 32*b*.

At 215, the publisher device 31 sends the control information (SCI). For example, SCI format 2-B is used for groupcast mode and HARQ feedback is not enabled, but optionally send NACK.

At 216, the publisher device 31 sends at least the data payload to the subscriber devices 32*a* and 32*b*. The publisher device 31 may include a data identifier indicating a data category of the data payload.

At 217, the subscriber devices 32a and 32b do not send back the acknowledgement if it is successfully received (subscriber devices 32a and 32b optionally send back the NACK if it is error).

The publisher device may resend the data if NACK is received.

The user protocol stack discussed under reference of FIG. 8 also applies here.

A second embodiment of the physical implementation is discussed under reference of FIG. 10, FIG. 11, FIG. 12 and FIG. 13.

Figure 10:
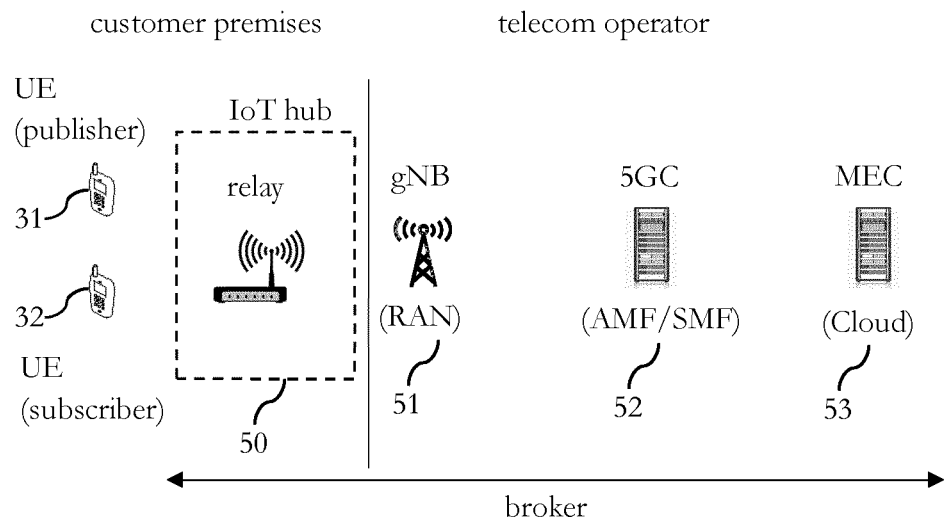
FIG. 10 schematically illustrates a third embodiment of a broker device for an internet of things-network.

FIG. 10 schematically illustrates a third embodiment of a broker device 50 for an internet of things-network corresponding to the second embodiment of the physical implementation.

The broker device 50 is an IoT hub (or a smartphone in other embodiments, or a sidelink (D2D) relay in purely relay-based implementations as discussed in the next section IV) and can support a relay function. However, the relay function is described in the next section IV.

Here, at first, it is discussed how the second embodiment of physical implementation can also support direct communication, when some of the broker functions are implemented in a network (e.g. telecom operator network), where a gNB 51 is the telecom operator's macro cell or micro cell.

Other nodes (e.g. 5GC (52), MEC (53)) are also a part of the telecom operator network. The broker functions which are implemented in the network include registering of publishers and subscribers, setup of (virtual) internet-of-things network and mapping table between publishers and subscribers. Accordingly, a distributed broker is provided.

In this embodiment, the gNB 51 is in charge of radio resource management for the broker device 50 and the UEs based on 3GPP spectrum. The MEC 53 is in telecom operator network and in charge of pub-sub protocol.

One of the advantages of this implementation model may be the efficient usage of the radio resource. The gNB 51 (or eNB) can dynamically allocate the radio resource for the broker device 51. Another advantage may be the flexibility of supported devices because of using the network function that is widely available. For example, if smartphone is used as a relay or broker device 50, it may support sidelink, but it is less likely to support base station function of LTE-M/NB-IoT.

When customer has some of LTE-M/NB-IoT devices in the home, the broker device 50 should support these devices. The telecom operator macro cell may receive the data from LTE-M/NB-IoT device and the MEC 53 forwards it to the devices in to the IoT network.

Figure 11:
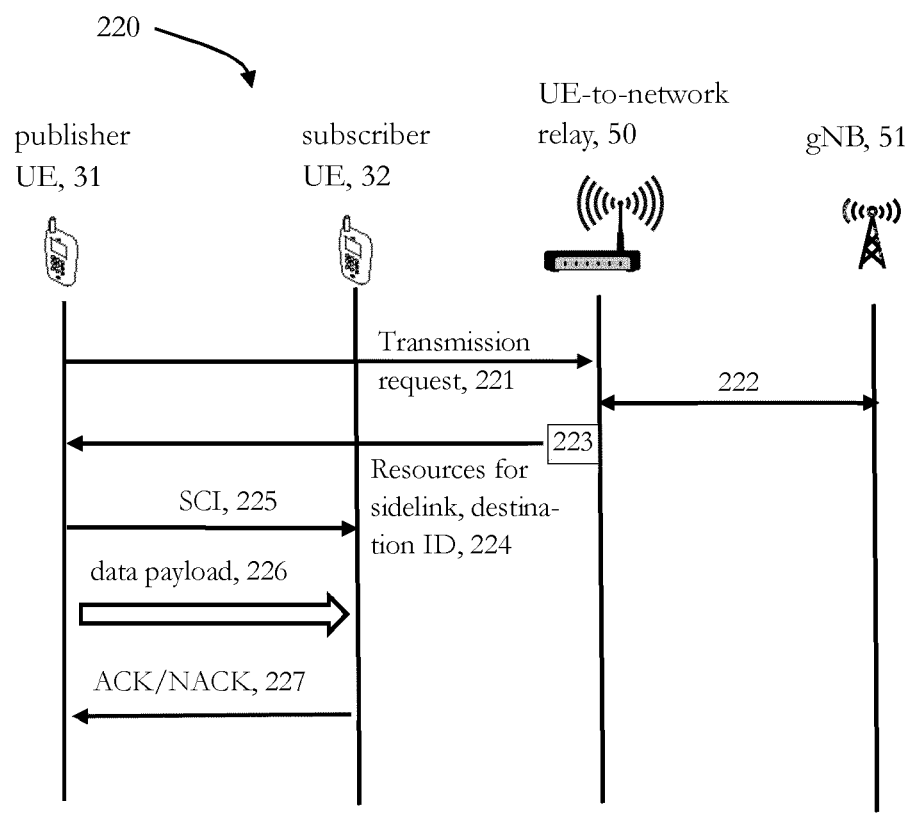
FIG. 11 schematically illustrates in a flow diagram a third embodiment of a publisher-subscriber method.

Here, for example, a publisher device 31 is registered as a publisher for a data category at a network broker circuitry (not shown) in the MEC server 53 (or, generally, in the network) and the publisher device 31 can provide data payload of the data category to at least one subscriber device 32 (or 32a and 32b) that is registered as a subscriber at the network broker circuitry, wherein data forwarding is handled by the broker device 50, as will be discussed below under reference of FIG. 11 and FIG. 12. FIG. 11 schematically illustrates in a flow diagram a third embodiment of a publisher-subscriber method 220 for data distribution between a publisher device 31 and a subscriber device 32.

Basically, the publisher-subscriber method 220 corresponds to the publisher-subscriber method 200 as discussed under reference of FIG. 7 (221 corresponds to 201, 224-227 correspond to 203-206).

However, here, at 222, the request from the broker device 50 for sidelink resources to the gNB 51 is not optional, since the gNB 51 is in charge of the resource management.

Moreover, at 223, the broker device 50 requests the destination identifier from the network-broker circuitry, since the mapping table is kept by the network broker circuitry. The network broker circuitry then determines the destination identifier based on the mapping table and transmits it to the broker device 50.

The user protocol stack discussed under reference of FIG. 8 also applies here.

Figure 12:
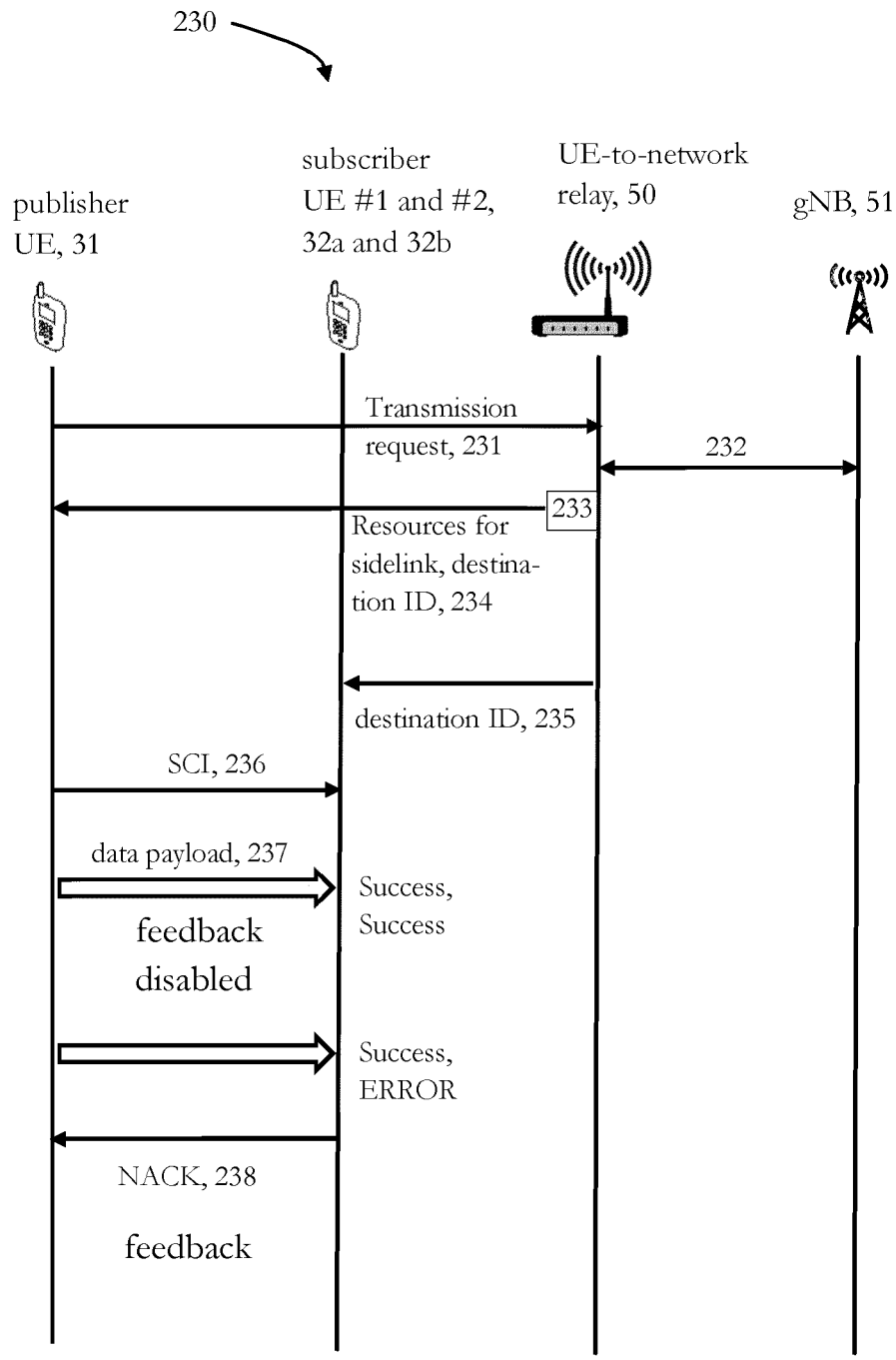
FIG. 12 schematically illustrates in a flow diagram a fourth embodiment of a publisher-subscriber method.

FIG. 12 schematically illustrates in a flow diagram a fourth embodiment of a publisher-subscriber method 230 for data distribution between a publisher device 31 and a first subscriber device 32a and a second subscriber device 32b.

Basically, the publisher-subscriber method 230 corresponds to the publisher-subscriber method 210 as discussed under reference of FIG. 9 (231 corresponds to 211, 234-238 correspond to 213-217).

However, here, at 232, the request from the broker device 50 for sidelink resources to the gNB 51 is not optional, since the gNB 51 is in charge of the resource management.

Moreover, at 233, the broker device 50 requests the destination identifier from the network-broker circuitry, since the mapping table is kept by the network broker circuitry. The network broker circuitry then determines the destination identifier based on the mapping table and transmits it to the broker device 50.

The user protocol stack discussed under reference of FIG. 8 also applies here.

Figure 13:
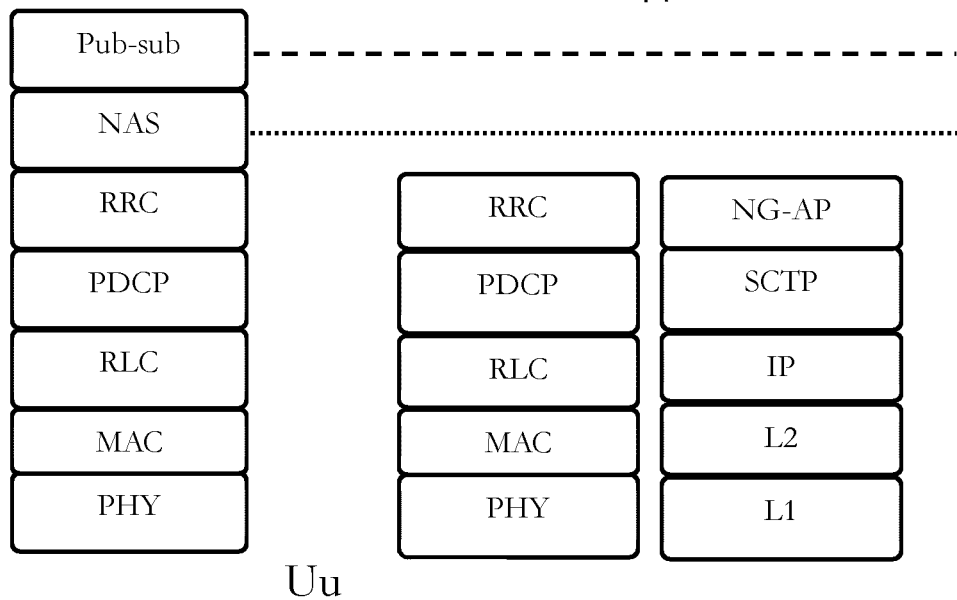
FIG. 13 schematically illustrates in block diagram an embodiment of a control plane protocol stack.
Figure 13:
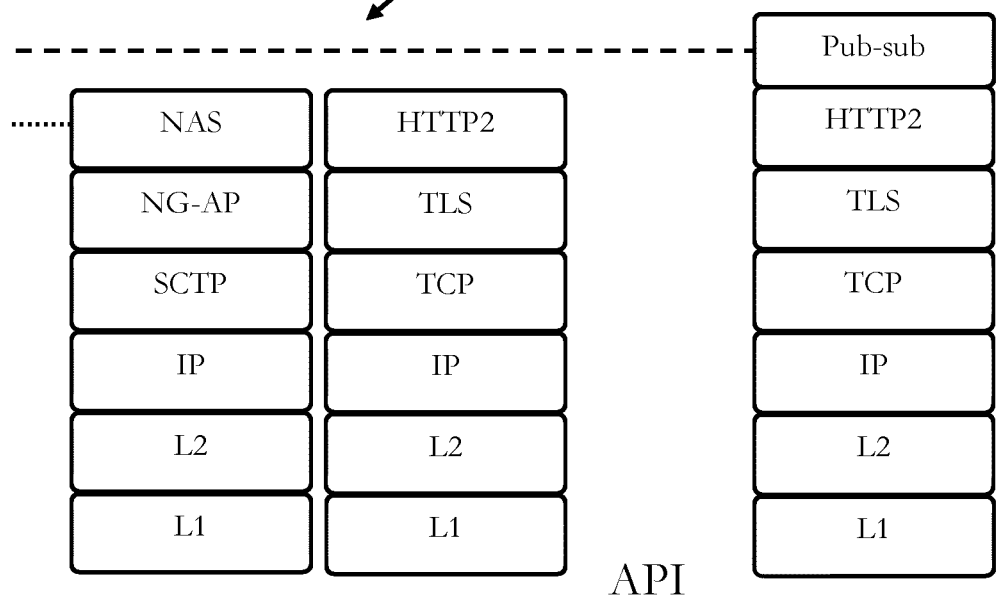

FIG. 13 schematically illustrates in block diagram an embodiment of a control plane protocol stack.

The control plane is in charge of management such as registration of publisher and subscriber UEs, mapping between publisher and subscriber(s), resource allocation for sidelink and so on.

The pub-sub protocol is terminated at UE and at MEC (cloud) in the application layer. However, some of pub-sub functions relies on network functions like resource management, QoS management, security and so on. Therefore, the pub-sub layer needs to request the necessity functions to 3GPP protocols such as core network (5GC) and radio access (NR, LTE).

Thus, a network-based API ("Application Programming Interface") in 5GC is proposed, which also applies to other embodiments of the present disclosure.

The control plane of network-based API with 3GPP access relay (broker device 50) and UEs (31/32(32a, 32b)) is shown in FIG. 13 (see also 3GPP TS 23.501 V15.4.0 (2018-12), 8.2; 3GPP TS 29.500 V16.4.0 (2020 June), 5.1; 3GPP TS 38.300 V15.7.0 (2019 September), 4.4). Basically, FIG. 13 is a consolidated figure of different interfaces below:
  between 5G core network node and external API (MEC) protocol stack;
  between RAN node and core node protocol stack;
  between UE and gNB (NAS: between UE and core network); and
  between UE and external (broker).

The 5G core network supports service-based architecture. An application can request the service via application interface (API) to 3GPP core network. The pub-sub protocol generates the message and parameters and describes it with a common format (e.g. JSON ("Java Script Object Notation")). The description of message and parameter is sent from MEC to 5GC with HTTP2 protocol and other low layer protocols.

The new pub-sub APIs for pub-sub model are proposed. One APIs implementation is between MEC and 5GC via HTTP2. The other APIs implementation is between UE and MEC (pre-configuration or via user plane).

Same control plane protocol stack can be used for Uu based solution (see section V).

a) APIs Between 5GC and Pub-Sub Layer in MEC:
For Broker Function:
  Request the setup virtual personal IoT Network (e.g. network slicing, closed group cell) under the specific cell coverage.
  Request the establish bearers between UE and broker, or between D2D UEs if direct communication for data distribution.
  Request push communication (e.g. trigger of paging) to subscriber UEs.

b) APIs Between UE and Pub-Sub Layer in MEC (Via User Plane):
For Publisher UEs:
  Registration of publisher.
  Registration of data category/topic.
  Sending the data from publisher to broker or D2D UE.
For Subscriber UE:
  Registration of subscriber.
  Send the data from broker to UE, or from UE to UE (D2D).

c) Relay API (UE-to-UE Relay):
In pub-sub model, a publisher UE does not have the knowledge the destination of data. A subscriber UE does not have the knowledge of source of data. It does not know when the data is coming. Relay API handles the configuration of mapping table for D2D UE-to-UE relay.

It assumes that the connection between relay (UE) and MEC is established via user plane in advance. The publisher UE has destination ID to relay. The subscriber UE has source ID of relay. Relay (UE) has mapping table and forward the data.

For Broker Function:
  Configuration of data receive from a publisher UE.
  Configuration of data sent to subscriber UE(s).
  Configuration of mapping table.

d) D2D UE API (Direct Communication):
When direct communication from a publisher UE to a subscriber UE(s) is used, publisher UE needs to know the destination ID (identifier) to indicate the data transmission for subscribers. By contrast, the subscriber UE(s) needs to know source ID to detect the data transmission from a publisher.

It assumes that the connection between UE and MEC is established via user plane in advance.

For Publisher:
  Provision of destination ID for subscriber UE(s)
  Resource allocation for transmission (reuse of existing 3GPP D2D procedure)
  Configuration of data transmission (e.g. periodic transmission)
For Subscriber(s):
  Provision of source ID for subscriber UE(s)
  Resource configuration for receive (reuse of existing 3GPP D2D procedure)
  Configuration of data reception (e.g. periodic reception)

Returning to the general explanations, some embodiments pertain to a broker device for an internet-of-things network, wherein the broker device includes circuitry configured to communicate with one or more publisher devices and with a plurality of subscriber devices, wherein the circuitry is further configured to:

receive a transmission request from a publisher device of the one or more publisher devices, wherein the publisher device of the one or more publisher devices is registered as a publisher for a data category at the broker device, wherein the transmission request is a request for sidelink resources and at least one destination identifier; and allocate, in response to the transmission request, the requested sidelink resources and the at least one destination identifier to the publisher device of the one or more publisher devices, wherein the at least one destination identifier indicates at least one subscriber device of the plurality of subscriber devices, wherein the at least one subscriber device is registered as a subscriber for the data category at the broker device.

In some embodiments, the at least one destination identifier is allocated to the publisher device of the one or more publisher devices based on a mapping table kept at the broker device, wherein the mapping table stores at least a relation between the data category and the subscriber for the data category.

In some embodiments, the circuitry of the broker device is further configured to:
  communicate with a network broker circuitry in a network, wherein the publisher device of the one or more publisher devices is registered as the publisher for the data category at the network broker circuitry in the network instead of the broker device, wherein the at least one subscriber device is registered as the subscriber for the data category at the network broker circuitry in the network instead of the broker device;
  transmit a request for the at least one destination identifier to the network broker circuitry in the network, wherein the network broker circuitry determines the at least one destination identifier based on a mapping table kept by the network broker circuitry, wherein the mapping table stores at least a relation between the data category and the subscriber for the data category; and
  receive the at least one destination identifier from the network broker circuitry for allocation to the publisher device of the one or more publisher devices.

In some embodiments, in a case of unicast transmissions, the at least one destination identifier is unique for each of the at least one subscriber device of the plurality of subscriber devices.

In some embodiments, the at least one destination identifier is assigned or allocated to each of the at least one subscriber device of the plurality of subscriber devices in advance.

In some embodiments, in a case of groupcast or broadcast transmissions, the at least one destination identifier is common for each of the at least one subscriber device of the plurality of subscriber devices.

In some embodiments, in a case of groupcast or broadcast transmissions, the at least one destination identifier is directly a part of the data category or associated with the data category.

In some embodiments, the at least one destination identifier is assigned or allocated to each of the at least one subscriber device of the plurality of subscriber devices semi-statically or dynamically.

In some embodiments, the circuitry of the broker device is further configured to:
  request, if the broker device is in coverage of a base station, the sidelink resources from the base station which is in charge of sidelink resource allocation.

Some embodiments pertain to a publisher device for an internet-of-things network, wherein the publisher device includes circuitry configured to communicate with a broker device and at least one subscriber device, wherein the circuitry is further configured to:

transmit a transmission request to the broker device from a publisher device of the one or more publisher devices, wherein the publisher device is registered as a publisher for a data category at the broker device or at a network broker circuitry in a network, wherein the transmission request is a request for sidelink resources and at least one destination identifier; and obtain, in response to the transmission request, the requested sidelink resources and the at least one destination identifier from the broker device, wherein the at least one destination identifier indicates the at least one subscriber device, wherein the at least one subscriber device is registered as a subscriber for the data category at the broker device or at the network broker circuitry in the network.

In some embodiments, the circuitry of the publisher device is further configured to transmit, based on the obtained at least one destination identifier, control information to the at least one subscriber device, wherein the control information include an indication whether hybrid automatic repeat request is enabled or disabled.

In some embodiments, the control information is SCI format 2-A in a case of unicast transmissions or SCI format 2-B in a case of groupcast or broadcast transmissions.

In some embodiments, the circuitry of the publisher device is further configured to transmit, based on the obtained at least one destination identifier, at least data payload of the data category to the at least one subscriber device.

In some embodiments, the circuitry of the publisher device is further configured to receive, if hybrid automatic repeat request feedback is enabled, an acknowledgement in a case of successful transmission of at least the data payload from the at least one subscriber device or a negative-acknowledgement in a case of unsuccessful transmission of at least the data payload from the at least one subscriber device.

In some embodiments, the circuitry of the publisher device is further configured to transmit, if the negative-acknowledgement is received, at least the data payload again to the at least one subscriber device.

In some embodiments, the circuitry of the publisher device is further configured to receive, if hybrid automatic repeat request feedback is disabled, a negative-acknowledgement in a case of unsuccessful transmission of at least the data payload.

In some embodiments, the circuitry of the publisher device is further configured to transmit, if the negative-acknowledgement is received, at least the data payload again to the at least one subscriber device.

Some embodiments pertain to a subscriber device for an internet-of-things network, wherein the subscriber device includes circuitry configured to communicate with a broker device and a publisher device, wherein the circuitry is further configured to:

receive control information from the publisher device, wherein the publisher device is registered as a publisher for a data category at the broker device or at a network broker circuitry in a network, wherein the control information include an indication whether hybrid automatic repeat request is enabled or disabled; and receive at least data payload of the data category from the publisher device, wherein the subscriber device is registered as a subscriber for the data category at the broker device or at the network broker circuitry in the network.

In some embodiments, the control information is SCI format 2-A in a case of unicast transmissions or SCI format 2-B in a case of groupcast or broadcast transmissions.

In some embodiments, the circuitry of the subscriber device is further configured to transmit, if hybrid automatic repeat request feedback is enabled, an acknowledgement in a case of successful transmission of at least the data payload to the publisher device or a negative-acknowledgement in a case of unsuccessful transmission of at least the data payload to the publisher device.

In some embodiments, the circuitry of the subscriber device is further configured to transmit, if hybrid automatic repeat request feedback is disabled, a negative-acknowledgement in a case of unsuccessful transmission of at least the data payload to the publisher device.

A.IV. Broker Device Supporting Relay of Data Between Publisher and Subscriber

In the previous section III, the broker devices 40 and 50 (IoT hub) provided user plane and control plane separation by a direct communication path between the publisher device and at least one subscriber device such that the user plane is provided between them and the control plane between the publisher/subscriber device and the broker device.

However, as mentioned in the previous section III, some of the broker functions may be provided in the network or deployed in the network, as depicted in FIG. 10, which provides a relay-based implementation.

Hence, it has been recognized that user plane and control plane separation may also be provided for a broker device 50 which has relay functions (user plane) and which connects to the network for control functions (control plane).

Accordingly, some broker functions are implemented inside the broker device 50 and some broker functions are implemented in the network by a network broker circuitry (e.g. in the MEC 53), as depicted in FIG. 10.

This basically allows the broker device 50 to also support D2D relaying (Sidelink Relay) and non-3GPP wireless technologies such as Wi-Fi, ZIGBEE, Bluetooth in the internet-of-things for relaying while providing a broker with separated user plane and control plane (a comparative example has been discussed in section A.I under reference of FIG. 2 and FIG. 4, for example, where the broker device 7 has relay functions but does implement also all control functions such that user plane and control plane are not separated).

Figure 14:
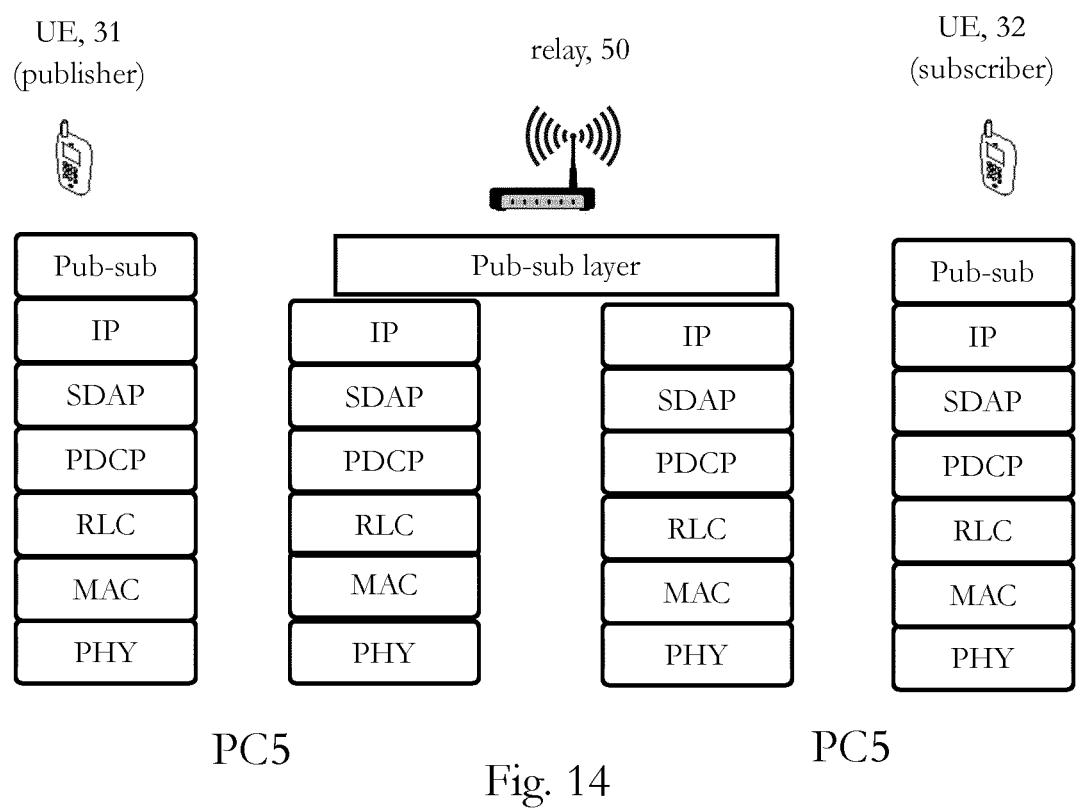
FIG. 14 schematically illustrates in a block diagram a second embodiment of a user plane protocol stack.

Referring to FIG. 14, there is schematically illustrated in a block diagram a second embodiment of a user plane protocol stack.

The user plane protocol of 3GPP based device-to-device communication via UE-to-UE relay (broker device 50) is shown in FIG. 14 (see also 3GPP TS 23.303 V13.3.0 (2016-04), 5.1.2.1 for PC5 interface).

This is IP-based relay, which forwards IP packet from publisher UE to subscriber UE(s). The relay needs to know the IP address from publisher to subscriber for forwarding. The relay is indicated the mapping table of publisher's IP address and subscriber(s) IP address by the network.

The control plane protocol stack and the API discussed under reference of FIG. 13 also apply here.

Figure 15:
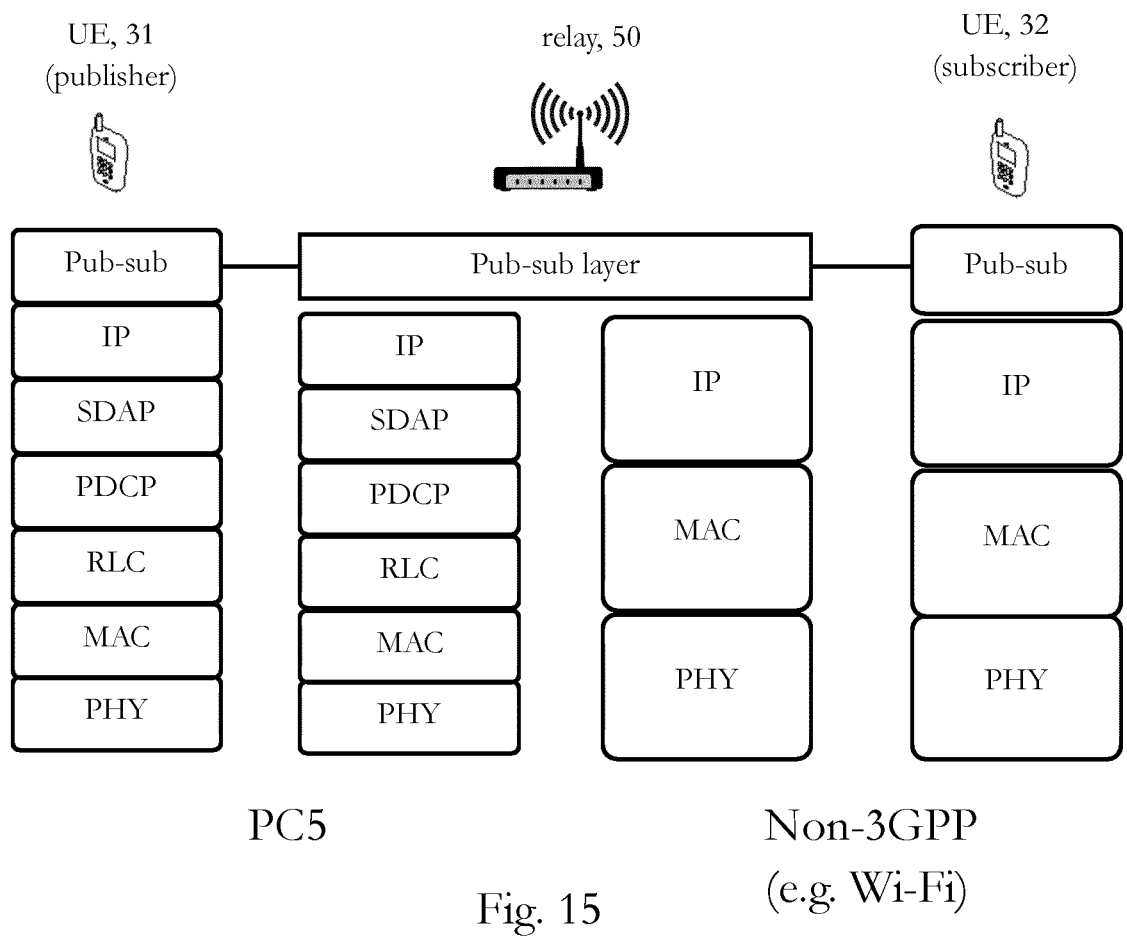
FIG. 15 schematically illustrates in a block diagram a third embodiment of a user plane protocol stack.

FIG. 15 schematically illustrates in a block diagram a third embodiment of a user plane protocol stack.

The user plane protocol of 3GPP based device-to-non-3GPP device communication via relay is shown in FIG. 15 (see also 3GPP TS 23.303 V13.3.0 (2016-04), 5.1.2.1 for PC5 interface). In this example, it is assumed that a publisher UE is 3GPP device and a subscriber UE is non-3GPP device. However, it could be exchangeable.

The control plane protocol stack and the API discussed under reference of FIG. 13 also apply here.

Returning to the general explanations, some embodiments pertain to a broker device for an internet-of-things network, wherein the broker device includes circuitry configured to communicate with one or more publisher devices, with a plurality of subscriber devices and a network broker circuitry in a network, wherein the circuitry is further configured to:

receive published data from a publisher device of the one or more publisher devices that is registered as a publisher for a data category at the network broker circuitry in the network, wherein the published data includes data payload and a data identifier indicating the data category of the data payload;

transmit a request for destination information to the network broker circuitry in the network, wherein the network broker circuitry determines the destination information;

receive the destination information from the network broker circuitry; and transmit, based on the received destination information, at least the data payload of the received published data to the at least one subscriber device of the plurality of subscriber devices that is registered as a subscriber for the data category at the network broker circuitry in the network.

In some embodiments, the destination information is determined based on a mapping table kept by the network broker circuitry, wherein the mapping table stores at least a relation between the data category and the subscriber for the data category.

A.V. Virtual Broker

In the embodiments discussed in the previous sections A.III and A.IV, the broker was either (logically) located in a broker device or (logically) distributed over a broker device and a network broker circuitry in a network, wherein the publisher device either directly transmits data (payload) to the broker device for relaying to the subscriber device or directly to the subscriber device in the case of direct communication. In the following, embodiments of a virtual broker are discussed in which the broker is fully virtualized in the network such that the data traffic from the publisher device is routed by the network broker circuitry in the network.

Figure 16:
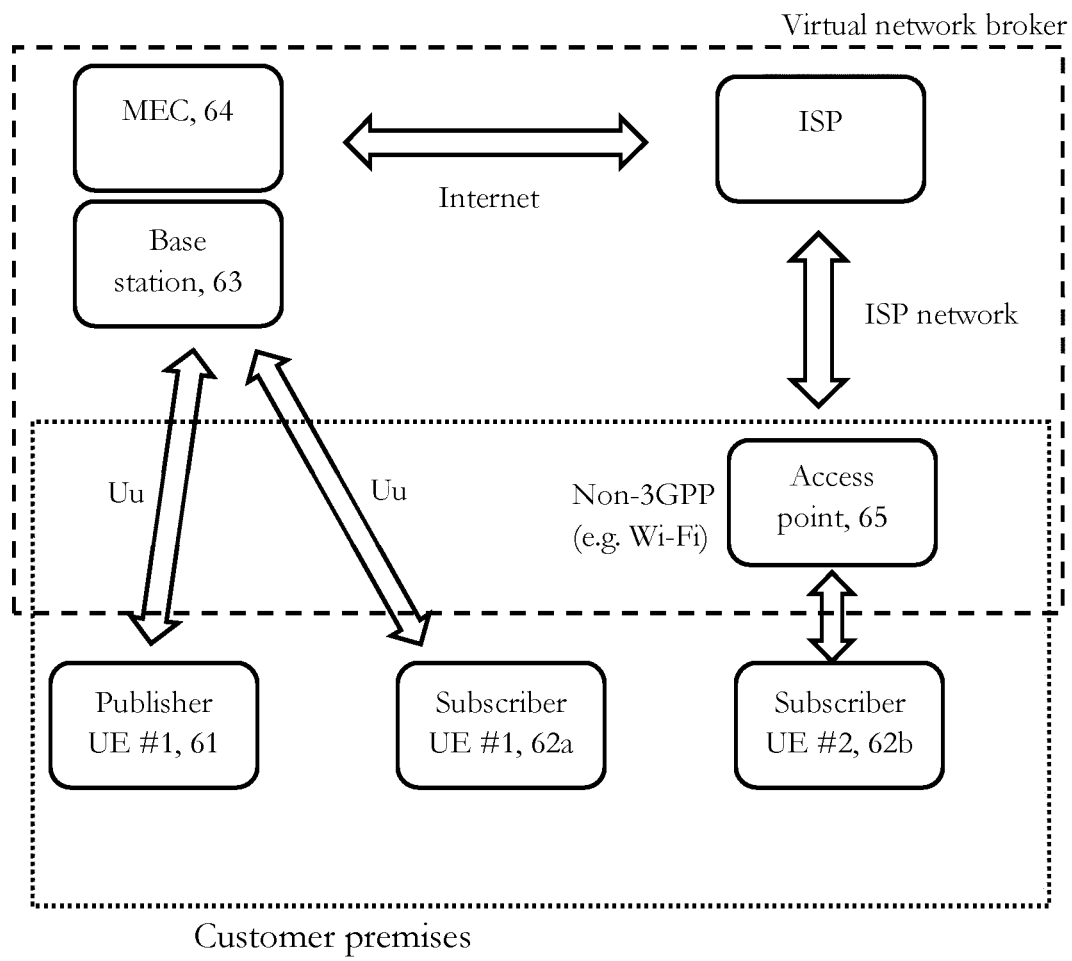
FIG. 16 schematically illustrates in a block diagram a first embodiment of a virtual broker for an internet-of-things network.

Referring to FIG. 16, there is schematically illustrated in a block diagram a first embodiment of a virtual broker for an internet-of-things network.

Here, three UEs 61, 62*a* and 62*b* are in a customer premise. The first one is a publisher UE 61 which can communicate with telecom operator's macro base station 63 (Uu interface). The second one is a subscriber UE 62*a* which can communicate with telecom operator's macro base station 63 (Uu interface). The third one is a subscriber UE 62*b* which is connected via non-3GPP access (e.g. Wi-Fi device, access point 65).

When the publisher UE has data payload (of a data category) ready for transmission, it sends it to MEC 64 via macro base station 63 and core network. The MEC 64 finds the corresponding subscribers for the data category. If a subscriber UE 62*a* is 3GPP network (Uu) device, MEC 64 forwards the data to the core network and the core network uses a bearer for forwarding the data payload to a subscriber UE 62*a*. If the subscriber UE 62*b* is non-3GPP network (e.g. Wi-Fi device), MEC 64 pushes the data payload to the subscriber UE 62*b* under Wi-Fi access point 65 in the home via Internet.

Figure 17:
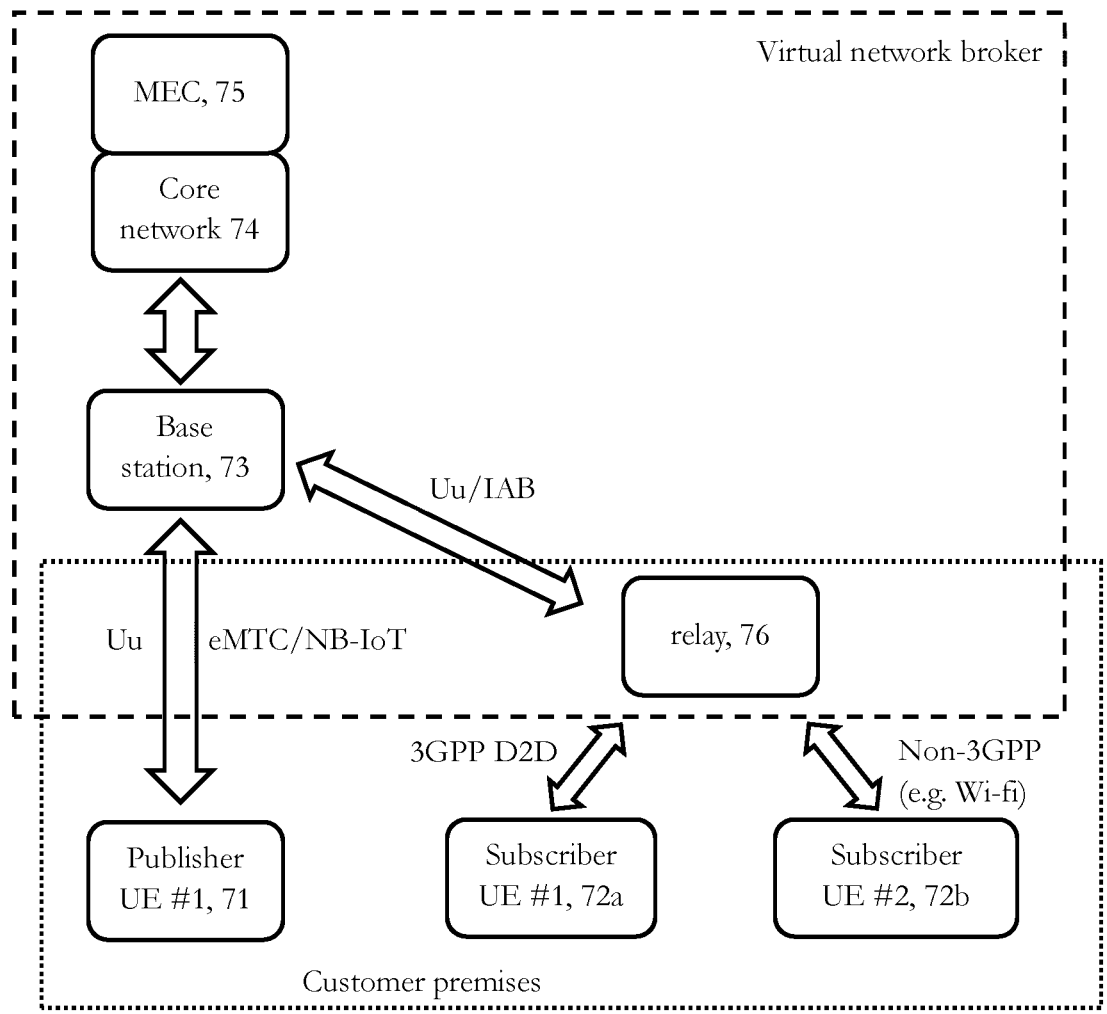
FIG. 17 schematically illustrates in a block diagram a second embodiment of a virtual broker for an internet-of-things network.

FIG. 17 schematically illustrates in a block diagram a second embodiment of a virtual broker for an internet-of-things network.

Here, three UEs 71, 72*a* and 72*b* are in a customer premise. The first one is a publisher NB-IoT UE 71 which can communicate with telecom operator's macro base station 73 (it assumes small cell does not support NB-IoT). The second one is 3GPP D2D UE 72*a* which is a subscriber, the third one is non-3GPP UE 72*b* (e.g. Wi-Fi device) which is also a subscriber. The second one and the third one are connected to an IoT hub 76 which offers the relay function in customer premise. When the publisher UE 71 has data payload (of a data category) ready for transmission, it sends it to MEC 75 via macro base station 73 and core network 74. The MEC 75 finds the subscribers and sends the data payload to the relevant relay 76 via base station 73. Then the relay 76 distributes the data payload to D2D UE 72*a* and Wi-Fi Device 72*b*. In short, the broker function is provided by telecom network and the relay 76.

Figure 18:
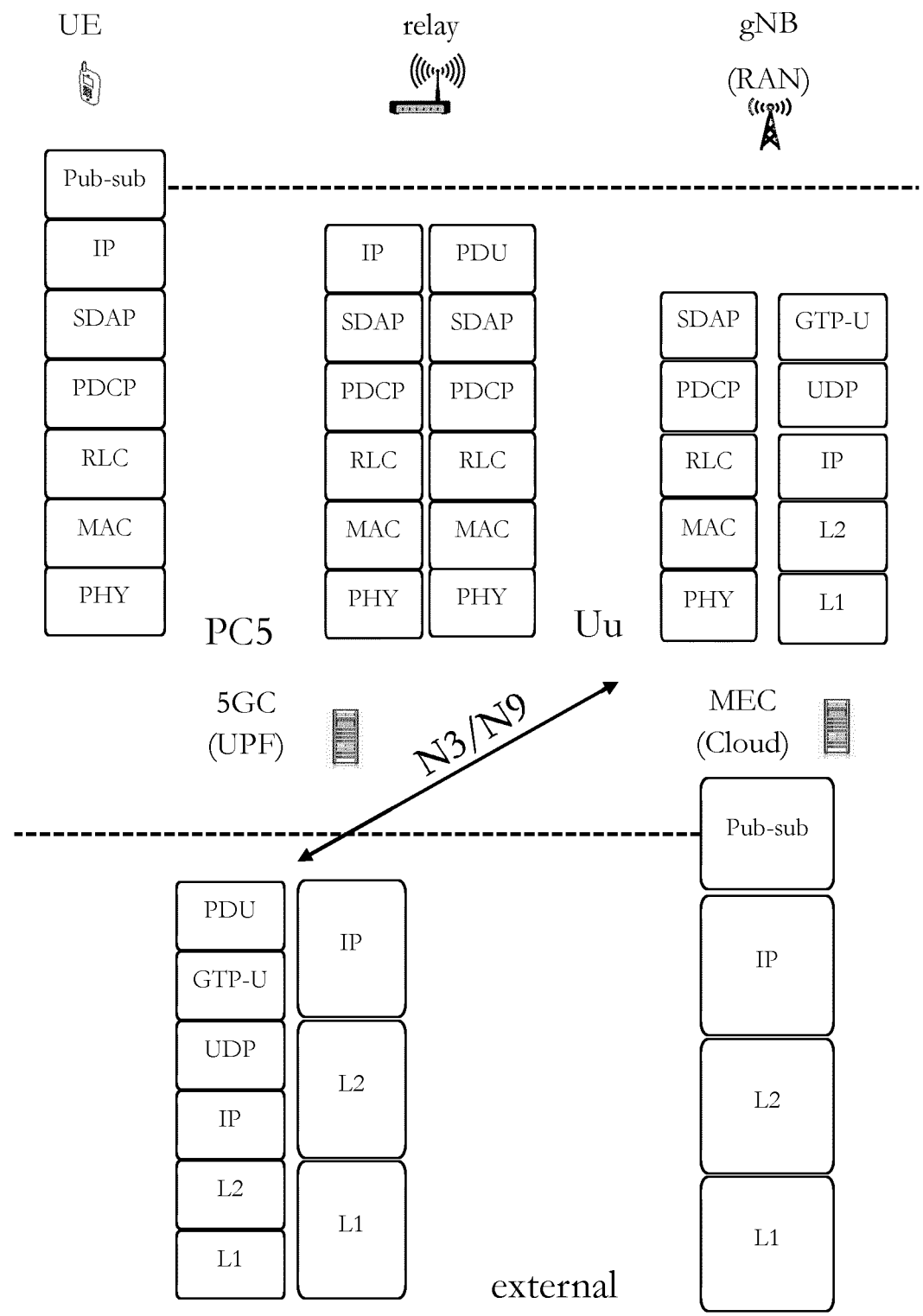
FIG. 18 schematically illustrates in a block diagram a fourth embodiment of a user plane protocol stack.

FIG. 18 schematically illustrates in a block diagram a fourth embodiment of a user plane protocol stack.

An embodiment of a user plane protocol stack between UE and MEC with 3GPP access via D2D UE-to-Network relay is shown in FIG. 18 (see also 3GPP TS 23.303 V13.3.0 (2016-04), 5.1.2.1 for PC5 interface; 3GPP TS 38.300 V15.7.0 (2019 September), 4.4 for Uu interface; 3GPP TS 23.501 V15.4.0 (2018 December), 8.3). In this example, D2D UE sends the data via PC5 interface.

The data in pub-sub protocol from publisher UE is transferred to pub-sub function at MEC via user plane. The data from MEC is distributed to subscriber UE(s).

The protocol between UE and relay is layer 3 based (IP, internet protocol). Optionally, layer 2 relay model.

The external link between 5GC and MEC could be IP protocol, but it may support various types of physical connection. For example, IP connection with optical fiber, ADSL, 5G access and backhaul (IAB) and so on. The protocols between 5GC and relay should reuse the existing 5G Core/RAN protocols. It may require some optimization for pub-sub model. For example, small data transmission without entering RRC connected mode if the data size is small enough.

The pub-sub user plane is established between publisher UE and MEC.

The control plane protocol stack and the API discussed under reference of FIG. 13 also apply here.

Figure 19:
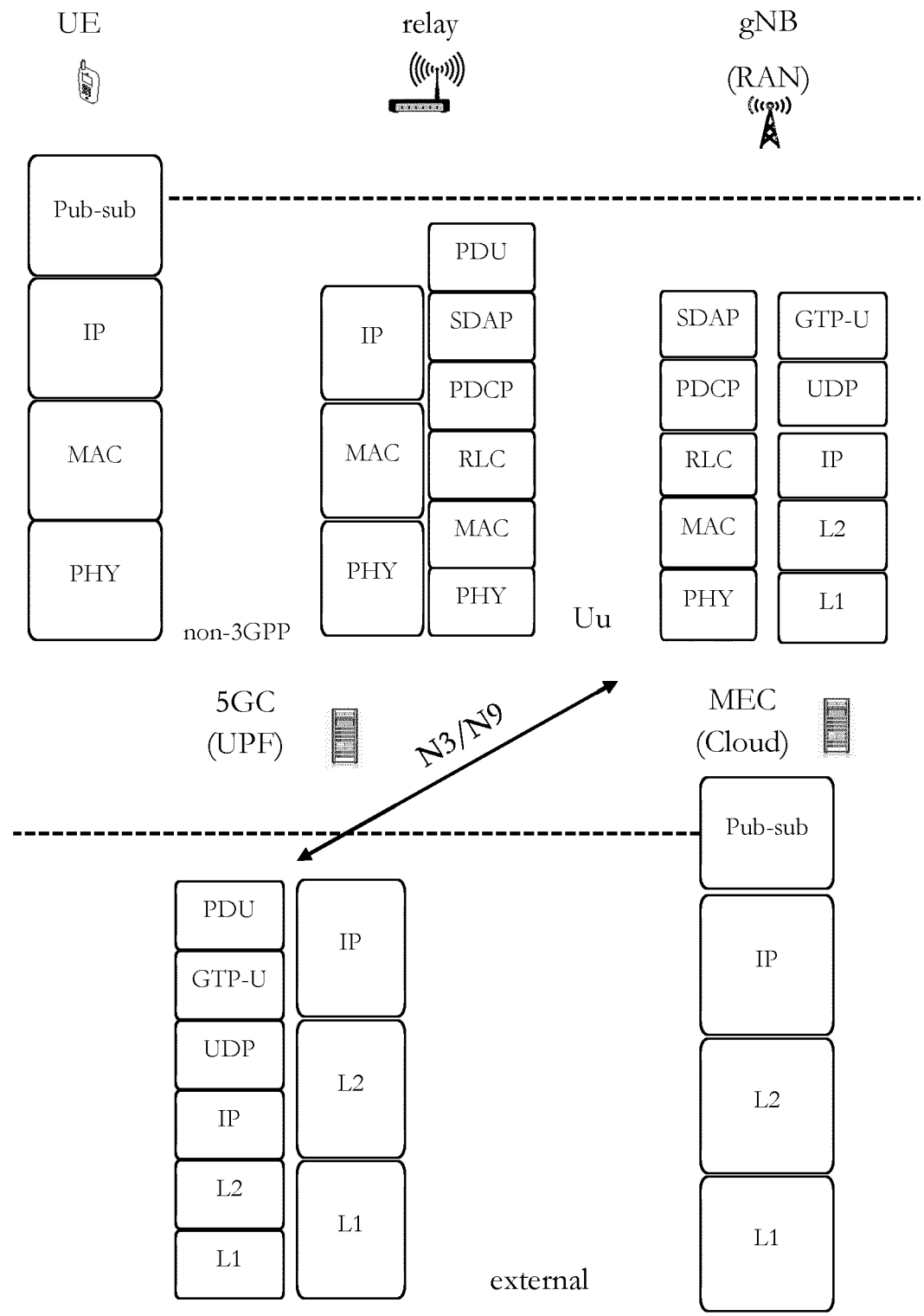
FIG. 19 schematically illustrates in a block diagram a fifth embodiment of a user plane protocol stack.

FIG. 19 schematically illustrates in a block diagram a fifth embodiment of a user plane protocol stack.

An embodiment of a user plane protocol stack between UE and broker with non-3GPP access is shown in FIG. 19. The data flow is the same as the 3GPP user plane above in FIG. 18. The main difference is non-3GPP wireless interface is used between UE and relay as layer 3 (IP) relay. Note that the access between relay and gNB is 3GPP access, i.e. relay is a UE from base station point of view.

For example, Wi-Fi (MAC and PHY) interface could be applicable for L2 and L1. Any wireless technologies which could transfer IP could be used such as Bluetooth, Zigbee. However, user plane QoS could be different from 3GPP depending on the selected wireless technologies. The mapping table at broker has knowledge of which subscriber uses which wireless technologies.

The control plane protocol stack and the API discussed under reference of FIG. 13 also apply here.

Figure 20:
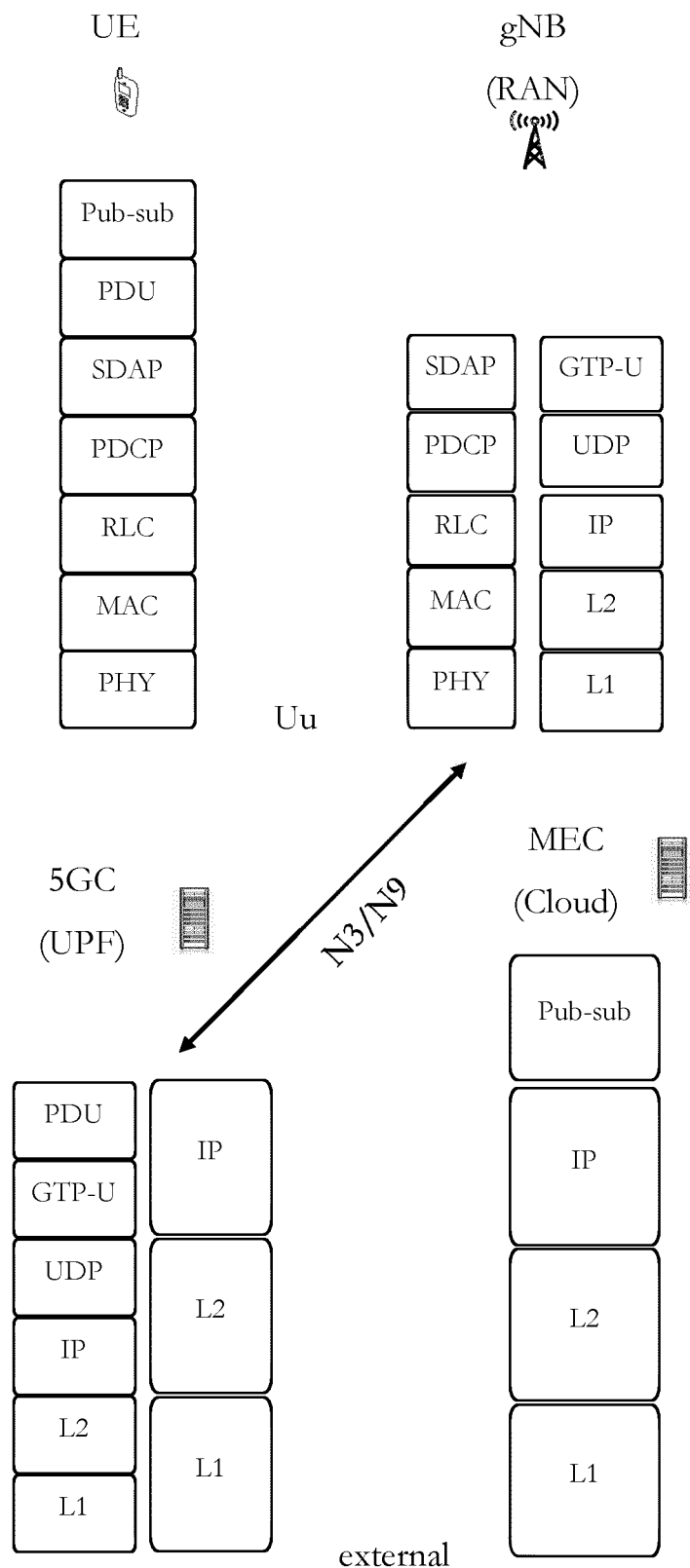
FIG. 20 schematically illustrates in a block diagram a sixth embodiment of a user plane protocol stack.

FIG. 20 schematically illustrates in a block diagram a sixth embodiment of a user plane protocol stack.

An embodiment of a user plane protocol stack between UE and MEC (broker) with 3GPP access via base station is shown in FIG. 20. In this embodiment, there is no intermediate node (e.g. relay). When the publisher UE sends the data, a bearer is established between UE and core network (5GC). The path between MEC server and core network could be Internet or private network. MEC is a part of broker functions and find the subscriber for the data. MEC server send the data to 5GC and 5GC establish the bearer for a subscriber UE between 5GC and UE. RAN node is in charge of radio data bearer between UE and gNB. gNB is responsible for RAN signalling (e.g. paging) and resource management (e.g. scheduling).

The control plane protocol stack and the API discussed under reference of FIG. 13 also apply here.

Returning to the general explanations, some embodiments pertain to a network broker circuitry in a network for an internet-of-things network, wherein the network broker circuitry is configured to communicate with one or more publisher devices and with a plurality of subscriber devices, wherein the network broker circuitry is further configured to:
  receive, via the network, published data from a publisher device of the one or more publisher devices that is registered as a publisher for a data category at the network broker circuitry in the network, wherein the published data includes data payload and a data identifier indicating the data category of the data payload; and
  transmit, via the network, at least the data payload of the received published data to the at least one subscriber device of the plurality of subscriber devices that is registered as a subscriber for the data category at the network broker circuitry in the network.

Figure 21:
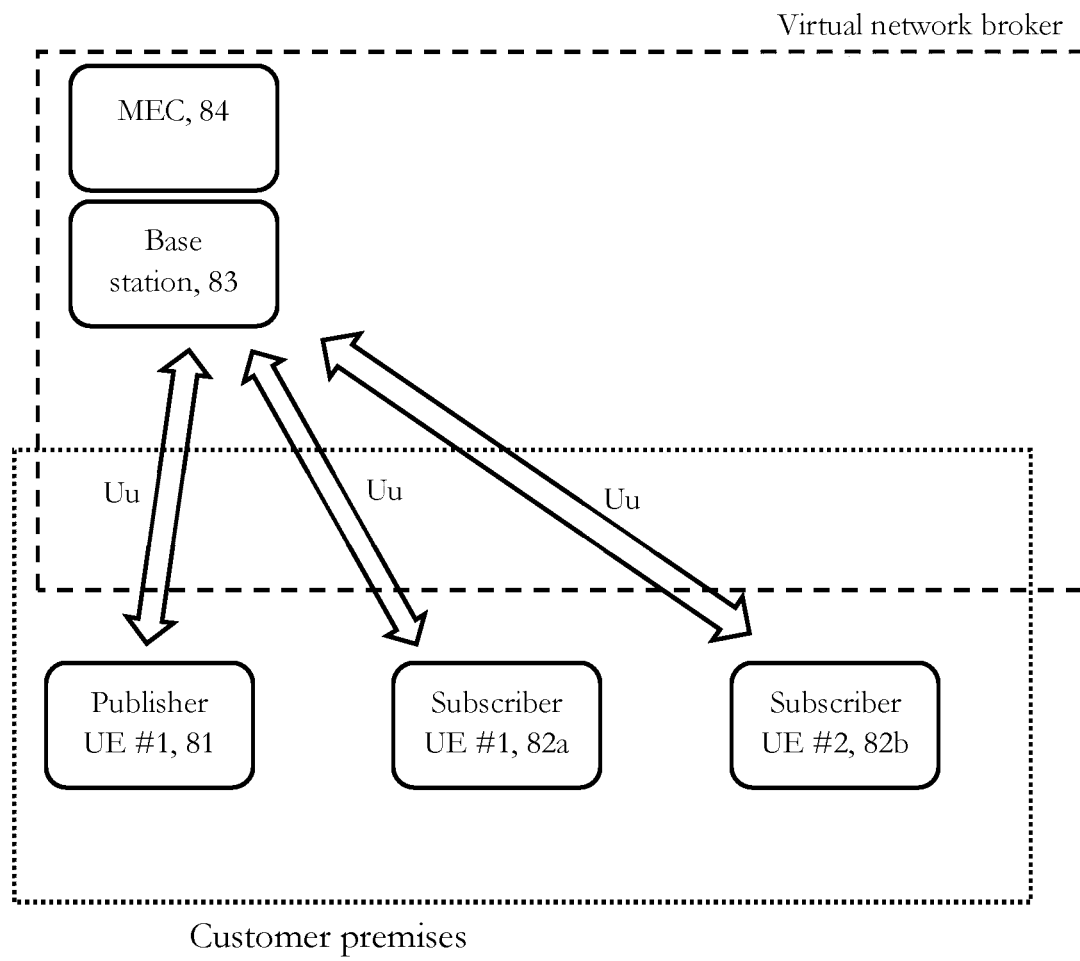
FIG. 21 schematically illustrates in a block diagram a third embodiment of a virtual broker for an internet-of-things network.
Figure 22:
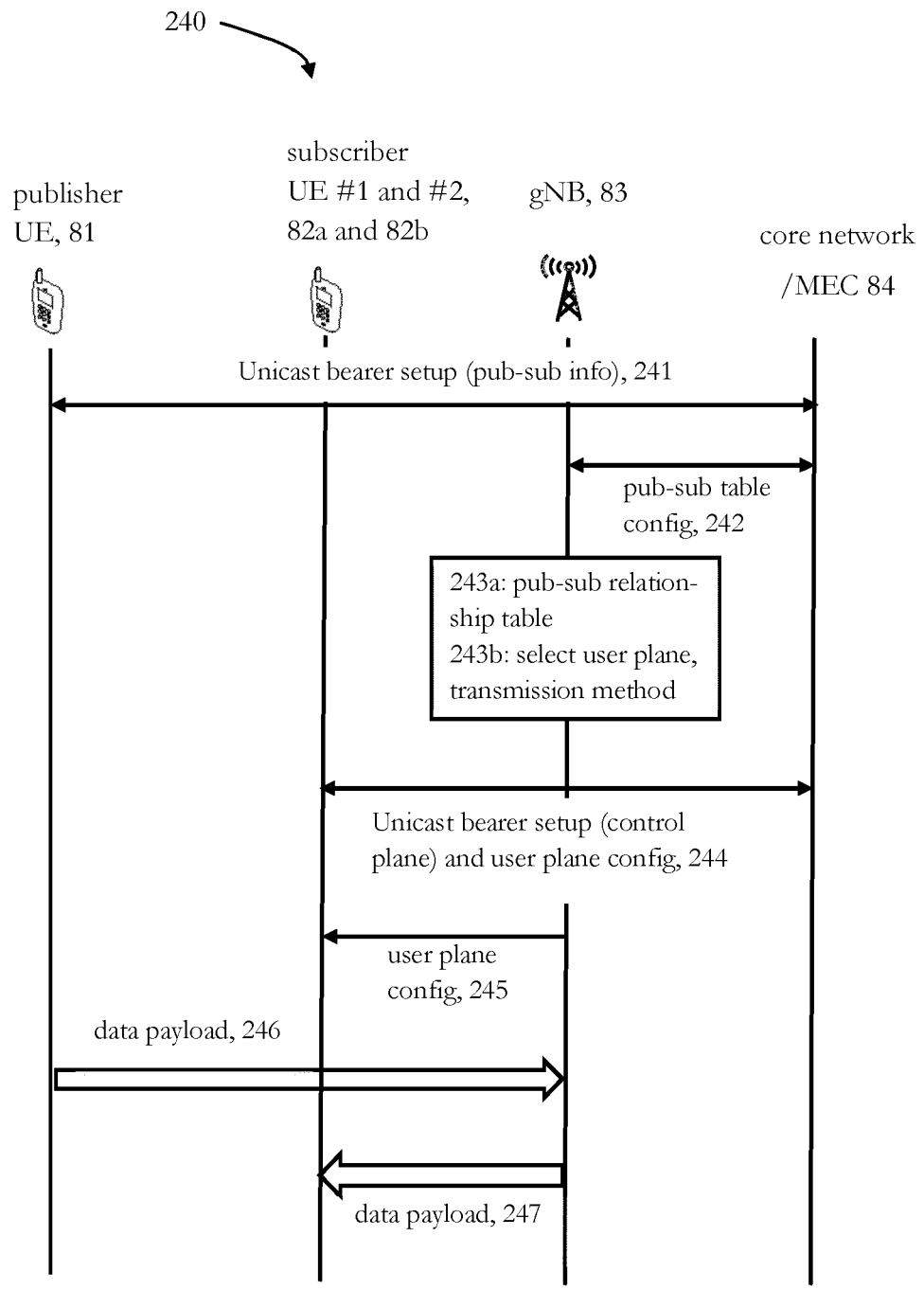
FIG. 22 schematically illustrates in a flow diagram a fifth embodiment of a publisher-subscriber method.
Figure 23:
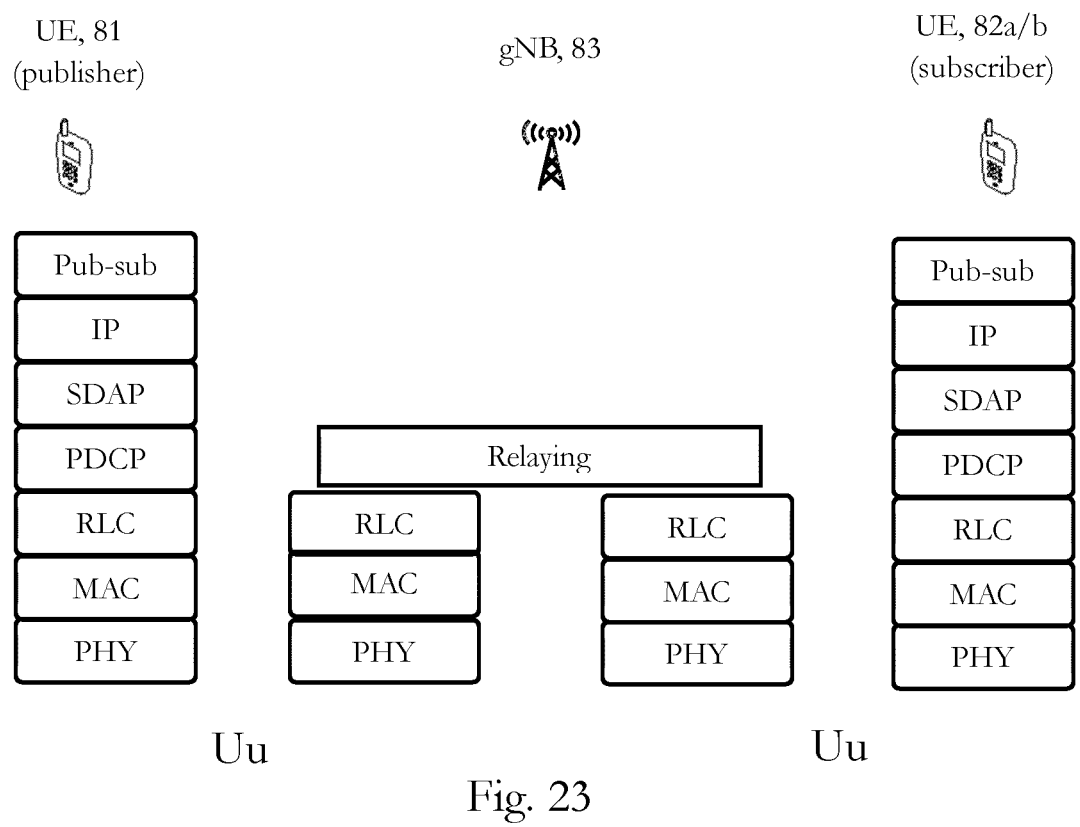
FIG. 23 schematically illustrates in a block diagram a seventh embodiment of a user plane protocol stack.

Referring to FIG. 21, a Uu-based solution is discussed under reference of FIG. 21, FIG. 22 and FIG. 23.

FIG. 21 schematically illustrates in a block diagram a third embodiment of a virtual broker for an internet-of-things network.

In this embodiment, the user plane path between the broker (virtual broker in a network), a publisher device 81 and two subscriber devices 82a and 82b is provided by using Uu interface of a mobile telecommunications system, wherein the mobile telecommunications system may be based on aspects and methods of UMTS, LTE, LTE-A, NR, 5G system, or the like. The role of the broker, the subscribers and the publisher and the user plane path between these entities is setup by using the control plane signaling. This solution relies on setting up unicast connection for each UE 81, 82a and 82b. However, there can be many switching points possible for the user plane traffic in the network (gNB and PDCP, gNB and RLC, Edge cloud etc.).

In an alternative solution, the publisher UE 81 has a unicast connection (bearer setup) and subscriber UEs 82a and 82b receive the information via MBS ("Multicast Broadcast Service") PTP ("Point-to-Point") or PTM ("Point-to-Multipoint"). Core network is typically involved in the decision to select MBS. However, one enhancement may be that the gNB 83 can decide and switch the user plane traffic received from the publisher UE 81 to PTP/PTM transmission towards subscriber UEs 82a and 82b.

Data Distribution May be Based on One of the Following Procedures:

At first, in control plane procedures, the publisher UE 81 sets up a bearer with the core network (unicast) connection like a legacy UE. Optionally, the subscriber UEs 82a and 82b also setup a bearer (unicast).

Then, the core network or MEC 84 gets the information about the role of the publisher UE 81 and the subscriber UEs 82a and 82b.

Then, in the user plane, data from the publisher UE 81 is switched to the subscriber UEs 82a and 82b by one of the following options:
  MEC 84 switches the data like a normal bearer and forwarded as unicast traffic to subscriber UEs 82a and 82b.
  gNB 83 switches the data from the publisher UE 81 to the subscriber UEs 82a and 82b and configures RLC channels. In this embodiments, data is encrypted by publisher UE PDCP and decrypted by the subscriber UEs 82a and 82b. A security context needs to be setup.
  gNB 83 switches the data from the publisher UE 81 to the subscriber UEs 82a and 82b by using PTP or PTM bearer. A separate security contexts exist between publisher UE 81-gNB 83 and gNB 83-subscriber UEs 82a and 82b. The core network performs the switching between PTP/PTM.

FIG. 22 schematically illustrates in a flow diagram a fifth embodiment of a publisher-subscriber method 240 for data distribution between a publisher device 81 and two subscriber devices 82a and 82b.

At 241, the publisher UE 81 sets up a bearer like a normal UE. In addition, the publisher UE 81 may indicate that it acts as a publisher and also the intended recipients of this service. The publisher UE 81 may inform it in NAS signaling to the core network. The core network may authenticate the publisher UE 81 and the subscriber UEs 82a and 82b and inform the base station 83.

At 242, the core network informs the base station 83 about pub-sub relationship table. This information is provided either during the initial context setup procedure for the publisher UE 81 or the subscriber UE 82a and 82b. There may be standalone procedure to modify the UE context.

At 243a, the base station 83 receives the pub-sub relationship table.

At 243b, the base station 83 selects the user plane transmission method. For example, it may be MBS or RLC channel.

At 244, the subscriber UEs 82a and 82b setup a bearer and context with the core network. This step may not be required if subscriber UE is receiving the context information via broadcast. The procedure may be similar to joining an MBS session. Alternatively, a separate procedure is used to exchange security keys.

The user plane configuration is either provided as part of 244 to the subscriber devices 82a and 82b, i.e. a RRC Reconfiguration message includes the user plane config, or, at 245, a separate RRC Reconfiguration message is sent.

At 246, the publisher UE sends at least the data payload to the base station 83.

At 247, the base station sends the data payload to subscriber UEs 82a and 82b.

FIG. 23 schematically illustrates in a block diagram a seventh embodiment of a user plane protocol stack.

RLC-Based Solution:

In this embodiment, the RLC or a new layer sitting on top of RLC layer will add following information to the header: Source ID, Target ID, Bearer ID, Integrity checksum by the source (optional).

The information may be protected in the source publisher UE and target UE gets the key information via gNB. Optionally, integrity checksum is added by the source, and may be in addition to PDCP based security.

One benefit may be that the traffic will not go to CU ("Central Unit") and may be routed from the DU ("Distributed Unit").

Generally, in such embodiments, the base station is transparent i.e. does not perform any encryption/decryption of traffic between UEs but involved in setting up the security context and a security context exists between publisher UE and subscriber UE.

User Plane Uu MBS-Based Solution:

Subscriber UE has unicast connection. Subscriber UE either join the session (like multicast) or not (like free to air broadcast). The exact mechanism for user plane transmission is based on NIBS mechanisms.

The control plane protocol stack and the API discussed under reference of FIG. 13 also apply here.

Figure 24:
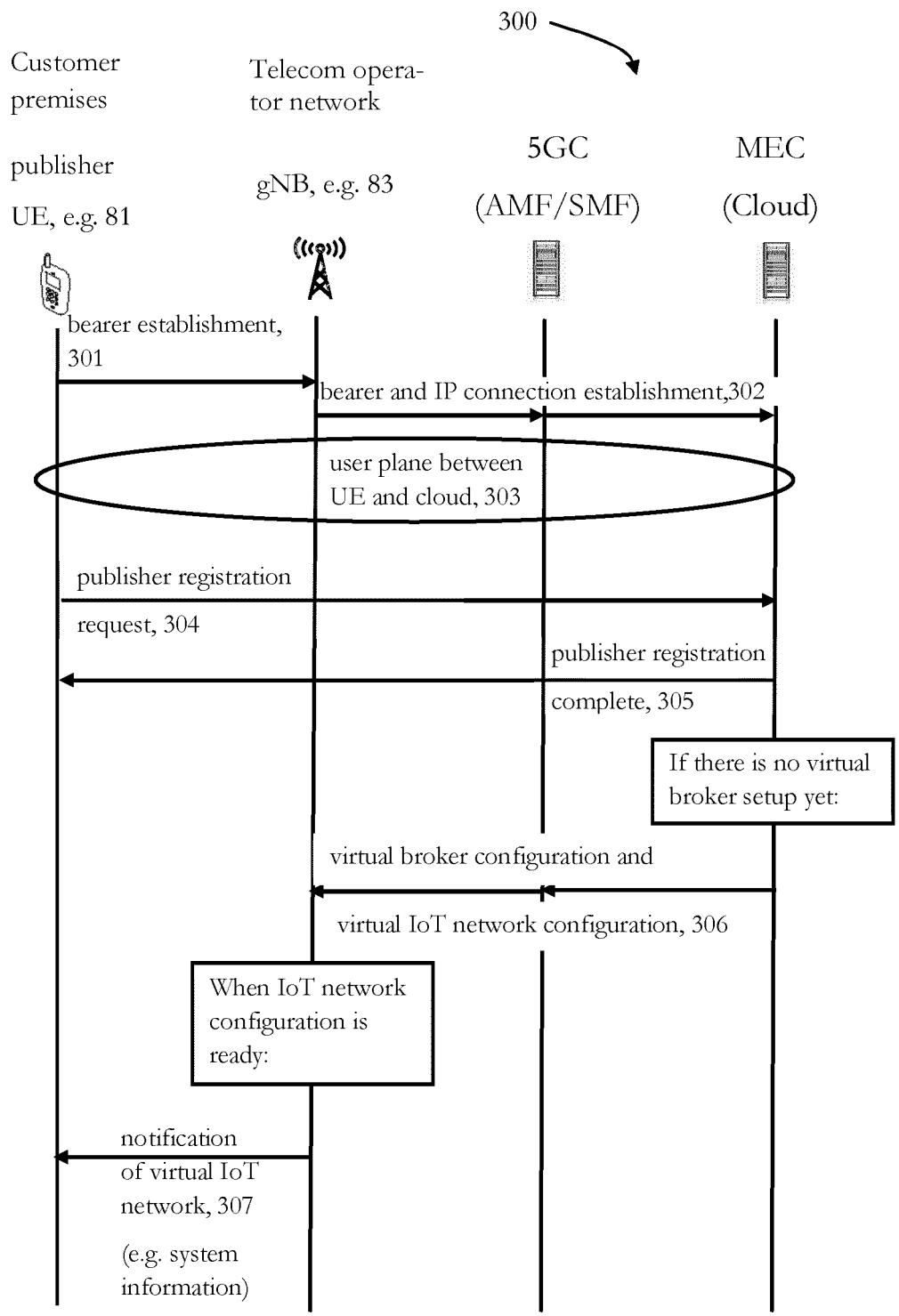
FIG. 24 schematically illustrates in a flow diagram an embodiment of a setup method for a virtual broker and a virtual internet-of-things network.

FIG. 24 schematically illustrates in a flow diagram an embodiment of a setup method 300 for a virtual broker and a virtual internet-of-things network.

The method 300 shows an embodiment of publisher registration (and subscriber) and a setup of the virtual broker and the virtual IoT network.

At 301 and 302, a publisher device (e.g. publisher device 81) sends a request for bearer establishment to the core network via a base station (e.g. gNB 83).

At 303, the user plane between publisher UE and MEC is established (for pub-sub protocol).

At 304, the publisher UE sends the publisher UE registration request (or subscriber UE registration request if a subscriber device registers) to the MEC.

At 305, the MEC sends back the completion acknowledgment of publisher UE registration to core network (via base station to the publisher device).

At 306, if the virtual IoT network has not been setup yet, the MEC initiates the virtual IoT network to the core network node and the core network node requests the base station to allocate the resource and configure the virtual IoT network.

At 307, when the virtual IoT network is ready, the base station notifies the virtual IoT network to the publisher UE (e.g. system information, or paging) and the publisher UE starts the operation in the virtual IoT network.

Returning to the general explanations, some embodiments pertain to a network broker circuitry in a network for an internet-of-things network, wherein the network broker circuitry is configured to communicate with one or more publisher devices and with a plurality of subscriber devices, wherein the network broker circuitry is further configured to:

set up a bearer with the network for a publisher device of the one or more publisher devices that is registered as a publisher for a data category at the network broker circuitry in the network;

receive, via Uu interface, published data from the publisher device of the one or more publisher devices, wherein the published data includes data payload and a data identifier indicating the data category of the data payload; and transmit, via Uu interface, at least the data payload of the received published data to the at least one subscriber device of the plurality of subscriber devices that is registered as a subscriber for the data category at the network broker circuitry in the network.

Some embodiments pertain to a base station for an internet-of-things network, wherein the base station includes circuitry configured to communicate with one or more publisher devices, with a plurality of subscriber devices and a network broker circuitry in a network, wherein the circuitry is further configured to:

set up a bearer with the network for a publisher device of the one or more publisher devices that is registered as a publisher for a data category at the network broker circuitry in the network;

receive publisher-subscriber relationship information from the network broker circuitry, wherein the publisher subscriber relationship information indicates at least one subscriber device of the plurality of subscriber devices that is registered as a subscriber for the data category at the network broker circuitry; and select a transmission method for relaying data between the publisher device of the one or more publisher devices and the at least one subscriber device of the plurality of subscriber devices.

The base station is a base station of a mobile telecommunications system, wherein the mobile telecommunications system may be based on aspects and methods of UMTS, LTE, LTE-A, NR, 5G system, or the like. The base station may be an eNodeB, a gNB, or the like. The base station is configured to achieve the functions as described herein and, thus, the base station of the mobile telecommunications system is suitable for an internet-of-things network.

In some embodiments, the publisher device of the one or more publisher devices indicates during bearer setup that it is the publisher for the data category and that it is ready to transmit data payload of the data category to the at least one subscriber device of the plurality of subscriber devices.

In some embodiments, the publisher-subscriber relationship information is based on a mapping table kept at the network broker circuitry in the network, wherein the mapping table stores at least a relation between the data category and the subscriber for the data category.

In some embodiments, the circuitry of the base station is further configured to set up a bearer with the network for the at least one subscriber device of the plurality of subscriber devices.

In some embodiments, the publisher-subscriber relationship information is received either during initial context setup for the publisher device of the one or more publisher devices or during initial context setup for the subscriber device of the plurality of subscriber devices.

In some embodiments, the circuitry of the base station is further configured to receive, from the network broker circuitry, a message indicating whether the publisher device of the one or more publisher devices and the at least one subscriber device of the plurality of subscriber devices are authenticated as the publisher and the subscriber in the internet-of-things network.

In some embodiments, the transmission method is based on a MBS session or based on RLC channels.

In some embodiments, in a case of the MBS session, the circuitry of the base station is further configured to:

receive published data from the publisher device of the one or more publisher devices, wherein the published data includes data payload and a data identifier indicating the data category of the data payload; and
transmit, by using a PTP or PTM bearer, at least the data payload of the received published data to the at least one subscriber device of the plurality of subscriber devices, wherein a security context exists between the publisher device of the one or more publisher devices and the network and between the network and the at least one subscriber device of the plurality of subscriber devices.

In some embodiments, the PTP or the PTM bearer is selected by the network.

In some embodiments, in a case of the RLC channels, the circuitry of the base station is further configured to:
provide a user plane configuration to the at least one subscriber device of the plurality of subscriber devices;
receive published data from the publisher device of the one or more publisher devices, wherein the published data includes data payload and a data identifier indicating the data category of the data payload; and
transmit at least the data payload of the received published data to the at least one subscriber device of the plurality of subscriber devices, wherein a security context exists between the publisher device of the one or more publisher devices and the at least one subscriber device of the plurality of subscriber devices.

In some embodiments, the circuitry of the base station is further configured to add a source identifier, a target identifier and a bearer identifier to a header when at least the data payload is transmitted to the at least one subscriber device of the plurality of subscriber devices.

In some embodiments, the user plane configuration is provided in a RRC Reconfiguration message.

In some embodiments, the circuitry of the base station is further configured to set up, via the network, a bearer for the at least one subscriber device of the plurality of subscriber devices, wherein the user plane configuration is provided in the RRC Reconfiguration message which is transmitted during bearer setup.

Some embodiments pertain to a publisher device for an internet-of-things network, wherein the publisher device includes circuitry configured to communicate with a base station, wherein the circuitry is further configured to:
set up a bearer with a network via the base station, wherein the publisher device is registered as a publisher for a data category at a network broker circuitry in the network; and
transmit published data to the base station, wherein the published data includes data payload and a data identifier indicating the data category of the data payload.

Some embodiments pertain to a subscriber device for an internet-of-things network, wherein the subscriber device includes circuitry configured to communicate with a base station, wherein the circuitry is further configured to:
receive at least data payload of the data category from the base station, wherein the at least one subscriber device is registered as subscriber for the data category at a network broker circuitry in a network.

Figure 25:
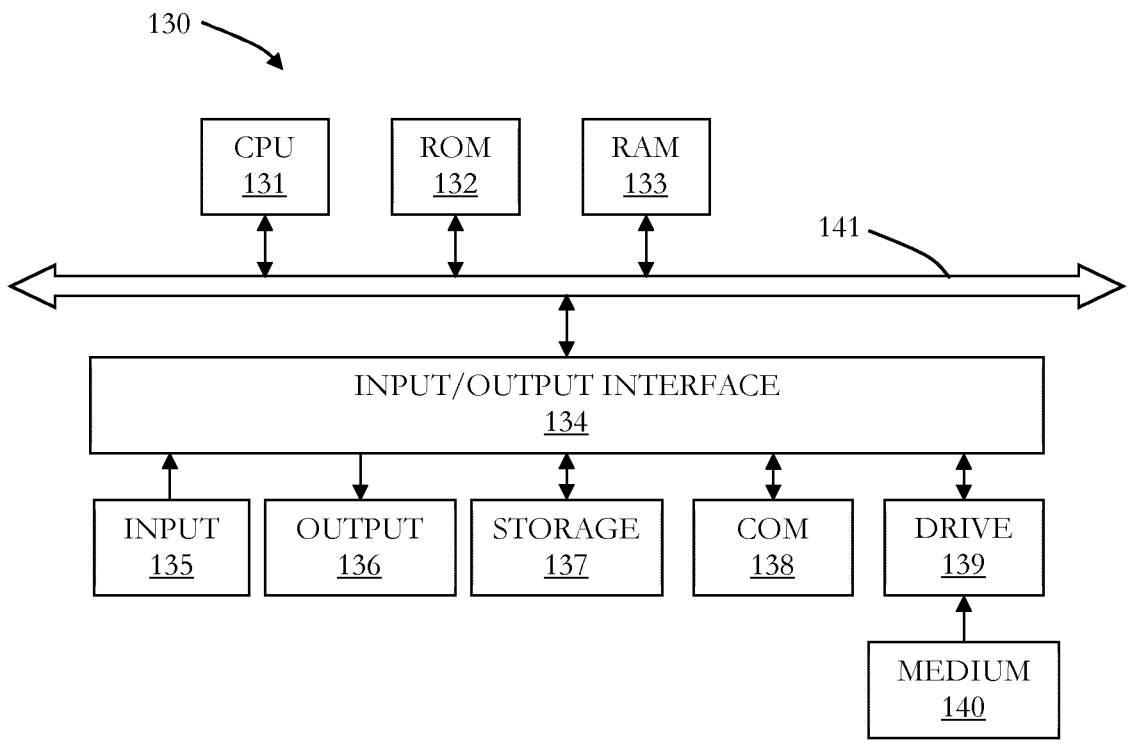
FIG. 25 schematically illustrates in a block diagram an embodiment of a general-purpose computer for implementing a broker circuitry, a broker device, a network broker circuitry, a base station, a publisher device and a subscriber device for an internet-of-things network.

Referring to FIG. 25, there is illustrated in a block diagram a multi-purpose computer 130 which can be used for implementing a broker circuitry, a broker device, a network broker circuitry, a base station, a publisher device and a subscriber device.

The computer 130 can be implemented such that it can basically function as any type of broker circuitry, broker device, network broker circuitry, base station, publisher device and subscriber device as described herein. The computer has components 131 to 141, which can form a circuitry, such as any one of the circuitries of the broker device, the base station and publisher or subscriber devices, and the like as described herein.

Embodiments which use software, firmware, programs or the like for performing the methods as described herein can be installed on computer 130, which is then configured to be suitable for the concrete embodiment.

The computer 130 has a CPU 131 (Central Processing Unit), which can execute various types of procedures and methods as described herein, for example, in accordance with programs stored in a read-only memory (ROM) 132, stored in a storage 137 and loaded into a random access memory (RAM) 133, stored on a medium 140 which can be inserted in a respective drive 139, etc.

The CPU 131, the ROM 132 and the RAM 133 are connected with a bus 141, which in turn is connected to an input/output interface 134. The number of CPUs, memories and storages is only exemplary, and the skilled person will appreciate that the computer 130 can be adapted and configured accordingly for meeting specific requirements which arise, when it functions as a broker device, a base station, a publisher device or as a subscriber device and the like as described herein.

At the input/output interface 134, several components are connected: an input 135, an output 136, the storage 137, a communication interface 138 and the drive 139, into which a medium 140 (compact disc, digital video disc, compact flash memory, or the like) can be inserted.

The input 135 can be a pointer device (mouse, graphic table, or the like), a keyboard, a microphone, a camera, a touchscreen, etc.

The output 136 can have a display (liquid crystal display, cathode ray tube display, light emittance diode display, etc.), loudspeakers, etc.

The storage 137 can have a hard disk, a solid-state drive and the like.

The communication interface 138 can be adapted to communicate, for example, via a local area network (LAN), wireless local area network (WLAN), mobile telecommunications system (GSM, UMTS, LTE, NR etc.), D2D, Bluetooth, ZIGBEE, infrared, etc. as described herein.

It should be noted that the description above only pertains to an example configuration of computer 130. Alternative configurations may be implemented with additional or other sensors, storage devices, interfaces or the like. For example, the communication interface 138 may support other radio access technologies than the mentioned UMTS, LTE and NR.

When the computer 130 functions as a broker device, the communication interface 138 can further have a respective air interface (providing e.g. E-UTRA protocols OFDMA (downlink) and SC-FDMA (uplink)) and network interfaces (implementing for example protocols such as S1-AP, GTP-U, S1-MME, X2-AP, or the like). The computer 130 is also implemented to transmit data in accordance with TCP. Moreover, the computer 130 may have one or more antennas and/or an antenna array. The present disclosure is not limited to any particularities of such protocols.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

B. Consensus Reaching on Published Data in a Publisher-Subscriber Network

Basically, the previous chapter A summarizes embodiments related to the general functions and implementations of a publisher-subscriber network (for an internet-of-things network). The embodiments discussed there also apply in this chapter B.

Before a detailed description of the embodiments under reference of FIG. 26 is given, general explanations are made.

As mentioned in the outset, in a conventional 3GPP network, the security is provided by 3GPP nodes because all the terminals are controlled under the 3GPP network. Typically, security in 3GPP networks is based on public key infrastructure ("PKI").

However, it has been recognized that publisher-subscriber networks (e.g., for an internet-of-things network) may mix non-3GPP terminals and non-3GPP networks with 3GPP networks (e.g., mobile telecommunications system).

In conventional communication security, the symmetric key encryption scheme is widely used on the one hand. Both a sender and a receiver have the same secret key, for example, 3GPP uses a pre-shared key approach in which both the network (subscriber database) and the UE (USIM) have the root secret key. The actual key during communication is not directly the root key, however, a key derived from the root key is used.

On the other hand, the asymmetric key encryption scheme is also used, for example, in the Internet. A sender and a receiver have a different key. One is a secret key and the other is a public key which are paired. The asymmetric keys can be used for either encryption or digital signature depending on the expected purpose.

For Digital Signature, Typically:

The sender generates the digital signature from data (e.g., hash value of data), wherein both the sender and the receiver have the same hash function and, data should not be encrypted because the receiver needs the same hash calculation (if data is encrypted, hash value should be calculated based on encrypted data). The sender uses the secret key for hash value encryption and the sender transmits both data and encrypted hash value. The receiver receives the data and hash value of the data from the sender, wherein the hash value is encrypted with the secret key. The point is only the sender knows the secret key. The receiver calculates the hash value from the data. The receiver uses the public key for decryption of the hash value from sender. If both hash values are the same, it is confirmed that the data is sent by the sender and not modified by someone else.

For Encryption, Typically:

The sender uses the public key for data encryption. The receiver uses the secret key for decryption. When the sender broadcast data to many receivers, the receiver who has the secret key can decrypt the data. As a result, the receiver can disclose the public key, and anyone can send the encrypted data to the receiver with the public key. However, the encryption processing load may be high. The public key encryption may be useful when multiple senders use the public key and a single receiver decrypt it.

It has been recognized that for a publisher-subscriber network, however, communication is based on a single sender (the publisher) and multiple receivers (the subscribers) such that the publisher may need to separately encrypt the data for each subscriber which may be inefficient.

Thus, it has been recognized that a different security mechanism should be adapted for publisher-subscriber networks in some embodiments. In particular, it has been recognized that a blockchain-based security mechanism should be adapted for publisher-subscriber networks, in some embodiments, in which a sender (the publisher) attaches a hash value (the digital signature) with the published data, which may ensure data integrity.

For enhancing the general understanding of the present disclosure, some aspects of a blockchain and of information security are briefly discussed in the following, which, however, should not be construed as binding or limiting.

A blockchain is a kind of distributed database (which may also be referred to as "a distributed ledger" (DLT)), wherein the same data is stored in multiple nodes. When data is stored in the blockchain, the signature (hash value) of the data is also stored with the data. The signature is provided by a hash function (e.g., "Secure Hash Algorithm 2" (SHA2)), wherein the input is the data and the output is the hash value (which may be of fixed size). The data to be stored is cross-checked (consensus) among other nodes, and not allowed to change after commitment. When the data is modified by an unauthorized party, the hash value of the modified data should be different from the original hash value. Thus, unauthorized use or manipulation may be detected.

A use of a blockchain in 3GPP networks has been proposed in: 3GPP TSG RAN WG e-Meeting #91-e, RP-210619, "Support of Blockchain for 5G Advanced", proposed by ZTE.

Typically, information security is related to factors such as confidentiality, data integrity, availability and non-repudiation.

Confidentiality: In information security, confidentiality may be regarded as the property that information is not made available or disclosed to unauthorized individuals, entities, or processes.

Data integrity: In information security, (data) integrity may mean maintaining and assuring the accuracy and completeness of data over its entire lifecycle. This means that data may not be modified in an unauthorized or undetected manner.

Availability: For any information system to serve its purpose, the information should be available when it is needed. This means the computing systems used to store and process the information, the security controls used to protect it, and the communication channels used to access it should function correctly.

Non-repudiation may imply that one party of a transaction cannot deny having received a transaction, nor can the other party deny having sent a transaction.

The embodiments discussed in this chapter B are thus related to security aspects for publisher-subscriber networks for providing a security mechanism in publisher-subscriber networks, in particular, the embodiments relate to data integrity, availability and non-repudiation based on a blockchain provided by the publisher-subscriber network.

It has been recognized that, for data integrity, there may be a risk that an unauthorized party may misuse the publisher-subscriber network. For example, the published data may be changed/modified somewhere between a publisher and a subscriber. An unauthorized device may spoof the published data by pretending to be a publisher or a subscriber.

On the one hand, in a traditional 3GPP network, a device (e.g., a user equipment) is authenticated by 3GPP credentials (SIM card or e-SIM) and some of important traffic (e.g., control plane signaling, optionally user plane data) is protected by the 3GPP integrity function, which guarantees the integrity within the 3GPP network.

On the other hand, the publisher-subscriber network is open for non-3GPP devices or non-3GPP networks such that there may be a higher risk of an unauthorized party misusing it.

Hence, providing a data integrity function for a publisher-subscriber network may block such malicious behaviors.

It has been recognized that, for availability, on the one hand, in a traditional 3GPP network, the core network nodes are in charge of security such as authentication, encryption and integrity. When a key node (e.g., Home Subscriber Server, HSS) is broken down, it impacts on the whole network.

On the other hand, a blockchain is a decentralized system, which may consist of multiple nodes for reaching a consensus. When one of nodes is broken down, it is possible to continue working when there are multiple nodes, which may avoid the risk of single failure point.

It has been recognized, for non-repudiation, in a traditional 3GPP network, the network offers point-to-point bearer service of user plane data, which may support the data integrity, but it is transparent in terms of data contents.

In future (6G) networks, the network may support the trust service like the proof of the integrity and origin of data. For example, the sender sends the data on the volume of $CO_2$ emission, the receiver receives it. However, for some reason such as a database error, the receiver has a wrong record and the conventional network may not be able to verify which one is correct.

It has been recognized that a blockchain (e.g. distributed ledger) can offer the non-repudiation function because the multiple nodes endorse the data from sender.

Hence, it has been recognized that such functions should be provided for publisher-subscriber networks, which will be discussed in the following.

It has thus been recognized that a solution for data integrity (and availability and non-repudiation) should be provided for publisher-subscriber networks. In particular, it has been recognized that the data integrity is an important aspect for publisher-subscriber networks and that the data integrity may be provided based on a combination of a digital signature and a blockchain.

Accordingly, a blockchain-based integrity function is introduced, in some embodiments, for a publisher-subscriber network such that the publisher-subscriber network may support data integrity, high availability, and non-repudiation. These characteristics may be suitable for mission critical purposes such as sensor network/industry IoT.

Consequently, some embodiments pertain to a method for reaching consensus on published data for a publisher-subscriber network, the publisher-subscriber network including a broker circuitry configured to provide a broker, a publisher device that is registered as a publisher for a data category at the broker, and a plurality of subscriber devices, wherein each of the plurality of subscriber devices is registered as a subscriber for the data category at the broker, wherein the publisher-subscriber network is configured to provide a blockchain, wherein the method includes:

performing, by the publisher-subscriber network, a consensus reaching process on the published data for storing the published data in the blockchain.

Generally, a corresponding publisher-subscriber network which performs any of the methods for reaching consensus on published data, as described herein, is also envisaged as an aspect of the present disclosure.

Hence, some embodiments pertain to a publisher-subscriber network, the publisher-subscriber network including a broker circuitry configured to provide a broker, a publisher device that is registered as a publisher for a data category at the broker, and a plurality of subscriber devices, wherein each of the plurality of subscriber devices is registered as a subscriber for the data category at the broker, wherein the publisher-subscriber network is configured to provide a blockchain and to perform a consensus reaching process on published data for storing the published data in the blockchain.

Some embodiments pertain to a subscriber device for a publisher-subscriber network, the subscriber device including circuitry configured to communicate with a publisher device and a broker circuitry, wherein the circuitry is further configured to:

participate in a consensus reaching process on published data for storing the published data in a blockchain.

Some embodiments pertain to a publisher device for a publisher-subscriber network, the publisher device including circuitry configured to communicate with a plurality of subscriber devices and a broker circuitry, wherein the circuitry is further configured to:

transmit published data and a hash value to the plurality of subscriber devices for performing a consensus reaching process on the published data for storing the published data in a blockchain, wherein the published data include data payload and a data identifier indicating the data category of the data payload; and determine the hash value from at least one of the data payload and the data identifier.

As mentioned above, any of the publisher device, the broker circuitry and the plurality of subscriber devices can be based on the embodiments discussed in chapter A above such that unnecessary repetition of their features already discussed in chapter A is omitted.

In some embodiments, the publisher device is configured to communicate directly with the plurality of subscriber devices without the broker circuitry. For example, via 3GPP D2D link (as described in chapter A for example). For example, direct communication may be provided for industrial IoT such as robot control and sensors, which requires very low latency.

In some embodiments, the consensus reaching process is performed via the broker circuitry.

In such embodiments, the data, messages, etc. are transmitted via the broker circuitry.

In some embodiments, at least one of the plurality of subscriber devices and the broker circuitry perform the consensus reaching process.

In some embodiments, the plurality of subscriber devices performs the consensus reaching process.

In some embodiments, the broker circuitry performs the consensus reaching process on behalf of the plurality of subscriber devices.

In some embodiments, each of one or more subscriber devices of the plurality of subscriber devices determined to perform the consensus reaching process and the broker circuitry perform the consensus reaching process.

In some embodiments, the one or more subscriber devices of the plurality of subscriber devices are determined based on at least one of a quality of a communication link between a subscriber device of the plurality of subscriber devices and the broker circuitry, a latency of a communication link between a subscriber device of the plurality of subscriber devices and the broker circuitry, and a stability of a communication link between a subscriber device of the plurality of subscriber devices and the broker circuitry.

In some embodiments, the broker circuitry performs the consensus reaching process on behalf of a subscriber device of the plurality of subscriber devices when a quality of a communication link between the subscriber device and the broker circuitry is below a predetermined threshold.

In some embodiments, the broker circuitry performs the consensus reaching process on behalf of a subscriber device of the plurality of subscriber devices when a latency of a communication link between the subscriber device and the broker circuitry is above a predetermined threshold.

In some embodiments, the broker circuitry performs the consensus reaching process on behalf of a subscriber device of the plurality of subscriber devices when a stability of a communication link between the subscriber device and the broker circuitry is below a predetermined threshold.

In some embodiments, the publisher-network includes a plurality of publisher-subscriber networks, wherein the broker circuitry includes a plurality of broker circuitries each being configured to provide a broker in a different publisher-subscriber network of the plurality of publisher-subscriber networks, and wherein the plurality of broker circuitries perform the consensus reaching process for a publisher-subscriber network of the plurality of publisher-subscriber networks.

In some embodiments, the publisher-network includes a plurality of publisher-subscriber networks, wherein the broker circuitry includes a plurality of broker circuitries each being configured to provide a broker in a different publisher-subscriber network of the plurality of publisher-subscriber networks, wherein a first publisher subscriber-network of the plurality of subscriber networks includes a first broker circuitry of the plurality of broker circuitries configured to provide a first broker and a first plurality of subscriber devices of the plurality of subscriber devices each being registered as a subscriber for the data category at the first broker, and wherein the plurality of broker circuitries and the first plurality of subscriber devices perform the consensus reaching process for the first publisher-subscriber network.

In some embodiments, the consensus reaching process includes a first consensus reaching process and a second consensus reaching process.

In some embodiments, the first plurality of subscriber devices performs the first consensus reaching process, or, the first broker circuitry performs the first consensus reaching process on behalf of the first plurality of subscriber devices, or, each of one or more first subscriber devices of the first plurality of subscriber devices determined to perform the first consensus reaching process and the first broker circuitry perform the first consensus reaching process.

In some embodiments, the plurality of broker circuitries performs the second consensus reaching process.

In some embodiments, the plurality of broker circuitries performs the second consensus reaching process when the publisher device, being a publisher device of the first publisher-subscriber network and registered as a publisher at the first broker, has transmitted an indication of important information.

In some embodiments, the plurality of broker circuitries performs the second consensus reaching process when a number of nodes involved in a cross-check process in the first consensus reaching process is below a predetermined threshold.

In some embodiments, the plurality of subscriber devices provides the blockchain.

In some embodiments, the plurality of subscriber devices and the publisher device provide the blockchain.

In some embodiments, the publisher-network includes a plurality of publisher-subscriber networks, wherein the broker circuitry includes a plurality of broker circuitries each being configured to provide a broker in a different publisher-subscriber network of the plurality of publisher-subscriber networks, and wherein the plurality of broker circuitries provides the blockchain.

In some embodiments, the method (for reaching consensus on published data for a publisher-subscriber network) includes a publish process, a check process, the consensus reaching process and a commit process.

In some embodiments, the circuitry of the subscriber device is configured to communicate directly with the publisher device.

In some embodiments, the circuitry of the subscriber device is further configured to provide the blockchain.

In some embodiments, the circuitry of the subscriber device is further configured to:
receive the published data and a hash value, wherein the published data include data payload and a data identifier indicating the data category of the data payload; and
determine a second hash value from at least one of the data payload and the data identifier.

In some embodiments, the circuitry of the subscriber device is further configured to determine a check result, wherein the check result indicates whether the hash value and the second hash value are equal.

In some embodiments, the circuitry of the subscriber device is further configured to:
transmit the check result to one or more other subscriber devices; and
receive a check result from the one or more other subscriber devices.

In some embodiments, the circuitry of the subscriber device is further configured to determine, in the consensus reaching process, that a consensus on the published data is reached when a number of check results from the one or more other subscriber devices, which indicate that the hash value and the second hash value are equal, is above a predetermined threshold.

In some embodiments, the circuitry of the subscriber device is further configured to:
transmit a commit message to the one or more other subscriber devices when a consensus on the published data is reached; and
receive a commit message from the one or more other subscriber devices.

In some embodiments, the circuitry of the subscriber device is further configured to store the published data in association with the hash value in the blockchain when a number of commit messages received from the one or more other subscriber devices is above a predetermined threshold.

In some embodiments, the circuitry of the publisher device is configured to communicate directly with the plurality of subscriber devices.

In some embodiments, the circuitry of the publisher device is further configured to provide the blockchain.

In some embodiments, the circuitry of the subscriber device is further configured to:
  receive a commit message from each of the plurality of subscriber devices; and
  store the published data in association with the hash value in the blockchain when a number of received commit messages is above a predetermined threshold.

For designing an architecture of a blockchain-based publisher-subscriber network, the following points may be taken into account:
  Characteristic of communication link(s). It may be preferable for the blockchain to use reliable and real-time (low latency) network. For example, optical fibre or 5G may be suitable in term of this point. However, the publisher-subscriber network may use unlicensed wireless technology (e.g., WiFi), 4G, NB-IoT UE, which may be of high latency and low reliable.
  Redundancy of consensus node(s). The single failure point may be a weak point of making blockchain consensus. More than one node should be involved in making consensus. However, too many nodes may slow down consensus and may not be practical in terms of latency.

In the following, various embodiments of a publisher-subscriber network and a method for reaching consensus on published data for a publisher-subscriber network are discussed in detail.

B.I. Subscriber-Based Consensus

A way to implement the blockchain in a publisher-subscriber network is to implement it in each subscriber device and in the publisher device (there may be more than one publisher devices and a plurality of subscriber devices) of the publisher-subscriber network.

Returning to FIG. 26, there is schematically illustrated in a block diagram a first embodiment of a publisher-subscriber network, which is discussed in the following.

The publisher-subscriber network includes a broker circuitry 400 (e.g., a broker device), a publisher device 401, and a plurality of subscriber devices 402-1, 402-2, 402-3.

The broker circuitry 400 is configured to provide a broker for the publisher-subscriber network.

The publisher device 401 is registered as a publisher for a data category at the broker.

Each of the plurality of subscriber devices 402-1, 402-2, 402-3 is registered as a subscriber (subscriber #1, subscriber #2, subscriber #3) for the data category at the broker.

The publisher-subscriber network is configured to provide a blockchain 403, wherein, here, the plurality of subscriber devices 402-1, 402-2, 402-3 and the publisher device 401 provide the blockchain 403 (as illustrated by the dashed line). In other embodiments, (only) the plurality of subscriber devices 402-1, 402-2, 402-3 provide the blockchain 403.

The publisher device 401 communicates with the plurality of subscriber devices 402-1, 402-2, 402-3 via the broker circuitry 400 (wired or wireless connection). In other embodiments, the publisher device 401 and the plurality of subscriber devices 402-1, 402-2, 402-3 can communicate via a direct communication link such as a 3GPP D2D link. This may be called broker-less pub-sub model because there is physically no broker involved in the communications between the publisher device 401 and the plurality of subscriber devices 402-1, 402-2, 402-3. This may provide, for example, low latency without relay. However, some of broker functions are actually provided by application layer such as registration of publisher and of subscribers.

Figure 27:
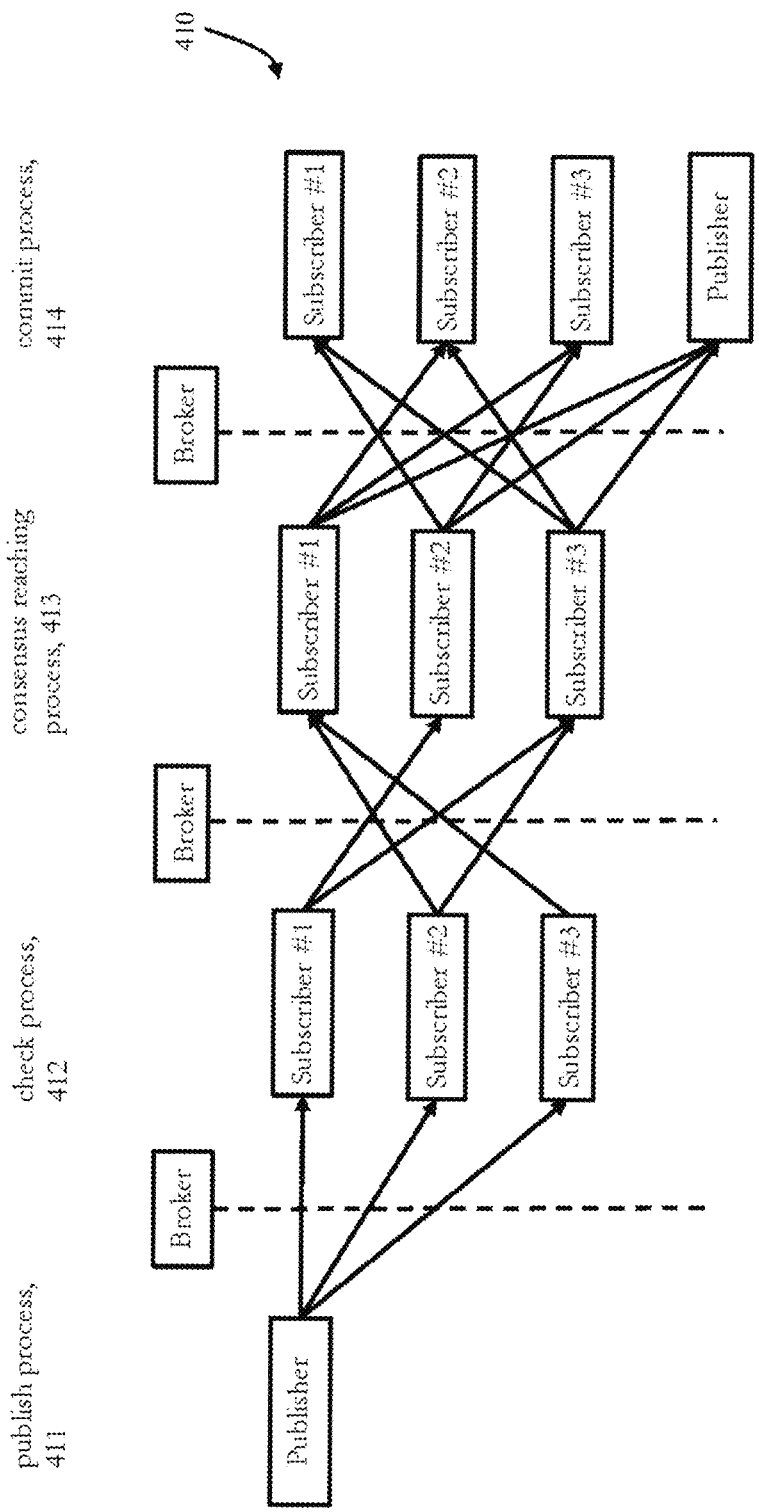
FIG. 27 schematically illustrates in a flow diagram a first embodiment a method for reaching consensus on published data.

A first embodiment of a method 410 for reaching consensus on published data for a publisher-subscriber network is discussed under reference of FIG. 27, which schematically illustrates the method 410 in a flow diagram.

The method 410 is performed by the publisher-subscriber network of FIG. 26.

The method 410 includes a publish process 411, a check process 412, a consensus reaching process 413, and a commit process 414.

In the publish process 411, the publisher device 401 sends data with a hash value to the plurality of subscriber devices 402-1, 402-2, 402-3, wherein both the sender and the receiver have the same hash function.

In other words, in the publish process 411, the publisher device 401 transmits published data and a hash value to the plurality of subscriber devices 402-1, 402-2, 402-3, wherein the published data is include data payload and a data identifier indicating the data category of the data payload, wherein the hash value is determined by the publisher device 401 from at least one of the data payload and the data identifier.

Each of the plurality of subscriber devices 402-1, 402-2, 402-3 receives the published data and the hash value from the publisher device 401.

In the check process 412, the plurality of subscriber devices 402-1, 402-2, 402-3 calculate the hash value by itself and compare it with the publisher's hash value.

In other words, in the check process 412, each of the plurality of subscriber devices 402-1, 402-2, 402-3 determine a second hash value from at least one of the data payload and the data identifier.

Each of the plurality of subscriber devices 402-1, 402-2, 402-3 determines a check result, wherein the check result indicates whether the hash value and the second hash value are equal.

In the consensus reaching process 413, each of the plurality of subscriber devices 402-1, 402-2, 402-3 sends the own check result to other subscriber devices. A subscriber device receives the results from the other subscriber devices and, when the results are OK, it reaches the consensus.

In other words, in the consensus reaching process 413, each of the plurality of subscriber devices 402-1, 402-2, 402-3 transmits the check result to each of the other subscriber devices of the plurality of subscriber devices 402-1, 402-2, 402-3.

Each of the plurality of subscriber devices 402-1, 402-2, 402-3 receives the check result from each of the other subscriber devices of the plurality of subscriber devices 402-1, 402-2, 402-3.

Each of the plurality of subscriber devices 402-1, 402-2, 402-3 determines that a consensus on the published data is reached when a number of the check results, which indicate that the hash value and the second hash value are equal, is above a predetermined threshold.

For example, it may be required that all check results or only a certain fraction of the check results received from the other subscriber devices indicate that both hash values are equal.

In the commit process 414, the subscriber devices send a commit message to the other subscriber devices. When a subscriber device receives the commit messages from other subscriber devices, the subscriber device decides the commitment and write the published data with hash value and, optionally with time stamp and other blockchain information (e.g. nonce, random value) in the blockchain in the subscriber device. Optionally, the subscriber may feedback of commitment result to the publisher.

In other words, in the commit process 414, each of the plurality of subscriber devices 402-1, 402-2, 402-3 transmits a commit message to each of the other subscriber devices of the plurality of subscriber devices 402-1, 402-2, 402-3 when a consensus on the published data is reached.

Each of the plurality of subscriber devices 402-1, 402-2, 402-3 stores the published data in association with the hash value in the blockchain 403 when a number of commit messages received from the other subscriber devices of the plurality of subscriber devices 402-1, 402-2, 402-3 is above a predetermined threshold.

Moreover, each of the plurality of subscriber devices 402-1, 402-2, 402-3 transmits the commit message to the publisher device 401.

The publisher device 401 stores the published data in association with the hash value in the blockchain 403 when a number of received commit messages is above a predetermined threshold.

For example, the predetermined threshold for the number of received commit messages may be the same as the predetermined threshold for positive check results, without limiting the disclosure in this regard.

Based on the publish process 411, the check process 412, the consensus reaching process 413 and the commit process 414, it is confirmed that the received data in the subscriber devices are correct and the same and, thus, are recorded in the blockchain 403 distributed among the plurality of subscriber devices 402-1, 402-2, 402-3 and the publisher device 401.

This architecture may be useful for reliable communication, for example, ultra reliable low latency communications (URLLC) in 5G, or wired communication (e.g., wired connections publisher device-broker circuitry and broker circuitry-subscriber devices). However, there may be some limitations for wireless communications, since many messages are transmitted between the subscriber devices which may consume radio resources and may need retransmission of messages. Moreover, the latency of commitment may be high, channel quality of wireless communication may be unstable such that some messages could be missing due to channel quality deterioration.

Furthermore, when the number of subscriber devices is small in the consensus reaching process (e.g. three or less), the consensus may be unreliable. Hence, in some embodiments, non-subscriber devices in the same publisher-subscriber network may be involved in the consensus reaching process (but not allow to use the published data) in addition to the subscriber devices. In other words, the participants of the topic subscription network and that for blockchain network are different.

B.II. Broker-Based Consensus

A second embodiment of a publisher-subscriber network is discussed under reference of FIG. 28 in the following, which schematically illustrates in a block diagram the second embodiment.

The publisher-subscriber network includes a broker circuitry 420 (e.g., a broker device), a publisher device 421, and a plurality of subscriber devices 422-1, 422-2, 422-3.

The broker circuitry 420 is configured to provide a broker for the publisher-subscriber network.

The publisher device 421 is registered as a publisher for a data category at the broker.

Each of the plurality of subscriber devices 422-1, 422-2, 422-3 is registered as a subscriber (subscriber #1, subscriber #2, subscriber #3) for the data category at the broker.

The publisher-subscriber network is configured to provide a blockchain 423, wherein, here, the plurality of subscriber devices 422-1, 422-2, 422-3 and the publisher device 421 provide the blockchain 423 (as illustrated by the dashed line). In other embodiments, (only) the plurality of subscriber devices 422-1, 422-2, 422-3 provide the blockchain 423.

The publisher device 421 communicates with the plurality of subscriber devices 422-1, 422-2, 422-3 via the broker circuitry 420 (wired or wireless connection). In other embodiments, the publisher device 421 and the plurality of subscriber devices 422-1, 422-2, 422-3 can communicate via a direct communication link such as a 3GPP D2D link.

In this embodiment, the broker circuitry offers the blockchain consensus functions (consensus reaching function) on behalf of the subscriber devices. The broker may have virtual status of each subscriber device.

Figure 29:
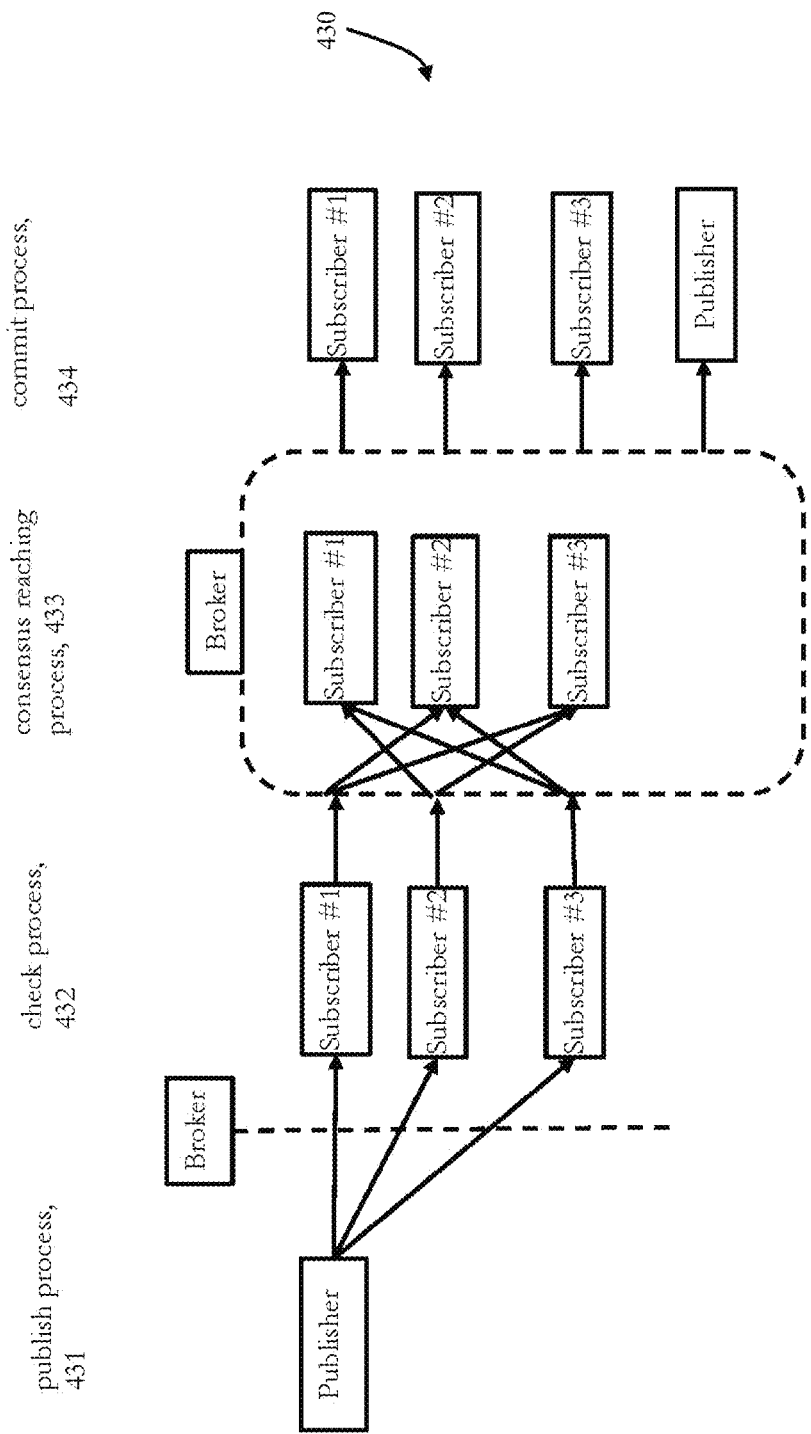
FIG. 29 schematically illustrates in a flow diagram a second embodiment a method for reaching consensus on published data.

A second embodiment of a method 430 for reaching consensus on published data for a publisher-subscriber network is discussed under reference of FIG. 29, which schematically illustrates the method 430 in a flow diagram.

Figure 28:
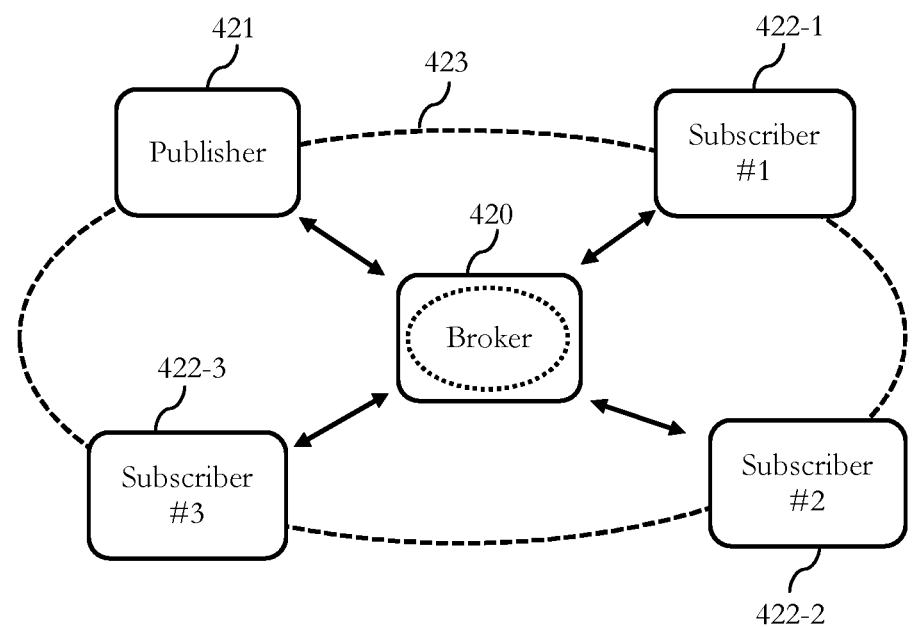
FIG. 28 schematically illustrates in a block diagram a second embodiment of a publisher-subscriber network.

The method 430 is performed by the publisher-subscriber network of FIG. 28.

The method 430 includes a publish process 431, a check process 432, a consensus reaching process 433, and a commit process 434.

The publish process 431 and the check process 432 are the same as the publish process 411 and the check process 412 discussed under reference of FIG. 27 and are incorporated by reference, thus, unnecessary repetition is omitted.

In the consensus reaching process 433, the broker cross checks the other subscriber's results on behalf of a subscriber.

In other words, in the consensus reaching process 433, each of the plurality of subscriber devices 422-1, 422-2, 422-3 transmits the check result to the broker circuitry 420.

The broker circuitry 420 receives the check result from each of the plurality of subscriber devices 422-1, 422-2, 422-3.

The broker circuitry 420 determines for each of the plurality of subscriber devices that a consensus on the published data is reached when a number of the check results, which indicate that the hash value and the second hash value are equal, is above a predetermined threshold.

For example, for subscriber #1, the broker circuitry 420 takes the check results from subscriber #2 and subscriber #3 into account. For example, it may be required that all check results or only a certain fraction of the check results from the other subscriber devices indicate that both hash values are equal.

In the commit process 434, when the results are in line with predetermined settings, the broker makes the commit message. The broker decides the commitment and send the notification of consensus to the subscribers. Optionally, the broker may feedback of commitment result to the publisher. When a subscriber device receives the notification of consensus, the subscribers write the data in the blockchain in subscriber device.

In other words, in the commit process 434, the broker circuitry 420 transmits a commit message to the plurality of subscriber devices 422-1, 422-2, 422-3 when a consensus on the published data is reached.

Each of the plurality of subscriber devices 422-1, 422-2, 422-3 stores the published data in association with the hash value in the blockchain 423 when the commit message is received from the broker circuitry 420.

The broker circuitry 420 transmits the commit message to the publisher device 421.

The publisher device 421 stores the published data in association with the hash value in the blockchain 423 when the commit message is received.

As mentioned above, the broker circuitry 420 (and any other discussed in chapter B) is not limited to a physical device such as a physical publisher-subscriber broker (e.g., relay), since, as discussed in chapter A, the function of the broker can be virtualized and be provided software-based. The function of consensus may be implemented to other nodes such as a base station, MEC, etc. The consensus function may be implemented somewhere in the network (e.g., the base station, MEC.).

The embodiments discussed in chapter B may apply as a replacement of 3GPP security in future (6G) networks.

The broker-based consensus as discussed above, however, may be against the idea of blockchain (distributed ledger), since consensus making in a blockchain is based on multiple parties (distributed nodes). When a single node is tampered or broke down, other remaining nodes may still be working correctly. As a result, consensus may be reliable and data in the blockchain may ensure the integrity.

Hence, the number of nodes which are involved in consensus reaching should be at least more than two. This may be solved, for example, by a hybrid approach, which is based on a combination of subscriber-based and broker-based consensus. This may be further solved by, for example, a publisher-subscriber network chain-based consensus.

B.III. Hybrid Approach

A third embodiment of a publisher-subscriber network is discussed under reference of FIG. 30 in the following, which schematically illustrates in a block diagram the third embodiment.

The publisher-subscriber network includes a broker circuitry 440 (e.g., a broker device), a publisher device 441, and a plurality of subscriber devices 442-1, 442-2, 442-3.

The broker circuitry 440 is configured to provide a broker for the publisher-subscriber network.

The publisher device 441 is registered as a publisher for a data category at the broker.

Each of the plurality of subscriber devices 442-1, 442-2, 442-3 is registered as a subscriber (subscriber #1, subscriber #2, subscriber #3) for the data category at the broker.

The publisher-subscriber network is configured to provide a blockchain 443, wherein, here, the plurality of subscriber devices 442-1, 442-2, 442-3 and the publisher device 441 provide the blockchain 443 (as illustrated by the dashed line). In other embodiments, (only) the plurality of subscriber devices 442-1, 442-2, 442-3 provide the blockchain 443.

The publisher device 441 communicates with the plurality of subscriber devices 442-1, 442-2, 442-3 via the broker circuitry 440 (wired or wireless connection). In other embodiments, the publisher device 441 and the plurality of subscriber devices 442-1, 442-2, 442-3 can communicate via a direct communication link such as a 3GPP D2D link.

In this embodiment, some subscribers are involved in the consensus reaching, others delegate consensus reaching to the broker. For example, subscriber devices with unstable communication may not be involved in consensus reaching but ask it to broker on behalf of it.

Figure 31:
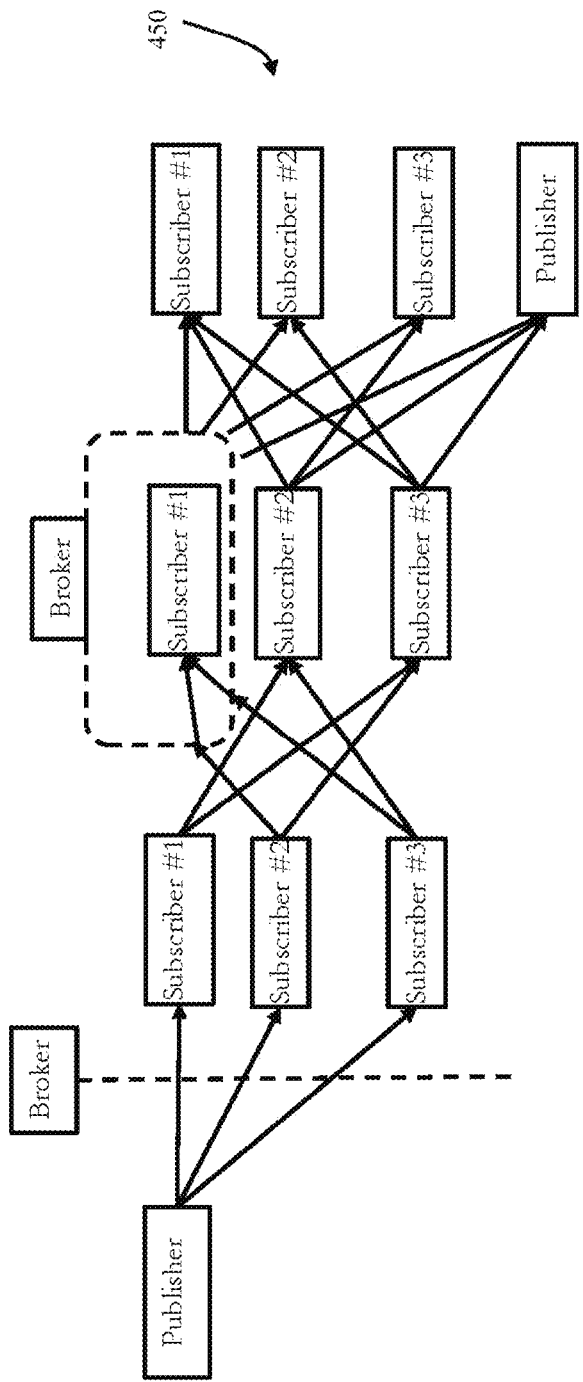
FIG. 31 schematically illustrates in a flow diagram a third embodiment a method for reaching consensus on published data.

A third embodiment of a method 450 for reaching consensus on published data for a publisher-subscriber network is discussed under reference of FIG. 31, which schematically illustrates the method 450 in a flow diagram.

Figure 30:
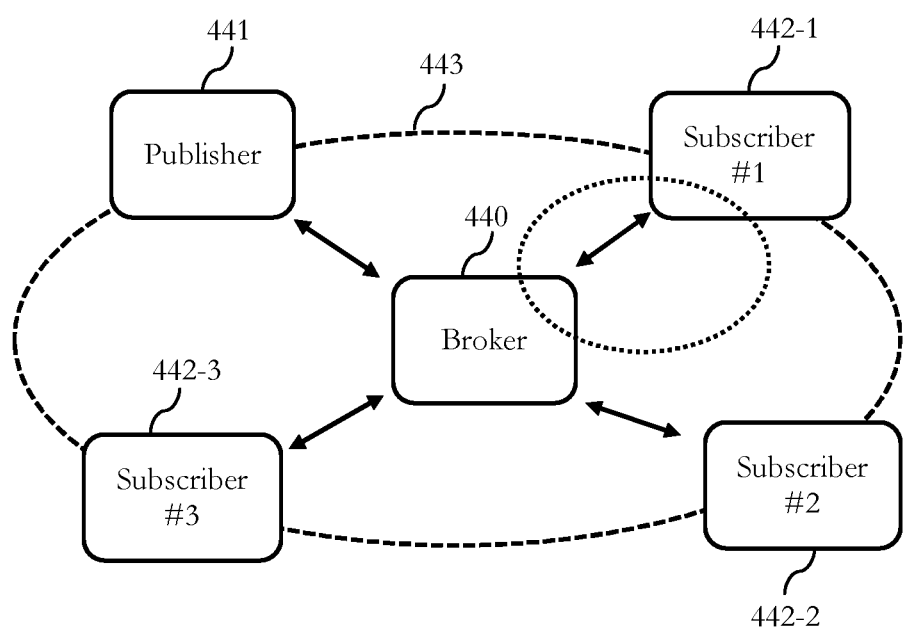
FIG. 30 schematically illustrates in a block diagram a third embodiment of a publisher-subscriber network.

The method 450 is performed by the publisher-subscriber network of FIG. 30.

The method 450 includes a publish process 451, a check process 452, a consensus reaching process 453, and a commit process 454.

The publish process 451 and the check process 452 are the same as the publish process 411 and 431 and the check process 412 and 432 discussed under reference of FIGS. 27 and 29 and are incorporated by reference and, thus, unnecessary repetition is omitted.

In the consensus reaching process 453, the subscriber device(s) which is involved in the consensus reaching process cross checks the other subscriber's results. The broker also cross checks the other subscriber's results on behalf of the subscribers.

In other words, in the consensus reaching process 453, each of the plurality of subscriber devices 442-1, 442-2, 442-3 transmits the check result to the broker circuitry 440 and to each of one or more subscriber devices of the plurality of subscriber devices 442-1, 442-2, 442-3 which are determined to perform the consensus reaching process 453.

The broker circuitry 440 receives the check result from each of the plurality of subscriber devices 442-1, 442-2, 442-3.

Each of the one or more subscriber devices of the plurality of subscriber devices 442-1, 442-2, 442-3 which are determined to perform the consensus reaching process 453 receives the check result from each of the other subscriber devices of the plurality of subscriber devices 442-1, 442-2, 442-3.

The broker circuitry 440 and each of the one or more subscriber devices of the plurality of subscriber devices 442-1, 442-2, 442-3 determines that a consensus on the published data is reached when a number of the check results, which indicate that the hash value and the second hash value are equal, is above a predetermined threshold.

The one or more subscriber devices of the plurality of subscriber devices may be determined based on at least one of a quality of a communication link between a subscriber device of the plurality of subscriber devices 442-1, 442-2, 442-3 and the broker circuitry 440, a latency of a communication link between a subscriber device of the plurality of subscriber devices 442-1, 442-2, 442-3 and the broker circuitry 440, and a stability of a communication link between a subscriber device of the plurality of subscriber devices 442-1, 442-2, 442-3 and the broker circuitry 440.

For example, the broker circuitry 440 performs the consensus reaching process on behalf of a subscriber device of the plurality of subscriber devices 442-1, 442-2, 442-3 when a quality of a communication link between the subscriber device and the broker circuitry 440 is below a predetermined threshold. In order to evaluate the instability of quality of a communication link, the measurement of quality of a communication link may process with hysteresis, smooth filtering, averaging and so on in addition to single threshold.

For example, the broker circuitry 440 performs the consensus reaching process on behalf of a subscriber device of the plurality of subscriber devices 442-1, 442-2, 442-3 when a latency of a communication link between the subscriber device and the broker circuitry 440 is above a predetermined threshold.

For example, the broker circuitry 440 performs the consensus reaching process on behalf of a subscriber device of the plurality of subscriber devices 442-1, 442-2, 442-3 when a stability of a communication link between the subscriber device and the broker circuitry 440 is below a predetermined threshold.

In the commit process 454, when the results are in line with predetermined settings, the broker makes the commit message. The nodes (both broker and subscriber devices which take part in the consensus) reach the agreement, nodes proceed the commitment and send the notification of consensus to other subscriber devices. Optionally, the broker may feedback of commitment result to the publisher. When the subscriber devices receive the notice, subscribers write the data in the blockchain in subscriber device.

In other words, in the commit process 454, the broker circuitry 440 transmits a commit message to the plurality of subscriber devices 442-1, 442-2, 442-3 when a consensus on the published data is reached (("first") consensus in the broker circuitry 440 based on the check results from the plurality of subscriber devices 442-1, 442-2, 442-3).

Each of the one or more subscriber devices of the plurality of subscriber devices 442-1, 442-2, 442-3 which are determined to perform the consensus reaching process 453 transmit a commit message to each of the other subscriber devices of the plurality of subscriber devices 442-1, 442-2, 442-3 when a consensus on the published data is reached (("second") consensus in each of the one or more subscriber devices based on the check results from the other subscriber devices).

Each of the plurality of subscriber devices 442-1, 442-2, 442-3, the published data in association with the hash value in the blockchain when a commit message is received from the broker circuitry 440 and the one or more subscriber devices of the plurality of subscriber devices 442-1, 442-2, 442-3.

Hence, both nodes (broker circuitry 440 and the one or more subscriber devices) reach the agreement.

Here, an unstable wireless link may be avoided compared to the subscriber-based consensus. When an unstable wireless link is in the blockchain, the broker takes in charge of consensus on behalf of the subscriber. Moreover, a single failure point as in the broker-based consensus may be avoided. When broker is broken down or tampered, it is more redundant of consensus reaching process than consensus reaching by a single broker.

However, when the broker may be misused or be broken down, the consensus may be unreliable. For example, if the consensus reaching condition is more than the half of all the nodes agreements, broker should not take the proxy of subscribers more than half subscribers.

B.IV. Publisher-Subscriber Network Chain-Based Consensus

A fourth embodiment of a publisher-subscriber network is discussed under reference of FIG. 32 in the following, which schematically illustrates in a block diagram the fourth embodiment.

The publisher-subscriber network includes a plurality of publisher-subscriber networks (network #1, network #2, network #3).

The broker circuitry includes a plurality of broker circuitries, wherein each is configured to provide a broker (broker #1, broker #2, broker #3) in a different publisher-subscriber network of the plurality of publisher-subscriber networks (network #1, network #2, network #3).

A first publisher subscriber-network (network #1 here for example) of the plurality of subscriber networks (network #1, network #2, network #3) includes a first broker circuitry 460 of the plurality of broker circuitries configured to provide a first broker (broker #1 here for example) and a first plurality of subscriber devices 462-1, 462-2, 462-3 of the plurality of subscriber devices (which provide subscribers #1-1, #1-2, #1-3, #2-1, #2-2, #2-3, #3-1, #3-2, #3-3) each being registered as a subscriber (subscriber #1-1, subscriber #1-2, subscriber #1-3) for the data category at the first broker (broker #1), wherein a blockchain 463 is provided by the plurality of broker circuitries.

A publisher device 461 is a publisher device of the first publisher-subscriber network (network #1) and registered as a publisher at the first broker (broker #1).

The publisher device 461 communicates with the first plurality of subscriber devices 462-1, 462-2, 462-3 via the first broker circuitry 460 (wired or wireless connection).

In this embodiment, the architecture of the blockchain is based on linked brokers among multiple publisher-subscriber networks. As discussed, a consensus based on a single broker may be a weak point of the system and consensus should be made with multiple nodes. Moreover, the brokers have the blockchain instead of the subscriber devices. The links between the brokers may be reliable links such as optical fiber for low latency communication for quick consensus. The links among brokers could use the operation and maintenance (O&M) network in telecom operator, or Cloud network/inter-cloud network and via Internet with secure communication (e.g IPsec protocol) and so on.

Figure 33:
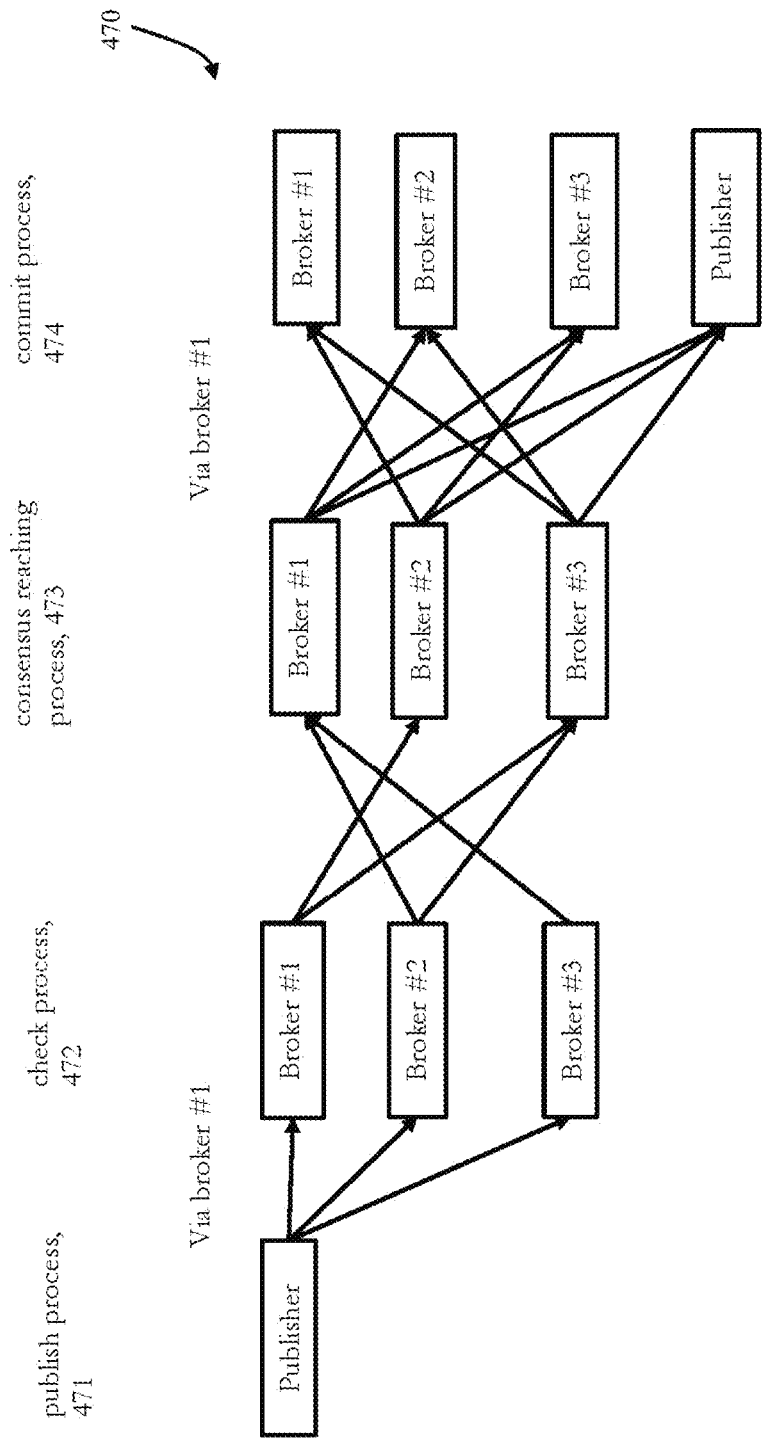
FIG. 33 schematically illustrates in a flow diagram a fourth embodiment a method for reaching consensus on published data.

A fourth embodiment of a method 470 for reaching consensus on published data for a publisher-subscriber network is discussed under reference of FIG. 33, which schematically illustrates the method 470 in a flow diagram.

Figure 32:
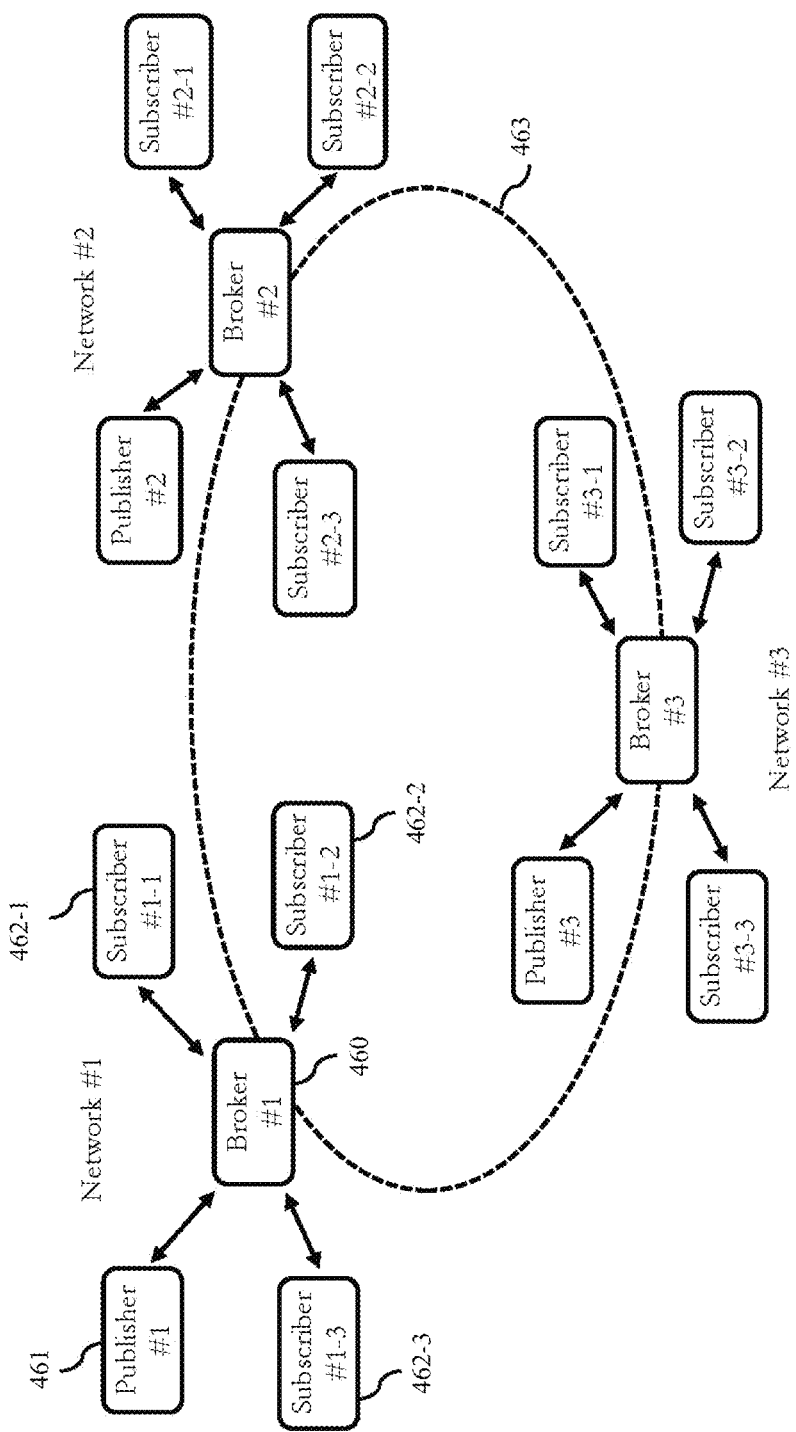
FIG. 32 schematically illustrates in a block diagram a fourth embodiment of a publisher-subscriber network.

The method 470 is performed by the publisher-subscriber network of FIG. 32.

The method 470 includes a publish process 471, a check process 472, a consensus reaching process 473, and a commit process 474.

In the publish process 471, a publisher sends the data with hash value to subscribers via broker #1.

There are no direct communications between publisher and broker #2, broker #3 because it is a different publisher-subscriber network. Thus, broker #1 forwards the data to broker #2, broker #3.

In other words, in the publish process 471, the publisher device 461 transmits the published data and a hash value to the first plurality of subscriber devices 462-1, 462-2, 462-3 via the first broker circuitry 460, wherein the published data include data payload and a data identifier indicating the data category of the data payload, wherein the hash value is determined by the publisher device 461 from at least one of the data payload and the data identifier.

Each of the first plurality of subscriber devices 462-1, 462-2, 462-3 receives the published data and the hash value from the publisher device 461.

The first broker circuitry 460 transmits the published data and the hash value to each of the other broker circuitries of the plurality of broker circuitries.

Each of the other broker circuitries of the plurality of broker circuitries receive the published data and the hash value from the first broker circuitry 460.

In the check process 472, the brokers calculate the hash value by itself and compare it with the publisher's hash value.

In other words, in the check process 472, each of the plurality of broker circuitries determines a second hash value from at least one of the data payload and the data identifier.

Each of the plurality of broker circuitries determines a check result, wherein the check result indicates whether the hash value and the second hash value are equal.

In the consensus reaching process 473, each broker sends the own check result to other brokers for reaching consensus.

In other words, in the consensus reaching process 473, each of the plurality of broker circuitries transmits the check result to each of the other broker circuitries of the plurality of broker circuitries.

Each of the plurality of broker circuitries receives the check result from each of the other broker circuitries of the plurality of broker circuitries.

Each of the plurality of broker circuitries determines that a consensus on the published data is reached when a number of the check results, which indicate that the hash value and the second hash value are equal, is above a predetermined threshold.

In the commit process 474, when it reaches the consensus, each broker sends the commit message to other brokers. When each broker receives the commit messages from other broker, broker decides the commitment and write the data with hash value and, optionally, with time stamp and other blockchain information (e.g. nonce, random value) in the blockchain provided by the plurality of broker circuitries. Optionally, the subscriber may feedback of commitment result to the publisher.

In other words, in the commit process 474, each of the plurality of broker circuitries transmits a commit message to each of the other broker circuitries of the plurality of broker circuitries when a consensus on the published data is reached.

Each of the plurality of broker circuitries stores the published data in association with the hash value in the blockchain when a number of received commit messages is above a predetermined threshold.

B.V. Multi-Layer-Based Consensus

Figure 34:
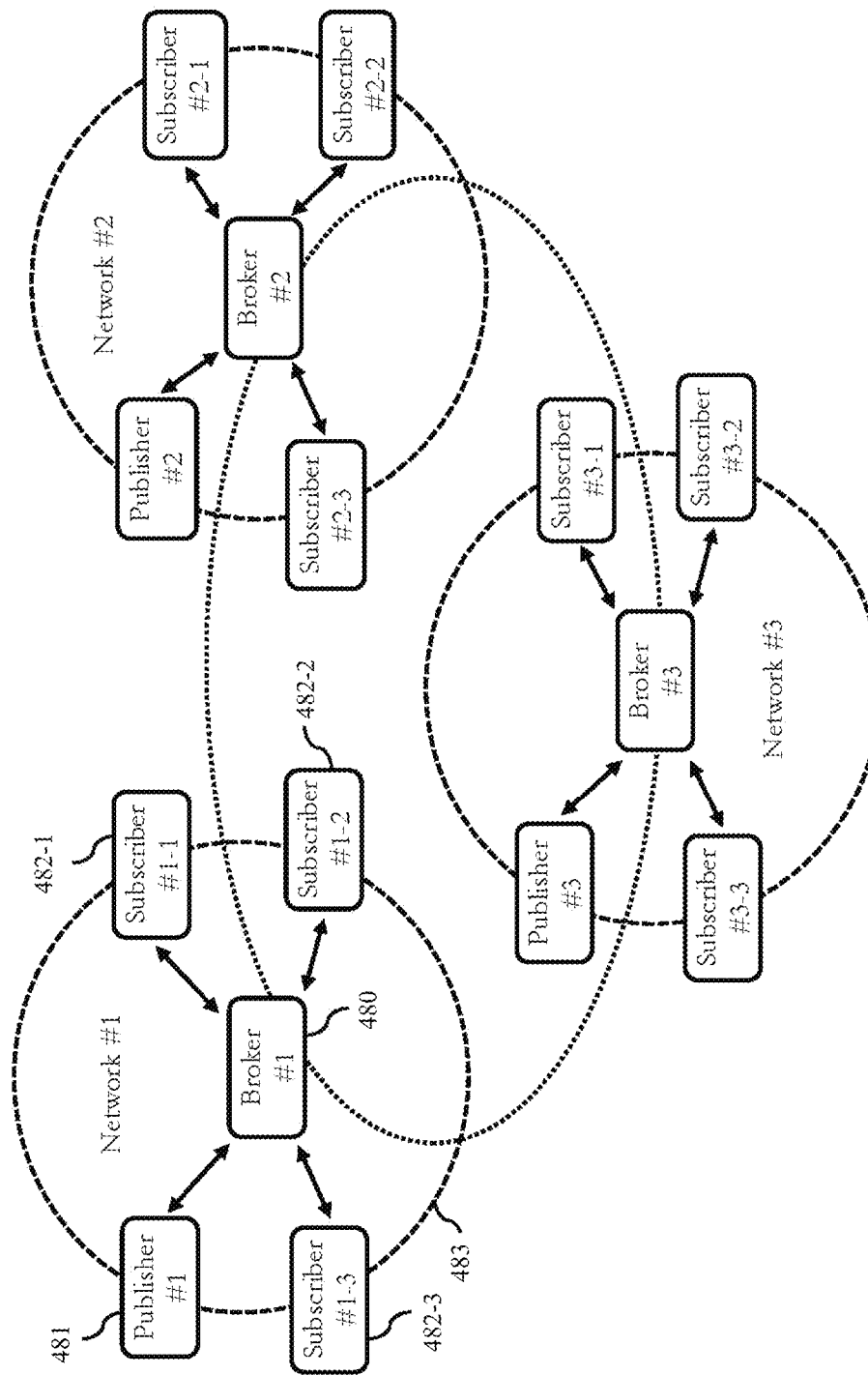
FIG. 34 schematically illustrates in a block diagram a fifth embodiment of a publisher-subscriber network.

A fifth embodiment of a publisher-subscriber network is discussed under reference of FIG. 34 in the following, which schematically illustrates in a block diagram the fifth embodiment.

The publisher-subscriber network includes a plurality of publisher-subscriber networks (network #1, network #2, network #3).

The broker circuitry includes a plurality of broker circuitries, wherein each is configured to provide a broker (broker #1, broker #2, broker #3) in a different publisher-subscriber network of the plurality of publisher-subscriber networks (network #1, network #2, network #3).

A first publisher subscriber-network (network #1 here for example) of the plurality of subscriber networks (network #1, network #2, network #3) includes a first broker circuitry 460 of the plurality of broker circuitries configured to provide a first broker (broker #1 here for example) and a first plurality of subscriber devices 482-1, 482-2, 482-3 of the plurality of subscriber devices (which provide subscribers #1-1, #1-2, #1-3, #2-1, #2-2, #2-3, #3-1, #3-2, #3-3) each being registered as a subscriber (subscriber #1-1, subscriber #1-2, subscriber #1-3) for the data category at the first broker (broker #1).

A publisher device 481 is a publisher device of the first publisher-subscriber network (network #1) and registered as a publisher at the first broker (broker #1).

The first plurality of subscriber devices 482-1, 482-2, 482-3 and the publisher device 481 provide a blockchain 483.

In this embodiment, the architecture of the blockchain is based on linked brokers among multiple publisher-subscriber networks and a multi-layer approach for consensus reaching is used. In this architecture, there are more than one layers for reaching consensus. Firstly, the subscribers are responsible for making consensus (Tier2 consensus), as discussed in the subscriber-based consensus section B.I. Secondly, the brokers are responsible for making consensus (Tier1 consensus), as discussed in the publisher-subscriber network chain-based consensus section B.IV.

Figure 35:
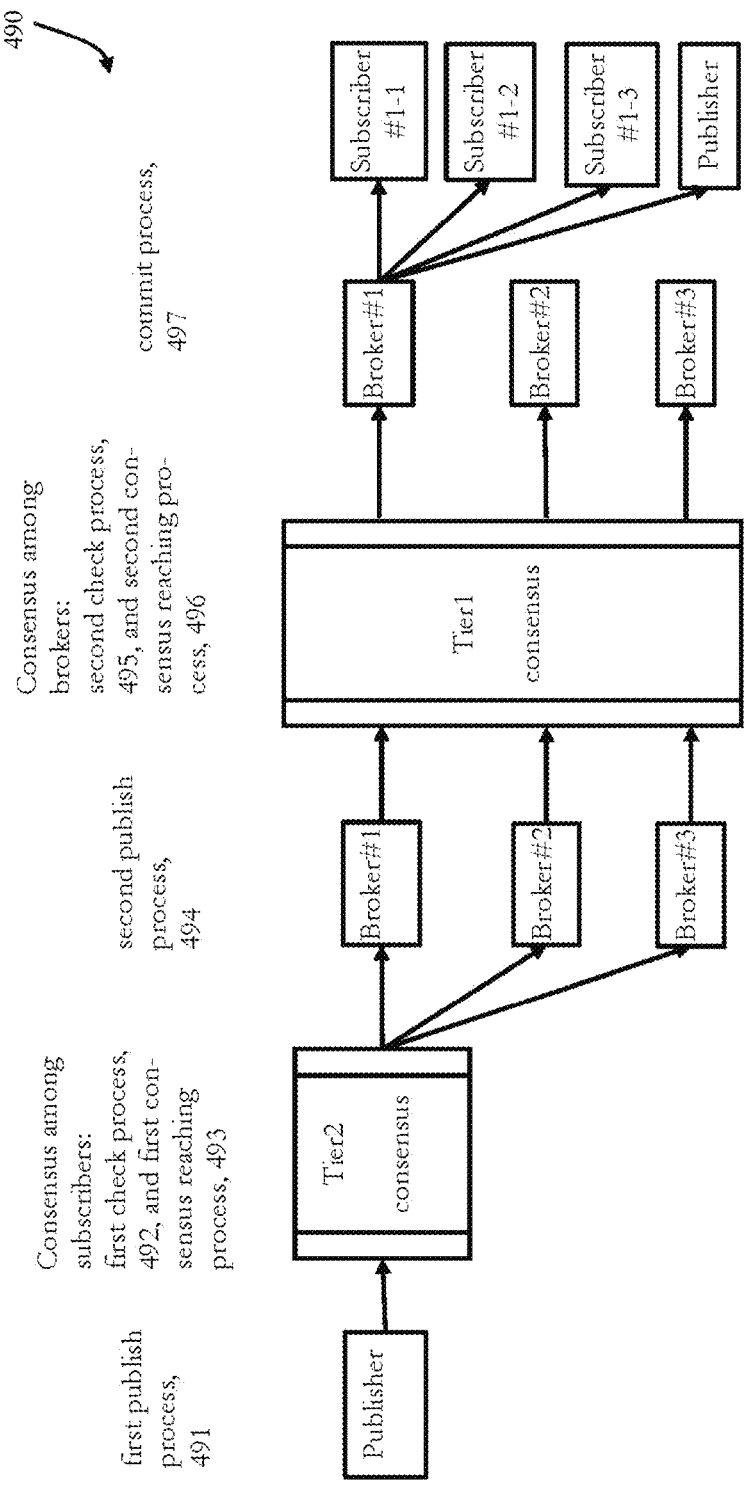
FIG. 35 schematically illustrates in a flow diagram a fifth embodiment a method for reaching consensus on published data.

A fifth embodiment of a method 490 for reaching consensus on published data for a publisher-subscriber network is discussed under reference of FIG. 35, which schematically illustrates the method 490 in a flow diagram.

The method 490 includes a first publish process 491, a first check process 492, a first consensus reaching process 493, a second publish process 494, a second check process 495, a second consensus reaching process 496, and a commit process 497.

In the first publish process 491, a publisher sends the data with hash value to subscribers via broker, as in the subscriber-based consensus approach (section B.I.) discussed above.

In other words, the publisher device 481 transmits the published data and a hash value to the first plurality of subscriber devices 482-1, 482-2, 482-3 via the first broker circuitry 480, wherein the published data include data payload and a data identifier indicating the data category of the data payload, wherein the hash value is determined by the publisher device 481 from at least one of the data payload and the data identifier.

Each of the first plurality of subscriber devices 482-1, 482-2, 482-3 receives the published data and the hash value from the publisher device 481.

Then, a first consensus is to be reached among the first plurality of subscriber devices 482-1, 482-2, 482-3 (Tier2 consensus). The first check process 492 and the first consensus reaching process 493 is performed, which are basically the same processes as in the subscriber-based consensus approach (section B.I.) discussed above. However, the Tier2 consensus may be based also on the broker-based approach (section B.II.) or on the hybrid approach (section B.III.).

Hence, in the first check process 492, each of the first plurality of subscriber devices 482-1, 482-2, 482-3 determines a second hash value from at least one of the data payload and the data identifier.

Each of the first plurality of subscriber devices 482-1, 482-2, 482-3 determines a check result, wherein the check result indicates whether the hash value and the second hash value are equal.

In the first consensus reaching process 493, each of the first plurality of subscriber devices 482-1, 482-2, 482-3 transmits the check result to each of the other subscriber devices of the first plurality of subscriber devices 482-1, 482-2, 482-3.

Each of the first plurality of subscriber devices 482-1, 482-2, 482-3 receives the check result from each of the other subscriber devices of the first plurality of subscriber devices 482-1, 482-2, 482-3.

Each of the first plurality of subscriber devices 482-1, 482-2, 482-3 determines that a first consensus on the published data is reached when a number of the check results, which indicate that the hash value and the second hash value are equal, is above a predetermined threshold.

Accordingly, each of the first plurality of subscriber devices 482-1, 482-2, 482-3 knows whether a first consensus is reached.

When further consensus is needed, subscribers send the results to broker, for example, the publisher provides the indicator of important information as reason for further consensus. The broker may collect the multiple results and combine them to reduce the transactions for further consensus.

In the second publish process 494, the first broker circuitry 480 transmits, when the publisher device has transmitted an indication of important information or when a number of the first plurality of subscriber devices involved in the first consensus reaching process is below a predetermined threshold, the published data and the hash value to each of the other broker circuitries of the plurality of broker circuitries.

Then, the Tier1 consensus is performed which is basically the discussed publisher-subscriber network chain-based consensus approach (section B.IV).

In the second check process 495, each of the plurality of broker circuitries determines a third hash value from at least one of the data payload and the data identifier.

Each of the plurality of broker circuitries determines a check result, wherein the check result indicates whether the hash value and the third hash value are equal.

In the second consensus reaching process 496, each of the plurality of broker circuitries transmits the check result from the second check process 495 to each of the other broker circuitries of the plurality of broker circuitries.

Each of the plurality of broker circuitries receives the check result from the second check process 495 from each of the other broker circuitries of the plurality of broker circuitries.

Each of the plurality of broker circuitries determines that a second consensus on the published data is reached when a number of the check results from the second check process, which indicate that the hash value and the third hash value are equal, is above a predetermined threshold.

Moreover, in the second consensus reaching process 496, each of the first plurality of subscriber devices 482-1, 482-2, 482-3 transmits the check result from the first check process to the first broker circuitry 480.

The first broker circuitry 480 receives the check result from the first check process from each of the first plurality of subscriber devices 482-1, 482-2, 482-3.

The first broker circuitry 480 determines that a third consensus on the published data is reached when a number of check results from the first check process 492, which indicate that the hash value and the second hash value are equal, is above a predetermined threshold.

The first broker circuitry 480 determines that a consensus on the published data is reached when a first consensus is reached in the first consensus reaching process 493 based on the check results from the first check process 492 and the second consensus is reached in the second consensus reaching process 496 based on the check results from the second check process 495.

The first broker circuitry 480 determines that a consensus on the published data is reached when a third consensus is reached based on the check results from the first check process 492 and a second consensus is reached in the second consensus reaching process 496 based on the check results from the second check process 495.

In the commit process 497, each of the other broker circuitries of the plurality of broker circuitries transmits a commit message to at least the first broker circuitry 480 when a second consensus on the published data is reached.

The first broker circuitry 480 transmits a commit message to each of the first plurality of subscriber devices when a number of received commit messages is above a predetermined threshold and a consensus on the published data is reached.

Each of the plurality of subscriber devices 482-1, 482-2, 482-3 transmits a commit message to each of the other subscriber devices of the first plurality of subscriber devices 482-1, 482-2, 482-3 when the commit message is received from the first broker circuitry 480 and a first consensus on the published data is reached in the first consensus reaching process 493.

Each of the first plurality of subscriber devices 482-1, 482-2, 482-3 stores the published data in association with the hash value in the blockchain 483 when a number of commit messages received from the other subscriber devices of the first plurality of subscriber devices 482-1, 482-2, 482-3 is above a predetermined threshold.

Each of the first plurality of subscriber devices 482-1, 482-2, 482-3 transmits the commit message to the publisher device 481.

The publisher device 481 stores the published data in association with the hash value in the blockchain when a number of commit messages received from the first plurality of subscriber devices 482-1, 482-2, 482-3 is above a predetermined threshold.

Based on this method the scalability of the blockchain 483 may be provided. When the number of nodes which are involved in consensus reaching is a too small number, the consensus reaching may be unreliable. By contract, when the number of nodes which are involved in consensus reaching is too large scale, the decision making is too slow to provide the real-time service and it could be too much data for handling in blockchain 483. This method may offer a good balance in terms of high speed and reliability.

Returning to the general explanations, as mentioned above, the broker-based approach (section B.II.) may be combined with the publisher-subscriber network-chain-based approach (section B.IV).

Hence, in some embodiments, the first consensus reaching process includes:
transmitting, by each of the first plurality of subscriber devices, the check result to the first broker circuitry;
receiving, by the first broker circuitry, the check result from each of the first plurality of subscriber devices; and
determining, by the first broker circuitry for each of the first plurality of subscriber devices, that a first consensus on the published data is reached when a number of the check results received from the first plurality of subscriber devices, which indicate that the hash value and the second hash value are equal, is above a predetermined threshold.

In some embodiments, the second publish process includes:
transmitting, by the first broker circuitry, when the publisher device has transmitted an indication of important information, the published data and the hash value to each of the other broker circuitries of the plurality of broker circuitries.

In some embodiments, the second check process includes:
determining, by each of the plurality of broker circuitries, a third hash value from at least one of the data payload and the data identifier; and determining, by each of the plurality of broker circuitries, a check result, wherein the check result indicates whether the hash value and the third hash value are equal.

In some embodiments, the second consensus reaching process includes:
  transmitting, by each of the plurality of broker circuitries, the check result from the second check process to each of the other broker circuitries of the plurality of broker circuitries;
  receiving, by each of the plurality of broker circuitries, the check result from the second check process from each of the other broker circuitries of the plurality of broker circuitries; and
  determining, by each of the plurality of broker circuitries, that a second consensus on the published data is reached when a number of the check results from the second check process, which indicate that the hash value and the third hash value are equal, is above a predetermined threshold.

In some embodiments, the second consensus reaching process further includes:
  determining, by the first broker circuitry, that a consensus on the published data is reached when a first consensus is reached based on the check results from the first check process and a second consensus is reached in the second consensus reaching process based on the check results from the second check process.

In some embodiments, the commit process includes:
  transmitting, by each of the other broker circuitries of the plurality of broker circuitries, a commit message to at least the first broker circuitry when a second consensus on the published data is reached;
  transmitting, by the first broker circuitry, a commit message to each of the first plurality of subscriber devices when a number of commit messages received from the other broker circuitries of the plurality of broker circuitries is above a predetermined threshold and a consensus on the published data is reached; and
  storing, by each of the first plurality of subscriber devices, the published data in association with the hash value in the blockchain when the commit message is received from the first broker circuitry.

In some embodiments, wherein the commit process further includes:
  transmitting, by the first broker circuitry, the commit message to the publisher device; and
  storing, by the publisher device, the published data in association with the hash value in the blockchain when the commit message is received.

As mentioned above, the hybrid approach (section B.III.) may be combined with the publisher-subscriber network-chain-based approach (section B.IV).

Hence, in some embodiments, the first consensus reaching process includes:
  transmitting, by each of the first plurality of subscriber devices, the check result to the first broker circuitry and to each of one or more subscriber devices of the first plurality of subscriber devices which are determined to perform the first consensus reaching process;
  receiving, by the first broker circuitry, the check result from each of the first plurality of subscriber devices;
  receiving, by each of the one or more subscriber devices of the first plurality of subscriber devices which are determined to perform the first consensus reaching process, the check result from each of the other subscriber devices of the first plurality of subscriber devices;
  determining, by the first broker circuitry and by each of the one or more subscriber devices of the first plurality of subscriber devices, that a first consensus on the published data is reached when a number of the check results, which indicate that the hash value and the second hash value are equal, is above a predetermined threshold.

In some embodiments, the second publish process includes:
  transmitting, by the first broker circuitry, when the publisher device has transmitted an indication of important information, the published data and the hash value to each of the other broker circuitries of the plurality of broker circuitries.

In some embodiments, the second check process includes:
  determining, by each of the plurality of broker circuitries, a third hash value from at least one of the data payload and the data identifier; and
  determining, by each of the plurality of broker circuitries, a check result, wherein the check result indicates whether the hash value and the third hash value are equal.

In some embodiments, the second consensus reaching process includes:
  transmitting, by each of the plurality of broker circuitries, the check result from the second check process to each of the other broker circuitries of the plurality of broker circuitries;
  receiving, by each of the plurality of broker circuitries, the check result from the second check process from each of the other broker circuitries of the plurality of broker circuitries; and
  determining, by each of the plurality of broker circuitries, that a second consensus on the published data is reached when a number of the check results from the second check process, which indicate that the hash value and the third hash value are equal, is above a predetermined threshold.

In some embodiments, the second consensus reaching process further includes:
  determining, by the first broker circuitry, that a consensus on the published data is reached when a first consensus is reached based on the check results from the first check process and a second consensus is reached in the second consensus reaching process based on the check results from the second check process.

In some embodiments, the commit process includes:
  transmitting, by each of the other broker circuitries of the plurality of broker circuitries, a commit message to at least the first broker circuitry when a second consensus on the published data is reached;
  transmitting, by the first broker circuitry, a commit message to each of the first plurality of subscriber devices when a number of received commit messages is above a predetermined threshold and a consensus on the published data is reached;
  transmitting, by each of the one or more subscriber devices of the first plurality of subscriber devices which are determined to perform a cross-check process, a commit message to each of the other subscriber devices of the first plurality of subscriber devices when the commit message is received from the first broker circuitry and a first consensus on the published data is reached in the first consensus reaching process; and storing, by each of the plurality of subscriber devices, the published data in association with the hash value in the blockchain when a commit message is received from the first broker circuitry and the one or more subscriber devices of the first plurality of subscriber devices.

B.VI. Brief Summary

The general functionality and implementation of publisher-subscriber networks has been discussed in chapter A, which also applies to the embodiments of chapter B.

The chapter B discussed embodiments related to security aspects in publisher-subscriber networks. A blockchain-based implementation has been discussed in which different embodiments for a method for reaching consensus on published data for a publisher-subscriber network.

The embodiments may be useful, since the published data may be stored immutable in the blockchain with the hash value, which may ensure (data) integrity.

The consensus among multiple nodes may ensure high resistance to external attacks.

The consensus among multiple nodes may provide a high availability (e.g., little down time) by the redundancy with the multiple nodes.

The non-repudiation mechanism may be provided by involving a third party other than a pair of sender and receiver.

A neutral security platform among multi players may be provided.

In conventional 3GPP security mechanism, when non-3GPP UE connects the 3GPP network via non-3GPP access (e.g., WiFi), it is connected via Non-3GPP Inter Working Function (N3IWF). A UE shall establish an Internet Protocol Security (IPsec) tunnel with the N3IWF for connection 3GPP network. IP sec authenticates and encrypts data packets between two pairs (security association). In addition, 3GPP core network authenticates the UE when IPSec tunnel is established (3GPP TS 23.501 for more details). In short, it is assumed that using secure one-to-one link between a sender (UE) and a receiver (N3IWF). It is fit for a bearer between UE and core network.

However, publisher-subscriber network assumes using one-to-many links between publisher and subscribers. In some cases, the link is between non-3GPP UE and another non-3GPP UE via broker. N3IWF is not inserted. The methods discussed herein are independent on the N3IWF and separately provides the data integrity function.

Possible Use Cases:

Contents right protection: If public subscriber network is used for contents distribution, the information on handling copyright may be needed in the blockchain.

For example, the news, weather forecast, video contents are distributed by a publisher, the publisher would like to protect the copyright of contents.

The additional information on the blockchain indicates how to handle the contents, for example the permission of copy, allowance of transfer the received contents to the third party other than a subscriber.

Sensor Network/Industrial IoT:

In 6th generation network, the cellular network may have the capability of sensing in addition to communication. For example, beamforming and THz radar technologies are useful to detect an object. This sensing result can be used for not only cellular communication, but also for the general purpose. For example, a stranded broken-down car can be detected on the highway if 6G base station is located roadside. The sensor can be a publisher and it distributes the sensing result to other equipment as a subscriber. A traffic signal can receive the detected broken-down car and restrict the lane to avoid the collision with other cars. The traffic signal can be a subscriber. Even the other cars can directly, receives the sensing result. In this case, a car is a subscriber.

In the conventional cellular network, the measurement result is internally processed and used for it. However, the concept of sensing network, the sensing result can be openly used for third party. Therefore, the integrity of sensing result is very important because disastrous consequences may be caused if someone maliciously spoof the measurement result.

Certification of important information: In the conventional cellular network, the network can ensure the integrity of user data during the communication. However, it does not offer the proof/verify of user data after transmission. For example, the sensor measures the emission of $CO_2$ in factory, the data can be used for emission trade later. The network may offer the notary services of user data, it can certify the transmission of user data, for example, the sender, time stamp, contents (e.g. $CO_2$ emission), signature (hash value).

Network management: In the conventional cellular network, the network collects and monitors the status of traffic/nodes with operation and maintenance (O&M) network. O&M network is independent from other network and secure communication. However, this is managed by an operator, not multi parties. Pub-sub network is less likely to have independent network like O&M network in telecom operator. This invention can offer the trusted data transmission for it.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A method for reaching consensus on published data for a publisher-subscriber network, the publisher-subscriber network including a broker circuitry configured to provide a broker, a publisher device that is registered as a publisher for a data category at the broker, and a plurality of subscriber devices, wherein each of the plurality of subscriber devices is registered as a subscriber for the data category at the broker, wherein the publisher-subscriber network is configured to provide a blockchain, wherein the method includes:

performing, by the publisher-subscriber network, a consensus reaching process on the published data for storing the published data in the blockchain.

(2) The method of (1), wherein the publisher device is configured to communicate directly with the plurality of subscriber devices without the broker circuitry.

(3) The method of (1) or (2), wherein the consensus reaching process is performed via the broker circuitry.

(4) The method of anyone of (1) to (3), wherein at least one of the plurality of subscriber devices and the broker circuitry perform the consensus reaching process.

(5) The method of (4), wherein the plurality of subscriber devices performs the consensus reaching process.

(6) The method of (4) or (5), wherein the broker circuitry performs the consensus reaching process on behalf of the plurality of subscriber devices.

(7) The method of anyone of (4) to (6), wherein each of one or more subscriber devices of the plurality of subscriber devices determined to perform the consensus reaching process and the broker circuitry perform the consensus reaching process.

(8) The method of (7), wherein the one or more subscriber devices of the plurality of subscriber devices are determined based on at least one of a quality of a communication link between a subscriber device of the plurality of subscriber devices and the broker circuitry, a latency of a communication link between a subscriber device of the plurality of subscriber devices and the broker circuitry, and a stability of a communication link between a subscriber device of the plurality of subscriber devices and the broker circuitry.

(9) The method of (7) or (8), wherein the broker circuitry performs the consensus reaching process on behalf of a subscriber device of the plurality of subscriber devices when a quality of a communication link between the subscriber device and the broker circuitry is below a predetermined threshold.

(10) The method of anyone of (7) to (9), wherein the broker circuitry performs the consensus reaching process on behalf of a subscriber device of the plurality of subscriber devices when a latency of a communication link between the subscriber device and the broker circuitry is above a predetermined threshold.

(11) The method of anyone of (7) to (10), wherein the broker circuitry performs the consensus reaching process on behalf of a subscriber device of the plurality of subscriber devices when a stability of a communication link between the subscriber device and the broker circuitry is below a predetermined threshold.

(12) The method of anyone of (4) to (11), wherein the publisher-subscriber network includes a plurality of publisher-subscriber networks, wherein the broker circuitry includes a plurality of broker circuitries each being configured to provide a broker in a different publisher-subscriber network of the plurality of publisher-subscriber networks, and wherein the plurality of broker circuitries perform the consensus reaching process for a publisher-subscriber network of the plurality of publisher-subscriber networks.

(13) The method of anyone of (4) to (12), wherein the publisher-subscriber network includes a plurality of publisher-subscriber networks, wherein the broker circuitry includes a plurality of broker circuitries each being configured to provide a broker in a different publisher-subscriber network of the plurality of publisher-subscriber networks, wherein a first publisher subscriber-network of the plurality of subscriber networks includes a first broker circuitry of the plurality of broker circuitries configured to provide a first broker and a first plurality of subscriber devices of the plurality of subscriber devices each being registered as a subscriber for the data category at the first broker, and wherein the plurality of broker circuitries and the first plurality of subscriber devices perform the consensus reaching process for the first publisher-subscriber network.

(14) The method of (13), wherein the consensus reaching process includes a first consensus reaching process and a second consensus reaching process.

(15) The method of (14), wherein:
the first plurality of subscriber devices performs the first consensus reaching process, or,
the first broker circuitry performs the first consensus reaching process on behalf of the first plurality of subscriber devices, or,
each of one or more first subscriber devices of the first plurality of subscriber devices determined to perform the first consensus reaching process and the first broker circuitry perform the first consensus reaching process.

(16) The method of (15), wherein the plurality of broker circuitries performs the second consensus reaching process.

(17) The method of (16), wherein the plurality of broker circuitries performs the second consensus reaching process when the publisher device, being a publisher device of the first publisher-subscriber network and registered as a publisher at the first broker, has transmitted an indication of important information.

(18) The method of (16) or (17), wherein the plurality of broker circuitries performs the second consensus reaching process when a number of nodes involved in a cross-check process in the first consensus reaching process is below a predetermined threshold.

(19) The method of anyone of (1) to (18), wherein the plurality of subscriber devices provides the blockchain.

(20) The method of anyone of (1) to (19), wherein the plurality of subscriber devices and the publisher device provide the blockchain.

(21) The method of anyone of (1) to (20), wherein the publisher-network includes a plurality of publisher-subscriber networks, wherein the broker circuitry includes a plurality of broker circuitries each being configured to provide a broker in a different publisher-subscriber network of the plurality of publisher-subscriber networks, and wherein the plurality of broker circuitries provides the blockchain.

(22) The method of anyone of (1) to (21), wherein the method includes a publish process, a check process, the consensus reaching process and a commit process.

(23) The method of (22), wherein the blockchain is provided the plurality of subscriber devices or by the plurality of subscriber devices and the publisher device.

(24) The method of (23), wherein the publish process includes:
transmitting, by the publisher device, the published data and a hash value to the plurality of subscriber devices, wherein the published data include data payload and a data identifier indicating the data category of the data payload, wherein the hash value is determined by the publisher device from at least one of the data payload and the data identifier; and
receiving, by each of the plurality of subscriber devices, the published data and the hash value from the publisher device.

(25) The method of (24), wherein the check process includes:
determining, by each of the plurality of subscriber devices, a second hash value from at least one of the data payload and the data identifier; and
determining, by each of the plurality of subscriber devices, a check result, wherein the check result indicates whether the hash value and the second hash value are equal.

(26) The method of (25), wherein the consensus reaching process includes:
  transmitting, by each of the plurality of subscriber devices, the check result to each of the other subscriber devices of the plurality of subscriber devices;
  receiving, by each of the plurality of subscriber devices, the check result from each of the other subscriber devices of the plurality of subscriber devices; and
  determining, by each of the plurality of subscriber devices, that a consensus on the published data is reached when a number of the check results, which indicate that the hash value and the second hash value are equal, is above a predetermined threshold.

(27) The method of (26), wherein the commit process includes:
  transmitting, by each of the plurality of subscriber devices, a commit message to each of the other subscriber devices of the plurality of subscriber devices when a consensus on the published data is reached; and
  storing, by each of the plurality of subscriber devices, the published data in association with the hash value in the blockchain when a number of commit messages received from the other subscriber devices of the plurality of subscriber devices is above a predetermined threshold.

(28) The method of (27), wherein the commit process further includes:
  transmitting, by each of the plurality of subscriber devices, the commit message to the publisher device; and
  storing, by the publisher device, the published data in association with the hash value in the blockchain when a number of received commit messages is above a predetermined threshold.

(29) The method of (25), wherein the consensus reaching process includes:
  transmitting, by each of the plurality of subscriber devices, the check result to the broker circuitry;
  receiving, by the broker circuitry, the check result from each of the plurality of subscriber devices; and
  determining, by the broker circuitry for each of the plurality of subscriber devices, that a consensus on the published data is reached when a number of the check results, which indicate that the hash value and the second hash value are equal, is above a predetermined threshold.

(30) The method of (29), wherein the commit process includes:
  transmitting, by the broker circuitry, a commit message to the plurality of subscriber devices when a consensus on the published data is reached; and
  storing, by each of the plurality of subscriber devices, the published data in association with the hash value in the blockchain when the commit message is received from the broker circuitry.

(31) The method of (30), wherein the commit process further includes:
  transmitting, by the broker circuitry, the commit message to the publisher device; and
  storing, by the publisher device, the published data in association with the hash value in the blockchain when the commit message is received.

(32) The method of (25), wherein the consensus reaching process includes:
  transmitting, by each of the plurality of subscriber devices, the check result to the broker circuitry and to each of one or more subscriber devices of the plurality of subscriber devices which are determined to perform the consensus reaching process;
  receiving, by the broker circuitry, the check result from each of the plurality of subscriber devices;
  receiving, by each of the one or more subscriber devices of the plurality of subscriber devices which are determined to perform the consensus reaching process, the check result from each of the other subscriber devices of the plurality of subscriber devices;
  determining, by the broker circuitry and by each of the one or more subscriber devices of the plurality of subscriber devices, that a consensus on the published data is reached when a number of the check results, which indicate that the hash value and the second hash value are equal, is above a predetermined threshold.

(33) The method of (32), wherein the commit process includes:
  transmitting, by the broker circuitry, a commit message to the plurality of subscriber devices when a consensus on the published data is reached;
  transmitting, by each of the one or more subscriber devices of the plurality of subscriber devices which are determined to perform the consensus reaching process, a commit message to each of the other subscriber devices of the plurality of subscriber devices when a consensus on the published data is reached; and
  storing, by each of the plurality of subscriber devices, the published data in association with the hash value in the blockchain when a commit message is received from the broker circuitry and the one or more subscriber devices of the plurality of subscriber devices.

(34) The method of (22), wherein the publisher-subscriber network includes a plurality of publisher-subscriber networks, wherein the broker circuitry includes a plurality of broker circuitries each being configured to provide a broker in a different publisher-subscriber network of the plurality of publisher-subscriber networks, wherein a first publisher subscriber-network of the plurality of subscriber networks includes a first broker circuitry of the plurality of broker circuitries configured to provide a first broker and a first plurality of subscriber devices of the plurality of subscriber devices each being registered as a subscriber for the data category at the first broker,
  wherein the blockchain is provided by the plurality of broker circuitries.

(35) The method of (34), wherein the publish process includes:
  transmitting, by the publisher device, the publisher device being a publisher device of the first publisher-subscriber network and registered as a publisher at the first broker, the published data and a hash value to the first plurality of subscriber devices via the first broker circuitry, wherein the published data include data payload and a data identifier indicating the data category of the data payload, wherein the hash value is determined by the publisher device from at least one of the data payload and the data identifier;
  receiving, by each of the first plurality of subscriber devices, the published data and the hash value from the publisher device;
  transmitting, by the first broker circuitry, the published data and the hash value to each of the other broker circuitries of the plurality of broker circuitries; and
  receiving, by each of the other broker circuitries of the plurality of broker circuitries, the published data and the hash value from the first broker circuitry.

(36) The method of (35), wherein the check process includes:
 determining, by each of the plurality of broker circuitries, a second hash value from at least one of the data payload and the data identifier; and
 determining, by each of the plurality of broker circuitries, a check result, wherein the check result indicates whether the hash value and the second hash value are equal.

(37) The method of (36), wherein the consensus reaching process includes:
 transmitting, by each of the plurality of broker circuitries, the check result to each of the other broker circuitries of the plurality of broker circuitries;
 receiving, by each of the plurality of broker circuitries, the check result from each of the other broker circuitries of the plurality of broker circuitries; and
 determining, by each of the plurality of broker circuitries, that a consensus on the published data is reached when a number of the check results, which indicate that the hash value and the second hash value are equal, is above a predetermined threshold.

(38) The method of (37), wherein the commit process includes:
 transmitting, by each of the plurality of broker circuitries, a commit message to each of the other broker circuitries of the plurality of broker circuitries when a consensus on the published data is reached; and
 storing, by each of the plurality of broker circuitries, the published data in association with the hash value in the blockchain when a number of received commit messages is above a predetermined threshold.

(39) The method of (38), wherein the commit process further includes:
 transmitting, by the first broker circuitry, the commit message to the publisher device.

(40) The method of (22), wherein the publisher-subscriber network includes a plurality of publisher-subscriber networks, wherein the broker circuitry includes a plurality of broker circuitries each being configured to provide a broker in a different publisher-subscriber network of the plurality of publisher-subscriber networks, wherein a first publisher subscriber-network of the plurality of subscriber networks includes a first broker circuitry of the plurality of broker circuitries configured to provide a first broker and a first plurality of subscriber devices of the plurality of subscriber devices each being registered as a subscriber for the data category at the first broker,
 wherein the blockchain is provided the first plurality of subscriber devices or by the first plurality of subscriber devices and the publisher device,
 wherein the publish process includes a first publish process and a second publish process, the check process includes a first check process and a second check process, and the consensus reaching process includes a first consensus reaching process and a second consensus reaching process.

(41) The method of (40), wherein the first publish process includes:
 transmitting, by the publisher device, the publisher device being a publisher device of the first publisher-subscriber network and registered as a publisher at the first broker, the published data and a hash value to the first broker circuitry, wherein the published data include data payload and a data identifier indicating the data category of the data payload, wherein the hash value is determined by the publisher device from at least one of the data payload and the data identifier; and
 receiving, by each of the first plurality of subscriber devices, the published data and the hash value from the publisher device.

(42) The method of (41), wherein the first check process includes:
 determining, by each of the first plurality of subscriber devices, a second hash value from at least one of the data payload and the data identifier; and
 determining, by each of the first plurality of subscriber devices, a check result, wherein the check result indicates whether the hash value and the second hash value are equal.

(43) The method of (42), wherein the first consensus reaching process includes:
 transmitting, by each of the first plurality of subscriber devices, the check result to each of the other subscriber devices of the first plurality of subscriber devices;
 receiving, by each of the first plurality of subscriber devices, the check result from each of the other subscriber devices of the first plurality of subscriber devices; and
 determining, by each of the first plurality of subscriber devices, that a first consensus on the published data is reached when a number of the check results, which indicate that the hash value and the second hash value are equal, is above a predetermined threshold.

(44) The method of (43), wherein the second publish process includes:
 transmitting, by the first broker circuitry, when the publisher device has transmitted an indication of important information or when a number of the first plurality of subscriber devices involved in the first consensus reaching process is below a predetermined threshold, the published data and the hash value to each of the other broker circuitries of the plurality of broker circuitries.

(45) The method of (44), wherein the second check process includes:
 determining, by each of the plurality of broker circuitries, a third hash value from at least one of the data payload and the data identifier; and
 determining, by each of the plurality of broker circuitries, a check result, wherein the check result indicates whether the hash value and the third hash value are equal.

(46) The method of (45), wherein the second consensus reaching process includes:
 transmitting, by each of the plurality of broker circuitries, the check result from the second check process to each of the other broker circuitries of the plurality of broker circuitries;
 receiving, by each of the plurality of broker circuitries, the check result from the second check process from each of the other broker circuitries of the plurality of broker circuitries; and
 determining, by each of the plurality of broker circuitries, that a second consensus on the published data is reached when a number of the check results from the second check process, which indicate that the hash value and the third hash value are equal, is above a predetermined threshold.

(47) The method of (46), wherein the second consensus reaching process further includes:

transmitting, by each of the first plurality of subscriber devices, the check result from the first check process to the first broker circuitry;

receiving, by the first broker circuitry, the check result from the first check process from each of the first plurality of subscriber devices;

determining, by the first broker circuitry, that a third consensus on the published data is reached when a number of check results from the first check process, which indicate that the hash value and the second hash value are equal, is above a predetermined threshold; and determining, by the first broker circuitry, that a consensus on the published data is reached when a third consensus is reached based on the check results from the first check process and a second consensus is reached in the second consensus reaching process based on the check results from the second check process.

(48) The method of (47), wherein the commit process includes:

transmitting, by each of the other broker circuitries of the plurality of broker circuitries, a commit message to at least the first broker circuitry when a second consensus on the published data is reached;

transmitting, by the first broker circuitry, a commit message to each of the first plurality of subscriber devices when a number of received commit messages is above a predetermined threshold and a consensus on the published data is reached;

transmitting, by each of the plurality of subscriber devices, a commit message to each of the other subscriber devices of the first plurality of subscriber devices when the commit message is received from the first broker circuitry and a first consensus on the published data is reached in the first consensus reaching process; and storing, by each of the first plurality of subscriber devices, the published data in association with the hash value in the blockchain when a number of commit messages received from the other subscriber devices of the first plurality of subscriber devices is above a predetermined threshold.

(49) The method of (48), wherein the commit process further includes:

transmitting, by each of the first plurality of subscriber devices, the commit message to the publisher device; and storing, by the publisher device, the published data in association with the hash value in the blockchain when a number of commit messages received from the first plurality of subscriber devices is above a predetermined threshold.

(50) The method of (42), wherein the first consensus reaching process includes:

transmitting, by each of the first plurality of subscriber devices, the check result to the first broker circuitry;

receiving, by the first broker circuitry, the check result from each of the first plurality of subscriber devices; and determining, by the first broker circuitry for each of the first plurality of subscriber devices, that a first consensus on the published data is reached when a number of the check results received from the first plurality of subscriber devices, which indicate that the hash value and the second hash value are equal, is above a predetermined threshold.

(51) The method of (50), wherein the second publish process includes:

transmitting, by the first broker circuitry, when the publisher device has transmitted an indication of important information, the published data and the hash value to each of the other broker circuitries of the plurality of broker circuitries.

(52) The method of (51), wherein the second check process includes:

determining, by each of the plurality of broker circuitries, a third hash value from at least one of the data payload and the data identifier; and determining, by each of the plurality of broker circuitries, a check result, wherein the check result indicates whether the hash value and the third hash value are equal.

(53) The method of (52), wherein the second consensus reaching process includes:

transmitting, by each of the plurality of broker circuitries, the check result from the second check process to each of the other broker circuitries of the plurality of broker circuitries;

receiving, by each of the plurality of broker circuitries, the check result from the second check process from each of the other broker circuitries of the plurality of broker circuitries; and determining, by each of the plurality of broker circuitries, that a second consensus on the published data is reached when a number of the check results from the second check process, which indicate that the hash value and the third hash value are equal, is above a predetermined threshold.

(54) The method of (53), wherein the second consensus reaching process further includes:

determining, by the first broker circuitry, that a consensus on the published data is reached when a first consensus is reached based on the check results from the first check process and a second consensus is reached in the second consensus reaching process based on the check results from the second check process.

(55) The method of (54), wherein the commit process includes:

transmitting, by each of the other broker circuitries of the plurality of broker circuitries, a commit message to at least the first broker circuitry when a second consensus on the published data is reached;

transmitting, by the first broker circuitry, a commit message to each of the first plurality of subscriber devices when a number of commit messages received from the other broker circuitries of the plurality of broker circuitries is above a predetermined threshold and a consensus on the published data is reached; and storing, by each of the first plurality of subscriber devices, the published data in association with the hash value in the blockchain when the commit message is received from the first broker circuitry.

(56) The method of (55), wherein the commit process further includes:

transmitting, by the first broker circuitry, the commit message to the publisher device; and storing, by the publisher device, the published data in association with the hash value in the blockchain when the commit message is received.

(57) The method of (42), wherein the first consensus reaching process includes:

transmitting, by each of the first plurality of subscriber devices, the check result to the first broker circuitry and to each of one or more subscriber devices of the first plurality of subscriber devices which are determined to perform the first consensus reaching process;

receiving, by the first broker circuitry, the check result from each of the first plurality of subscriber devices;

receiving, by each of the one or more subscriber devices of the first plurality of subscriber devices which are determined to perform the first consensus reaching process, the check result from each of the other subscriber devices of the first plurality of subscriber devices;

determining, by the first broker circuitry and by each of the one or more subscriber devices of the first plurality of subscriber devices, that a first consensus on the published data is reached when a number of the check results, which indicate that the hash value and the second hash value are equal, is above a predetermined threshold.

(58) The method of (57), wherein the second publish process includes:

transmitting, by the first broker circuitry, when the publisher device has transmitted an indication of important information, the published data and the hash value to each of the other broker circuitries of the plurality of broker circuitries.

(59) The method of (58), wherein the second check process includes:

determining, by each of the plurality of broker circuitries, a third hash value from at least one of the data payload and the data identifier; and determining, by each of the plurality of broker circuitries, a check result, wherein the check result indicates whether the hash value and the third hash value are equal.

(60) The method of (59), wherein the second consensus reaching process includes:

transmitting, by each of the plurality of broker circuitries, the check result from the second check process to each of the other broker circuitries of the plurality of broker circuitries;

receiving, by each of the plurality of broker circuitries, the check result from the second check process from each of the other broker circuitries of the plurality of broker circuitries; and determining, by each of the plurality of broker circuitries, that a second consensus on the published data is reached when a number of the check results from the second check process, which indicate that the hash value and the third hash value are equal, is above a predetermined threshold.

(61) The method of (60), wherein the second consensus reaching process further includes:

determining, by the first broker circuitry, that a consensus on the published data is reached when a first consensus is reached based on the check results from the first check process and a second consensus is reached in the second consensus reaching process based on the check results from the second check process.

(62) The method of (61), wherein the commit process includes:

transmitting, by each of the other broker circuitries of the plurality of broker circuitries, a commit message to at least the first broker circuitry when a second consensus on the published data is reached;

transmitting, by the first broker circuitry, a commit message to each of the first plurality of subscriber devices when a number of received commit messages is above a predetermined threshold and a consensus on the published data is reached;

transmitting, by each of the one or more subscriber devices of the first plurality of subscriber devices which are determined to perform a cross-check process, a commit message to each of the other subscriber devices of the first plurality of subscriber devices when the commit message is received from the first broker circuitry and a first consensus on the published data is reached in the first consensus reaching process; and storing, by each of the plurality of subscriber devices, the published data in association with the hash value in the blockchain when a commit message is received from the first broker circuitry and the one or more subscriber devices of the first plurality of subscriber devices.

(63) A subscriber device for a publisher-subscriber network, the subscriber device including circuitry configured to communicate with a publisher device and a broker circuitry, wherein the circuitry is further configured to:

participate in a consensus reaching process on published data for storing the published data in a blockchain.

(64) The subscriber device of (63), wherein the circuitry is configured to communicate directly with the publisher device.

(65) The subscriber device of (63) or (64), wherein the circuitry is further configured to provide the blockchain.

(66) The subscriber device of anyone of (63) to (65), wherein the circuitry is further configured to:

receive the published data and a hash value, wherein the published data include data payload and a data identifier indicating the data category of the data payload; and determine a second hash value from at least one of the data payload and the data identifier.

(67) The subscriber device of (66), wherein the circuitry is further configured to determine a check result, wherein the check result indicates whether the hash value and the second hash value are equal.

(68) The subscriber device of (67), wherein the circuitry is further configured to:

transmit the check result to one or more other subscriber devices; and receive a check result from the one or more other subscriber devices.

(69) The subscriber device of (68), wherein the circuitry is further configured to determine, in the consensus reaching process, that a consensus on the published data is reached when a number of check results from the one or more other subscriber devices, which indicate that the hash value and the second hash value are equal, is above a predetermined threshold.

(70) The subscriber device of (69), wherein the circuitry is further configured to:

transmit a commit message to the one or more other subscriber devices when a consensus on the published data is reached; and receive a commit message from the one or more other subscriber devices.

(71) The subscriber device of (70), wherein the circuitry is further configured to store the published data in association with the hash value in the blockchain when a number of commit messages received from the one or more other subscriber devices is above a predetermined threshold.

(72) A publisher device for a publisher-subscriber network, the publisher device including circuitry configured to communicate with a plurality of subscriber devices and a broker circuitry, wherein the circuitry is further configured to:
  transmit published data and a hash value to the plurality of subscriber devices for performing a consensus reaching process on the published data for storing the published data in a blockchain, wherein the published data include data payload and a data identifier indicating the data category of the data payload; and
  determine the hash value from at least one of the data payload and the data identifier.

(73) The publisher device of (72), wherein the circuitry is configured to communicate directly with the plurality of subscriber devices.

(74) The publisher device of (72) or (73), wherein the circuitry is further configured to provide the blockchain.

(75) The publisher device of (74), wherein the circuitry is further configured to:
  receive a commit message from each of the plurality of subscriber devices; and
  store the published data in association with the hash value in the blockchain when a number of received commit messages is above a predetermined threshold.

(76) A publisher-subscriber network, the publisher-subscriber network including a broker circuitry configured to provide a broker, a publisher device that is registered as a publisher for a data category at the broker, and a plurality of subscriber devices, wherein each of the plurality of subscriber devices is registered as a subscriber for the data category at the broker, wherein the publisher-subscriber network is configured to provide a blockchain and to:
  perform a consensus reaching process on published data for storing the published data in the blockchain.

(77) The publisher-subscriber network of (76), wherein the publisher device is configured to communicate directly with the plurality of subscriber devices without the broker circuitry.

(78) The publisher-subscriber network of (76) or (77), wherein the consensus reaching process is performed via the broker circuitry.

(79) The publisher-subscriber network of anyone of (76) to (78), wherein at least one of the plurality of subscriber devices and the broker circuitry perform the consensus reaching process.

(80) The publisher-subscriber network of (79), wherein the plurality of subscriber devices performs the consensus reaching process.

(81) The publisher-subscriber network of (79) or (80), wherein the broker circuitry performs the consensus reaching process on behalf of the plurality of subscriber devices.

(82) The publisher-subscriber network of anyone of (79) to (81), wherein each of one or more subscriber devices of the plurality of subscriber devices determined to perform the consensus reaching process and the broker circuitry perform the consensus reaching process.

(83) The publisher-subscriber network of (82), wherein the one or more subscriber devices of the plurality of subscriber devices are determined based on at least one of a quality of a communication link between a subscriber device of the plurality of subscriber devices and the broker circuitry, a latency of a communication link between a subscriber device of the plurality of subscriber devices and the broker circuitry, and a stability of a communication link between a subscriber device of the plurality of subscriber devices and the broker circuitry.

(84) The publisher-subscriber network of (82) or (83), wherein the broker circuitry performs the consensus reaching process on behalf of a subscriber device of the plurality of subscriber devices when a quality of a communication link between the subscriber device and the broker circuitry is below a predetermined threshold.

(85) The publisher subscriber network of anyone of (82) to (84), wherein the broker circuitry performs the consensus reaching process on behalf of a subscriber device of the plurality of subscriber devices when a latency of a communication link between the subscriber device and the broker circuitry is above a predetermined threshold.

(86) The publisher-subscriber network of anyone of (82) to (85), wherein the broker circuitry performs the consensus reaching process on behalf of a subscriber device of the plurality of subscriber devices when a stability of a communication link between the subscriber device and the broker circuitry is below a predetermined threshold.

(87) The publisher-subscriber network of anyone of (79) to (86), wherein the publisher-subscriber network includes a plurality of publisher-subscriber networks, wherein the broker circuitry includes a plurality of broker circuitries each being configured to provide a broker in a different publisher-subscriber network of the plurality of publisher-subscriber networks, and wherein the plurality of broker circuitries perform the consensus reaching process for a publisher-subscriber network of the plurality of publisher-subscriber networks.

(88) The publisher-subscriber network of anyone of (79) to (87), wherein the publisher-subscriber network includes a plurality of publisher-subscriber networks, wherein the broker circuitry includes a plurality of broker circuitries each being configured to provide a broker in a different publisher-subscriber network of the plurality of publisher-subscriber networks, wherein a first publisher subscriber-network of the plurality of subscriber networks includes a first broker circuitry of the plurality of broker circuitries configured to provide a first broker and a first plurality of subscriber devices of the plurality of subscriber devices each being registered as a subscriber for the data category at the first broker, and wherein the plurality of broker circuitries and the first plurality of subscriber devices perform the consensus reaching process for the first publisher-subscriber network.

(89) The publisher-subscriber network of (88), wherein the consensus reaching process includes a first consensus reaching process and a second consensus reaching process.

(90) The publisher-subscriber network of (89), wherein:
  the first plurality of subscriber devices performs the first consensus reaching process, or,
  the first broker circuitry performs the first consensus reaching process on behalf of the first plurality of subscriber devices, or,
  each of one or more first subscriber devices of the first plurality of subscriber devices determined to perform the first consensus reaching process and the first broker circuitry perform the first consensus reaching process.

(91) The publisher-subscriber network of (90), wherein the plurality of broker circuitries performs the second consensus reaching process.

(92) The publisher-subscriber network of (91), wherein the plurality of broker circuitries performs the second consensus reaching process when the publisher device, being a publisher device of the first publisher-subscriber network and registered as a publisher at the first broker, has transmitted an indication of important information.

(93) The publisher-subscriber network of (91) or (92), wherein the plurality of broker circuitries performs the second consensus reaching process when a number of nodes involved in a cross-check process in the first consensus reaching process is below a predetermined threshold.

(94) The publisher-subscriber network of anyone of (76) to (93), wherein the plurality of subscriber devices provides the blockchain.

(95) The publisher-subscriber network of anyone of (76) to (94), wherein the plurality of subscriber devices and the publisher device provide the blockchain.

(96) The publisher-subscriber network of anyone of (76) to (95), wherein the publisher-network includes a plurality of publisher-subscriber networks, wherein the broker circuitry includes a plurality of broker circuitries each being configured to provide a broker in a different publisher-subscriber network of the plurality of publisher-subscriber networks, and wherein the plurality of broker circuitries provides the blockchain.

(97) The publisher-subscriber network of anyone of (76) to (96), wherein the publisher-subscriber network performs a publish process, a check process, the consensus reaching process and a commit process.

(98) The publisher-subscriber network of (97), wherein the blockchain is provided the plurality of subscriber devices or by the plurality of subscriber devices and the publisher device.

(99) The publisher-subscriber network of (98), wherein the publish process includes:
transmitting, by the publisher device, the published data and a hash value to the plurality of subscriber devices, wherein the published data include data payload and a data identifier indicating the data category of the data payload, wherein the hash value is determined by the publisher device from at least one of the data payload and the data identifier; and
receiving, by each of the plurality of subscriber devices, the published data and the hash value from the publisher device.

(100) The publisher-subscriber network of (99), wherein the check process includes:
determining, by each of the plurality of subscriber devices, a second hash value from at least one of the data payload and the data identifier; and
determining, by each of the plurality of subscriber devices, a check result, wherein the check result indicates whether the hash value and the second hash value are equal.

(101) The publisher-subscriber network of (100), wherein the consensus reaching process includes:
transmitting, by each of the plurality of subscriber devices, the check result to each of the other subscriber devices of the plurality of subscriber devices;
receiving, by each of the plurality of subscriber devices, the check result from each of the other subscriber devices of the plurality of subscriber devices; and
determining, by each of the plurality of subscriber devices, that a consensus on the published data is reached when a number of the check results, which indicate that the hash value and the second hash value are equal, is above a predetermined threshold.

(102) The publisher-subscriber network of (101), wherein the commit process includes:
transmitting, by each of the plurality of subscriber devices, a commit message to each of the other subscriber devices of the plurality of subscriber devices when a consensus on the published data is reached; and
storing, by each of the plurality of subscriber devices, the published data in association with the hash value in the blockchain when a number of commit messages received from the other subscriber devices of the plurality of subscriber devices is above a predetermined threshold.

(103) The publisher-subscriber network of (102), wherein the commit process further includes:
transmitting, by each of the plurality of subscriber devices, the commit message to the publisher device; and
storing, by the publisher device, the published data in association with the hash value in the blockchain when a number of received commit messages is above a predetermined threshold.

(104) The publisher-subscriber network of (100), wherein the consensus reaching process includes:
transmitting, by each of the plurality of subscriber devices, the check result to the broker circuitry;
receiving, by the broker circuitry, the check result from each of the plurality of subscriber devices; and
determining, by the broker circuitry for each of the plurality of subscriber devices, that a consensus on the published data is reached when a number of the check results, which indicate that the hash value and the second hash value are equal, is above a predetermined threshold.

(105) The publisher-subscriber network of (104), wherein the commit process includes:
transmitting, by the broker circuitry, a commit message to the plurality of subscriber devices when a consensus on the published data is reached; and
storing, by each of the plurality of subscriber devices, the published data in association with the hash value in the blockchain when the commit message is received from the broker circuitry.

(106) The publisher-subscriber network of (105), wherein the commit process further includes:
transmitting, by the broker circuitry, the commit message to the publisher device; and
storing, by the publisher device, the published data in association with the hash value in the blockchain when the commit message is received.

(107) The publisher-subscriber network of (100), wherein the consensus reaching process includes:
transmitting, by each of the plurality of subscriber devices, the check result to the broker circuitry and to each of one or more subscriber devices of the plurality of subscriber devices which are determined to perform the consensus reaching process;
receiving, by the broker circuitry, the check result from each of the plurality of subscriber devices;
receiving, by each of the one or more subscriber devices of the plurality of subscriber devices which are determined to perform the consensus reaching process, the check result from each of the other subscriber devices of the plurality of subscriber devices;
determining, by the broker circuitry and by each of the one or more subscriber devices of the plurality of subscriber devices, that a consensus on the published data is reached when a number of the check results, which indicate that the hash value and the second hash value are equal, is above a predetermined threshold.

(108) The publisher-subscriber network of (107), wherein the commit process includes:
transmitting, by the broker circuitry, a commit message to the plurality of subscriber devices when a consensus on the published data is reached;
transmitting, by each of the one or more subscriber devices of the plurality of subscriber devices which are determined to perform the consensus reaching process, a commit message to each of the other subscriber devices of the plurality of subscriber devices when a consensus on the published data is reached; and storing, by each of the plurality of subscriber devices, the published data in association with the hash value in the blockchain when a commit message is received from the broker circuitry and the one or more subscriber devices of the plurality of subscriber devices.

(109) The publisher-subscriber network of (97), wherein the publisher-subscriber network includes a plurality of publisher-subscriber networks, wherein the broker circuitry includes a plurality of broker circuitries each being configured to provide a broker in a different publisher-subscriber network of the plurality of publisher-subscriber networks, wherein a first publisher subscriber-network of the plurality of subscriber networks includes a first broker circuitry of the plurality of broker circuitries configured to provide a first broker and a first plurality of subscriber devices of the plurality of subscriber devices each being registered as a subscriber for the data category at the first broker, wherein the blockchain is provided by the plurality of broker circuitries.

(110) The publisher-subscriber network of (109), wherein the publish process includes:

transmitting, by the publisher device, the publisher device being a publisher device of the first publisher-subscriber network and registered as a publisher at the first broker, the published data and a hash value to the first plurality of subscriber devices via the first broker circuitry, wherein the published data include data payload and a data identifier indicating the data category of the data payload, wherein the hash value is determined by the publisher device from at least one of the data payload and the data identifier;

receiving, by each of the first plurality of subscriber devices, the published data and the hash value from the publisher device;

transmitting, by the first broker circuitry, the published data and the hash value to each of the other broker circuitries of the plurality of broker circuitries; and receiving, by each of the other broker circuitries of the plurality of broker circuitries, the published data and the hash value from the first broker circuitry.

(111) The publisher-subscriber network of (110), wherein the check process includes:

determining, by each of the plurality of broker circuitries, a second hash value from at least one of the data payload and the data identifier; and determining, by each of the plurality of broker circuitries, a check result, wherein the check result indicates whether the hash value and the second hash value are equal.

(112) The publisher-subscriber network of (111), wherein the consensus reaching process includes:

transmitting, by each of the plurality of broker circuitries, the check result to each of the other broker circuitries of the plurality of broker circuitries;

receiving, by each of the plurality of broker circuitries, the check result from each of the other broker circuitries of the plurality of broker circuitries; and determining, by each of the plurality of broker circuitries, that a consensus on the published data is reached when a number of the check results, which indicate that the hash value and the second hash value are equal, is above a predetermined threshold.

(113) The publisher-subscriber network of (112), wherein the commit process includes:

transmitting, by each of the plurality of broker circuitries, a commit message to each of the other broker circuitries of the plurality of broker circuitries when a consensus on the published data is reached; and storing, by each of the plurality of broker circuitries, the published data in association with the hash value in the blockchain when a number of received commit messages is above a predetermined threshold.

(114) The publisher-subscriber network of (113), wherein the commit process further includes:

transmitting, by the first broker circuitry, the commit message to the publisher device.

(115) The publisher-subscriber network of (97), wherein the publisher-subscriber network includes a plurality of publisher-subscriber networks, wherein the broker circuitry includes a plurality of broker circuitries each being configured to provide a broker in a different publisher-subscriber network of the plurality of publisher-subscriber networks, wherein a first publisher subscriber-network of the plurality of subscriber networks includes a first broker circuitry of the plurality of broker circuitries configured to provide a first broker and a first plurality of subscriber devices of the plurality of subscriber devices each being registered as a subscriber for the data category at the first broker, wherein the blockchain is provided the first plurality of subscriber devices or by the first plurality of subscriber devices and the publisher device, wherein the publish process includes a first publish process and a second publish process, the check process includes a first check process and a second check process, and the consensus reaching process includes a first consensus reaching process and a second consensus reaching process.

(116) The publisher-subscriber network of (115), wherein the first publish process includes:

transmitting, by the publisher device, the publisher device being a publisher device of the first publisher-subscriber network and registered as a publisher at the first broker, the published data and a hash value to the first plurality of subscriber devices via the first broker circuitry, wherein the published data include data payload and a data identifier indicating the data category of the data payload, wherein the hash value is determined by the publisher device from at least one of the data payload and the data identifier; and receiving, by each of the first plurality of subscriber devices, the published data and the hash value from the publisher device.

(117) The publisher-subscriber network of (116), wherein the first check process includes:

determining, by each of the first plurality of subscriber devices, a second hash value from at least one of the data payload and the data identifier; and determining, by each of the first plurality of subscriber devices, a check result, wherein the check result indicates whether the hash value and the second hash value are equal.

(118) The publisher-subscriber network of (117), wherein the first consensus reaching process includes:

transmitting, by each of the first plurality of subscriber devices, the check result to each of the other subscriber devices of the first plurality of subscriber devices;

receiving, by each of the first plurality of subscriber devices, the check result from each of the other subscriber devices of the first plurality of subscriber devices; and determining, by each of the first plurality of subscriber devices, that a first consensus on the published data is reached when a number of the check results, which indicate that the hash value and the second hash value are equal, is above a predetermined threshold.

(119) The publisher-subscriber network of (118), wherein the second publish process includes:

transmitting, by the first broker circuitry, when the publisher device has transmitted an indication of important information or when a number of the first plurality of subscriber devices involved in the first consensus reaching process is below a predetermined threshold, the published data and the hash value to each of the other broker circuitries of the plurality of broker circuitries.

(120) The publisher-subscriber network of (119), wherein the second check process includes:

determining, by each of the plurality of broker circuitries, a third hash value from at least one of the data payload and the data identifier; and determining, by each of the plurality of broker circuitries, a check result, wherein the check result indicates whether the hash value and the third hash value are equal.

(121) The publisher-subscriber network of (120), wherein the second consensus reaching process includes:

transmitting, by each of the plurality of broker circuitries, the check result from the second check process to each of the other broker circuitries of the plurality of broker circuitries;

receiving, by each of the plurality of broker circuitries, the check result from the second check process from each of the other broker circuitries of the plurality of broker circuitries; and determining, by each of the plurality of broker circuitries, that a second consensus on the published data is reached when a number of the check results from the second check process, which indicate that the hash value and the third hash value are equal, is above a predetermined threshold.

(122) The publisher-subscriber network of (121), wherein the second consensus reaching process further includes:

transmitting, by each of the first plurality of subscriber devices, the check result from the first check process to the first broker circuitry;

receiving, by the first broker circuitry, the check result from the first check process from each of the first plurality of subscriber devices;

determining, by the first broker circuitry, that a third consensus on the published data is reached when a number of check results from the first check process, which indicate that the hash value and the second hash value are equal, is above a predetermined threshold; and determining, by the first broker circuitry, that a consensus on the published data is reached when a third consensus is reached based on the check results from the first check process and a second consensus is reached in the second consensus reaching process based on the check results from the second check process.

(123) The publisher-subscriber network of (122), wherein the commit process includes:

transmitting, by each of the other broker circuitries of the plurality of broker circuitries, a commit message to at least the first broker circuitry when a second consensus on the published data is reached;

transmitting, by the first broker circuitry, a commit message to each of the first plurality of subscriber devices when a number of received commit messages is above a predetermined threshold and a consensus on the published data is reached;

transmitting, by each of the plurality of subscriber devices, a commit message to each of the other subscriber devices of the first plurality of subscriber devices when the commit message is received from the first broker circuitry and a first consensus on the published data is reached in the first consensus reaching process; and storing, by each of the first plurality of subscriber devices, the published data in association with the hash value in the blockchain when a number of commit messages received from the other subscriber devices of the first plurality of subscriber devices is above a predetermined threshold.

(124) The publisher-subscriber network of (123), wherein the commit process further includes:

transmitting, by each of the first plurality of subscriber devices, the commit message to the publisher device; and storing, by the publisher device, the published data in association with the hash value in the blockchain when a number of commit messages received from the first plurality of subscriber devices is above a predetermined threshold.

(125) The publisher-subscriber network of (117), wherein the first consensus reaching process includes:

transmitting, by each of the first plurality of subscriber devices, the check result to the first broker circuitry;

receiving, by the first broker circuitry, the check result from each of the first plurality of subscriber devices; and determining, by the first broker circuitry for each of the first plurality of subscriber devices, that a first consensus on the published data is reached when a number of the check results received from the first plurality of subscriber devices, which indicate that the hash value and the second hash value are equal, is above a predetermined threshold.

(126) The publisher-subscriber network of (125), wherein the second publish process includes:

transmitting, by the first broker circuitry, when the publisher device has transmitted an indication of important information, the published data and the hash value to each of the other broker circuitries of the plurality of broker circuitries.

(127) The publisher-subscriber network of (126), wherein the second check process includes:

determining, by each of the plurality of broker circuitries, a third hash value from at least one of the data payload and the data identifier; and determining, by each of the plurality of broker circuitries, a check result, wherein the check result indicates whether the hash value and the third hash value are equal.

(128) The publisher-subscriber network of (127), wherein the second consensus reaching process includes:

transmitting, by each of the plurality of broker circuitries, the check result from the second check process to each of the other broker circuitries of the plurality of broker circuitries;

receiving, by each of the plurality of broker circuitries, the check result from the second check process from each of the other broker circuitries of the plurality of broker circuitries; and determining, by each of the plurality of broker circuitries, that a second consensus on the published data is reached when a number of the check results from the second check process, which indicate that the hash value and the third hash value are equal, is above a predetermined threshold.

(129) The publisher-subscriber network of (128), wherein the second consensus reaching process further includes:

determining, by the first broker circuitry, that a consensus on the published data is reached when a first consensus is reached based on the check results from the first check process and a second consensus is reached in the second consensus reaching process based on the check results from the second check process.

(130) The publisher-subscriber network of (129), wherein the commit process includes:

transmitting, by each of the other broker circuitries of the plurality of broker circuitries, a commit message to at least the first broker circuitry when a second consensus on the published data is reached;

transmitting, by the first broker circuitry, a commit message to each of the first plurality of subscriber devices when a number of commit messages received from the other broker circuitries of the plurality of broker circuitries is above a predetermined threshold and a consensus on the published data is reached; and storing, by each of the first plurality of subscriber devices, the published data in association with the hash value in the blockchain when the commit message is received from the first broker circuitry.

(131) The publisher-subscriber network of (130), wherein the commit process further includes:

transmitting, by the first broker circuitry, the commit message to the publisher device; and storing, by the publisher device, the published data in association with the hash value in the blockchain when the commit message is received.

(132) The publisher-subscriber network of (117), wherein the first consensus reaching process includes:

transmitting, by each of the first plurality of subscriber devices, the check result to the first broker circuitry and to each of one or more subscriber devices of the first plurality of subscriber devices which are determined to perform the first consensus reaching process;

receiving, by the first broker circuitry, the check result from each of the first plurality of subscriber devices;

receiving, by each of the one or more subscriber devices of the first plurality of subscriber devices which are determined to perform the first consensus reaching process, the check result from each of the other subscriber devices of the first plurality of subscriber devices;

determining, by the first broker circuitry and by each of the one or more subscriber devices of the first plurality of subscriber devices, that a first consensus on the published data is reached when a number of the check results, which indicate that the hash value and the second hash value are equal, is above a predetermined threshold.

(133) The publisher-subscriber network of (132), wherein the second publish process includes:

transmitting, by the first broker circuitry, when the publisher device has transmitted an indication of important information, the published data and the hash value to each of the other broker circuitries of the plurality of broker circuitries.

(134) The publisher-subscriber network of (133), wherein the second check process includes:

determining, by each of the plurality of broker circuitries, a third hash value from at least one of the data payload and the data identifier; and determining, by each of the plurality of broker circuitries, a check result, wherein the check result indicates whether the hash value and the third hash value are equal.

(135) The publisher-subscriber network of (134), wherein the second consensus reaching process includes:

transmitting, by each of the plurality of broker circuitries, the check result from the second check process to each of the other broker circuitries of the plurality of broker circuitries;

receiving, by each of the plurality of broker circuitries, the check result from the second check process from each of the other broker circuitries of the plurality of broker circuitries; and determining, by each of the plurality of broker circuitries, that a second consensus on the published data is reached when a number of the check results from the second check process, which indicate that the hash value and the third hash value are equal, is above a predetermined threshold.

(136) The publisher-subscriber network of (135), wherein the second consensus reaching process further includes:

determining, by the first broker circuitry, that a consensus on the published data is reached when a first consensus is reached based on the check results from the first check process and a second consensus is reached in the second consensus reaching process based on the check results from the second check process.

(137) The publisher-subscriber network of (136), wherein the commit process includes:

transmitting, by each of the other broker circuitries of the plurality of broker circuitries, a commit message to at least the first broker circuitry when a second consensus on the published data is reached;

transmitting, by the first broker circuitry, a commit message to each of the first plurality of subscriber devices when a number of received commit messages is above a predetermined threshold and a consensus on the published data is reached;

transmitting, by each of the one or more subscriber devices of the first plurality of subscriber devices which are determined to perform a cross-check process, a commit message to each of the other subscriber devices of the first plurality of subscriber devices when the commit message is received from the first broker circuitry and a first consensus on the published data is reached in the first consensus reaching process; and storing, by each of the plurality of subscriber devices, the published data in association with the hash value in the blockchain when a commit message is received from the first broker circuitry and the one or more subscriber devices of the first plurality of subscriber devices.

(138) A computer program comprising program code causing a computer to perform the method according to anyone of (1) to (62), when being carried out on a computer.

(139) A non-transitory computer-readable recording medium that stores therein a computer program product, which, when executed by a processor, causes the method according to anyone of (1) to (62) to be performed.

The invention claimed is:

1. A method for reaching consensus on published data for a publisher-subscriber network, the publisher-subscriber network including a broker circuitry configured to provide a broker, a publisher device that is registered as a publisher for a data category at the broker, and a plurality of subscriber devices, wherein each of the plurality of subscriber devices is registered as a subscriber for the data category at the broker, wherein the publisher-subscriber network is configured to provide a blockchain, wherein the method comprises:

performing, by the publisher-subscriber network, a consensus reaching process on the published data for storing the published data in the blockchain, wherein the consensus reaching process includes a first consensus reaching process performed by the plurality of subscriber devices, and in a case that a number of subscriber devices involved in the first consensus reaching process is below a predetermined threshold, a second consensus reaching process is performed by a plurality of broker circuitries, each being configured to provide a broker in a different publisher-subscriber network of a plurality of publisher-subscriber networks.

2. The method according to claim 1, wherein the publisher device is configured to communicate directly with the plurality of subscriber devices without the broker circuitry.

3. The method according to claim 1, wherein the consensus reaching process is performed via the broker circuitry.

4. The method according to claim 1, wherein at least one of the plurality of subscriber devices and the broker circuitry perform the consensus reaching process.

5. The method according to claim 4, wherein the plurality of subscriber devices performs the consensus reaching process.

6. The method according to claim 4, wherein the broker circuitry performs the consensus reaching process on behalf of the plurality of subscriber devices.

7. The method according to claim 4, wherein each of one or more subscriber devices of the plurality of subscriber devices determined to perform the consensus reaching process and the broker circuitry perform the consensus reaching process.

8. The method according to claim 7, wherein the one or more subscriber devices of the plurality of subscriber devices are determined based on at least one of a quality of a communication link between a subscriber device of the plurality of subscriber devices and the broker circuitry, a latency of a communication link between a subscriber device of the plurality of subscriber devices and the broker circuitry, and a stability of a communication link between a subscriber device of the plurality of subscriber devices and the broker circuitry.

9. A subscriber device for a publisher-subscriber network, the subscriber device comprising circuitry configured to communicate with a publisher device and a broker circuitry, wherein the circuitry is further configured to:

participate in a consensus reaching process on published data for storing the published data in a blockchain, wherein the consensus reaching process includes a first consensus reaching process in which the subscriber device participates with a plurality of other subscriber devices, and wherein in a case that a number of subscriber devices involved in the first consensus reaching process is below a predetermined threshold, a second consensus reaching process is performed by a plurality of broker circuitries, each being configured to provide a broker in a different publisher-subscriber network of a plurality of publisher-subscriber networks.

10. The subscriber device according to claim 9, wherein the circuitry is configured to communicate directly with the publisher device.

11. The subscriber device according to claim 9, wherein the circuitry is further configured to provide the blockchain.

12. The subscriber device according to claim 9, wherein the circuitry is further configured to:

receive the published data and a hash value, wherein the published data include data payload and a data identifier indicating the data category of the data payload; and determine a second hash value from at least one of the data payload and the data identifier.

13. The subscriber device according to claim 12, wherein the circuitry is further configured to determine a check result, wherein the check result indicates whether the hash value and the second hash value are equal.

14. The subscriber device according to claim 13, wherein the circuitry is further configured to:

transmit the check result to one or more other subscriber devices; and receive a check result from the one or more other subscriber devices.

15. The subscriber device according to claim 14, wherein the circuitry is further configured to determine, in the consensus reaching process, that a consensus on the published data is reached when a number of check results from the one or more other subscriber devices, which indicate that the hash value and the second hash value are equal, is above a predetermined threshold.

16. The subscriber device according to claim 15, wherein the circuitry is further configured to:

transmit a commit message to the one or more other subscriber devices when a consensus on the published data is reached; and receive a commit message from the one or more other subscriber devices.

17. The subscriber device according to claim 16, wherein the circuitry is further configured to store the published data in association with the hash value in the blockchain when a number of commit messages received from the one or more other subscriber devices is above a predetermined threshold.

18. A publisher device for a publisher-subscriber network, the publisher device comprising circuitry configured to communicate with a plurality of subscriber devices and a broker circuitry, wherein the circuitry is further configured to:

transmit published data and a hash value to the plurality of subscriber devices for performing a consensus reaching process on the published data for storing the published data in a blockchain, wherein the published data include data payload and a data identifier indicating the data category of the data payload, wherein the consensus reaching process includes a first consensus reaching process performed by the plurality of subscriber devices, and in a case that a number of subscriber devices involved in the first consensus reaching process is below a predetermined threshold, a second consensus reaching process is performed by a plurality of broker circuitries, each being configured to provide a broker in a different publisher-subscriber network of a plurality of publisher-subscriber networks; and determine the hash value from at least one of the data payload and the data identifier.

19. The publisher device according to claim 18, wherein the circuitry is configured to communicate directly with the plurality of subscriber devices.

20. The publisher device according to claim 18, wherein the circuitry is further configured to provide the blockchain.

* * * * *